US008443169B2

(12) United States Patent
Pechanek

(10) Patent No.: US 8,443,169 B2
(45) Date of Patent: *May 14, 2013

(54) INTERCONNECTION NETWORK CONNECTING OPERATION-CONFIGURABLE NODES ACCORDING TO ONE OR MORE LEVELS OF ADJACENCY IN MULTIPLE DIMENSIONS OF COMMUNICATION IN A MULTI-PROCESSOR AND A NEURAL PROCESSOR

(76) Inventor: Gerald George Pechanek, Cary, NC (US)

( * ) Notice: Subject to any disclaimer, the term of this patent is extended or adjusted under 35 U.S.C. 154(b) by 160 days.

This patent is subject to a terminal disclaimer.

(21) Appl. No.: 12/932,542

(22) Filed: Feb. 28, 2011

(65) Prior Publication Data

US 2011/0161625 A1 Jun. 30, 2011

Related U.S. Application Data

(60) Continuation-in-part of application No. 12/927,837, filed on Nov. 27, 2010, now Pat. No. 8,156,311, which is a continuation of application No. 12/477,232, filed on Jun. 3, 2009, now Pat. No. 7,886,128, which is a division of application No. 11/277,507, filed on Mar. 26, 2006, now Pat. No. 7,581,079.

(60) Provisional application No. 60/665,668, filed on Mar. 28, 2005, provisional application No. 60/687,719, filed on Jun. 6, 2005.

(51) Int. Cl.
*G06F 15/16* (2006.01)

(52) U.S. Cl.
USPC .............................................. 712/11; 712/17

(58) Field of Classification Search ........................ None
See application file for complete search history.

(56) References Cited

U.S. PATENT DOCUMENTS

| 4,922,408 | A | * | 5/1990 | Davis et al. ................... 709/252 |
| 5,070,446 | A | * | 12/1991 | Salem ............................. 703/21 |
| 5,163,120 | A | * | 11/1992 | Childers et al. ................. 712/15 |
| 5,243,688 | A | | 9/1993 | Pechanek et al. |

(Continued)

OTHER PUBLICATIONS

Gerald G. Pechanek, Stamatis Vassiliadis, Jose G. Delgado-Frias, "Digital Neural Emulators Using Tree Accumulation and Communication Structures", IEEE Transactions on Neural Networks, Nov. 1992, pp. 934-950, vol. 3, No. 6, Publisher IEEE, New York, NY.

*Primary Examiner* — Keith Vicary

(57) ABSTRACT

A Wings array system for communicating between nodes using store and load instructions is described. Couplings between nodes are made according to a 1 to N adjacency of connections in each dimension of a G×H matrix of nodes, where G≧N and H≧N and N is a positive odd integer. Also, a 3D Wings neural network processor is described as a 3D G×H×K network of neurons, each neuron with an N×N×N array of synaptic weight values stored in coupled memory nodes, where G≧N, H≧N, K≧N, and N is determined from a 1 to N adjacency of connections used in the G×H×K network. Further, a hexagonal processor array is organized according to an INFORM coordinate system having axes at 60 degree spacing. Nodes communicate on row paths parallel to an FM dimension of communication, column paths parallel to an IO dimension of communication, and diagonal paths parallel to an NR dimension of communication.

24 Claims, 51 Drawing Sheets

U.S. PATENT DOCUMENTS

| | | |
|---|---|---|
| 5,325,464 A | 6/1994 | Pechanek et al. |
| 5,329,611 A | 7/1994 | Pechanek et al. |
| 5,542,026 A | 7/1996 | Pechanek et al. |
| 5,546,336 A | 8/1996 | Pechanek et al. |
| 5,612,908 A | 3/1997 | Pechanek et al. |
| 5,613,044 A | 3/1997 | Pechanek et al. |
| 5,617,512 A | 4/1997 | Pechanek et al. |
| 5,640,586 A | 6/1997 | Pechanek et al. |
| 5,682,491 A | 10/1997 | Pechanek et al. |
| 5,682,544 A | 10/1997 | Pechanek et al. |
| 5,875,347 A * | 2/1999 | Watanabe et al. .................. 712/1 |
| 6,128,720 A | 10/2000 | Pechanek et al. |
| 6,145,072 A * | 11/2000 | Shams et al. .................... 712/22 |
| 8,156,311 B2 * | 4/2012 | Pechanek ........................ 712/11 |

* cited by examiner

Fig. 1B (Prior Art)

| Torus | P00 0000 | P01 0001 | P02 0011 | P03 0010 | P10 0100 | P11 0101 | P12 0111 | P13 0110 | P20 1100 | P21 1101 | P22 1111 | P23 1110 | P30 1000 | P31 1001 | P32 1011 | P33 1010 |
|---|---|---|---|---|---|---|---|---|---|---|---|---|---|---|---|---|
| P00 0000 |  | 1 |  | 1 | 1 |  |  |  |  |  |  |  | 1 |  |  |  |
| P01 0001 | 1 |  | 1 |  |  | 1 |  |  |  |  |  |  |  | 1 |  |  |
| P02 0011 |  | 1 |  | 1 |  |  | 1 |  |  |  |  |  |  |  | 1 |  |
| P03 0010 | 1 |  | 1 |  |  |  |  | 1 |  |  |  |  |  |  |  | 1 |
| P10 0100 | 1 |  |  |  |  | 1 |  | 1 | 1 |  |  |  |  |  |  |  |
| P11 0101 |  | 1 |  |  | 1 |  | 1 |  |  | 1 |  |  |  |  |  |  |
| P12 0111 |  |  | 1 |  |  | 1 |  | 1 |  |  | 1 |  |  |  |  |  |
| P13 0110 |  |  |  | 1 | 1 |  | 1 |  |  |  |  | 1 |  |  |  |  |
| P20 1100 |  |  |  |  | 1 |  |  |  |  | 1 |  | 1 | 1 |  |  |  |
| P21 1101 |  |  |  |  |  | 1 |  |  | 1 |  | 1 |  |  | 1 |  |  |
| P22 1111 |  |  |  |  |  |  | 1 |  |  | 1 |  | 1 |  |  | 1 |  |
| P23 1110 |  |  |  |  |  |  |  | 1 | 1 |  | 1 |  |  |  |  | 1 |
| P30 1000 | 1 |  |  |  |  |  |  |  | 1 |  |  |  |  | 1 |  | 1 |
| P31 1001 |  | 1 |  |  |  |  |  |  |  | 1 |  |  | 1 |  | 1 |  |
| P32 1011 |  |  | 1 |  |  |  |  |  |  |  | 1 |  |  | 1 |  | 1 |
| P33 1010 |  |  |  | 1 |  |  |  |  |  |  |  | 1 | 1 |  | 1 |  |

| STORE | M00 0000 | M01 0001 | M02 0011 | M03 0010 | M10 0100 | M11 0101 | M12 0111 | M13 0110 | M20 1100 | M21 1101 | M22 1111 | M23 1110 | M30 1000 | M31 1001 | M32 1011 | M33 1010 |
|---|---|---|---|---|---|---|---|---|---|---|---|---|---|---|---|---|
| P00 0000 | 1 | 1 |   | 1 | 1 | 1 |   | 1 |   |   |   |   | 1 | 1 |   | 1 |
| P01 0001 | 1 | 1 | 1 |   | 1 | 1 | 1 |   |   |   |   |   | 1 | 1 | 1 |   |
| P02 0011 |   | 1 | 1 | 1 |   | 1 | 1 | 1 |   |   |   |   |   | 1 | 1 | 1 |
| P03 0010 | 1 |   | 1 | 1 | 1 |   | 1 | 1 |   |   |   |   | 1 |   | 1 | 1 |
| P10 0100 | 1 | 1 |   | 1 | 1 | 1 |   | 1 | 1 | 1 |   | 1 |   |   |   |   |
| P11 0101 | 1 | 1 | 1 |   | 1 | 1 | 1 |   | 1 | 1 | 1 |   |   |   |   |   |
| P12 0111 |   | 1 | 1 | 1 |   | 1 | 1 | 1 |   | 1 | 1 | 1 |   |   |   |   |
| P13 0110 | 1 |   | 1 | 1 | 1 |   | 1 | 1 | 1 |   | 1 | 1 |   |   |   |   |
| P20 1100 | 1 | 1 |   | 1 | 1 | 1 |   | 1 | 1 | 1 |   | 1 | 1 | 1 |   | 1 |
| P21 1101 |   |   |   |   | 1 | 1 | 1 |   | 1 | 1 | 1 |   | 1 | 1 | 1 |   |
| P22 1111 |   |   |   |   |   | 1 | 1 | 1 |   | 1 | 1 | 1 |   | 1 | 1 | 1 |
| P23 1110 |   |   |   |   | 1 |   | 1 | 1 | 1 |   | 1 | 1 | 1 |   | 1 | 1 |
| P30 1000 | 1 | 1 |   | 1 |   |   |   |   | 1 | 1 |   | 1 | 1 | 1 |   | 1 |
| P31 1001 | 1 | 1 | 1 |   |   |   |   |   | 1 | 1 | 1 |   | 1 | 1 | 1 |   |
| P32 1011 |   | 1 | 1 | 1 |   |   |   |   |   | 1 | 1 | 1 |   | 1 | 1 | 1 |
| P33 1010 | 1 |   | 1 | 1 |   |   |   |   | 1 |   | 1 | 1 | 1 |   | 1 | 1 |

Fig. 6A

| LOAD | P00 0000 | P01 0001 | P02 0011 | P03 0010 | P10 0100 | P11 0101 | P12 0111 | P13 0110 | P20 1100 | P21 1101 | P22 1111 | P23 1110 | P30 1000 | P31 1001 | P32 1011 | P33 1010 |
|---|---|---|---|---|---|---|---|---|---|---|---|---|---|---|---|---|
| M00 0000 | 1 | 1 |   | 1 | 1 | 1 |   | 1 |   |   |   |   | 1 | 1 |   | 1 |
| M01 0001 | 1 | 1 | 1 |   | 1 | 1 | 1 |   |   |   |   |   | 1 | 1 | 1 |   |
| M02 0011 |   | 1 | 1 | 1 |   | 1 | 1 | 1 |   |   |   |   |   | 1 | 1 | 1 |
| M03 0010 | 1 |   | 1 | 1 | 1 |   | 1 | 1 |   |   |   |   | 1 |   | 1 | 1 |
| M10 0100 | 1 | 1 |   | 1 | 1 | 1 |   | 1 | 1 | 1 |   | 1 |   |   |   |   |
| M11 0101 | 1 | 1 | 1 |   | 1 | 1 | 1 |   | 1 | 1 | 1 |   |   |   |   |   |
| M12 0111 |   | 1 | 1 | 1 |   | 1 | 1 | 1 |   | 1 | 1 | 1 |   |   |   |   |
| M13 0110 | 1 |   | 1 | 1 | 1 |   | 1 | 1 | 1 |   | 1 | 1 |   |   |   |   |
| M20 1100 |   |   |   |   | 1 | 1 |   | 1 | 1 | 1 |   | 1 | 1 | 1 |   | 1 |
| M21 1101 |   |   |   |   | 1 | 1 | 1 |   | 1 | 1 | 1 |   | 1 | 1 | 1 |   |
| M22 1111 |   |   |   |   |   | 1 | 1 | 1 |   | 1 | 1 | 1 |   | 1 | 1 | 1 |
| M23 1110 |   |   |   |   | 1 |   | 1 | 1 | 1 |   | 1 | 1 | 1 |   | 1 | 1 |
| M30 1000 | 1 | 1 |   | 1 |   |   |   |   | 1 | 1 |   | 1 | 1 | 1 |   | 1 |
| M31 1001 | 1 | 1 | 1 |   |   |   |   |   | 1 | 1 | 1 |   | 1 | 1 | 1 |   |
| M32 1011 |   | 1 | 1 | 1 |   |   |   |   |   | 1 | 1 | 1 |   | 1 | 1 | 1 |
| M33 1010 | 1 |   | 1 | 1 |   |   |   |   | 1 |   | 1 | 1 | 1 |   | 1 | 1 |

Fig. 6B

| STORE*LOAD CONNECTION MATRIX | P00 0000 | P01 0001 | P02 0011 | P03 0010 | P10 0100 | P11 0101 | P12 0111 | P13 0110 | P20 1100 | P21 1101 | P22 1111 | P23 1110 | P30 1000 | P31 1001 | P32 1011 | P33 1010 |
|---|---|---|---|---|---|---|---|---|---|---|---|---|---|---|---|---|
| P00 0000 | 1 | 1 | 1 | 1 | 1 | 1 | 1 | 1 | 1 | 1 | 1 | 1 | 1 | 1 | 1 | 1 |
| P01 0001 | 1 | 1 | 1 | 1 | 1 | 1 | 1 | 1 | 1 | 1 | 1 | 1 | 1 | 1 | 1 | 1 |
| P02 0011 | 1 | 1 | 1 | 1 | 1 | 1 | 1 | 1 | 1 | 1 | 1 | 1 | 1 | 1 | 1 | 1 |
| P03 0010 | 1 | 1 | 1 | 1 | 1 | 1 | 1 | 1 | 1 | 1 | 1 | 1 | 1 | 1 | 1 | 1 |
| P10 0100 | 1 | 1 | 1 | 1 | 1 | 1 | 1 | 1 | 1 | 1 | 1 | 1 | 1 | 1 | 1 | 1 |
| P11 0101 | 1 | 1 | 1 | 1 | 1 | 1 | 1 | 1 | 1 | 1 | 1 | 1 | 1 | 1 | 1 | 1 |
| P12 0111 | 1 | 1 | 1 | 1 | 1 | 1 | 1 | 1 | 1 | 1 | 1 | 1 | 1 | 1 | 1 | 1 |
| P13 0110 | 1 | 1 | 1 | 1 | 1 | 1 | 1 | 1 | 1 | 1 | 1 | 1 | 1 | 1 | 1 | 1 |
| P20 1100 | 1 | 1 | 1 | 1 | 1 | 1 | 1 | 1 | 1 | 1 | 1 | 1 | 1 | 1 | 1 | 1 |
| P21 1101 | 1 | 1 | 1 | 1 | 1 | 1 | 1 | 1 | 1 | 1 | 1 | 1 | 1 | 1 | 1 | 1 |
| P22 1111 | 1 | 1 | 1 | 1 | 1 | 1 | 1 | 1 | 1 | 1 | 1 | 1 | 1 | 1 | 1 | 1 |
| P23 1110 | 1 | 1 | 1 | 1 | 1 | 1 | 1 | 1 | 1 | 1 | 1 | 1 | 1 | 1 | 1 | 1 |
| P30 1000 | 1 | 1 | 1 | 1 | 1 | 1 | 1 | 1 | 1 | 1 | 1 | 1 | 1 | 1 | 1 | 1 |
| P31 1001 | 1 | 1 | 1 | 1 | 1 | 1 | 1 | 1 | 1 | 1 | 1 | 1 | 1 | 1 | 1 | 1 |
| P32 1011 | 1 | 1 | 1 | 1 | 1 | 1 | 1 | 1 | 1 | 1 | 1 | 1 | 1 | 1 | 1 | 1 |
| P33 1010 | 1 | 1 | 1 | 1 | 1 | 1 | 1 | 1 | 1 | 1 | 1 | 1 | 1 | 1 | 1 | 1 |

Fig. 6C

One P Node

Row paths parallel to FM dimension
Column paths parallel to IO dimension
Diagonal paths parallel to NR dimension

INTERCONNECTION NETWORK CONNECTING OPERATION-CONFIGURABLE NODES ACCORDING TO ONE OR MORE LEVELS OF ADJACENCY IN MULTIPLE DIMENSIONS OF COMMUNICATION IN A MULTI-PROCESSOR AND A NEURAL PROCESSOR

RELATED U.S. APPLICATION DATA

The present application is a continuation-in-part of application Ser. No. 12/927,837 filed Nov. 27, 2010, which is a continuation of application Ser. No. 12/477,232 filed Jun. 3, 2009, now U.S. Pat. No. 7,886,128, which is a divisional of application Ser. No. 11/277,507 filed Mar. 26, 2006, now U.S. Pat. No. 7,581,079, which claims the benefit of U.S. Provisional Application No. 60/665,668 filed Mar. 28, 2005 and U.S. Provisional Application No. 60/687,719 filed Jun. 6, 2005, all of which are incorporated by reference herein in their entirety.

FIELD OF INVENTION

The present invention relates to unique and improved methods and apparatuses for processor architecture and organizations of processors and memory modules such that communication between the modules is efficient. More specifically, this invention concerns multiprocessor systems having a shared memory interconnection network for communication among the processors and memory modules and an architecture and processor organization that efficiently supports such communication and neural processing.

BACKGROUND OF INVENTION

One of the problems associated with increasing performance in multiprocessor parallel processing systems is the efficient accessing of data or instructions from memory. Having adequate memory bandwidth for sharing of data between processors is another problem associated with parallel processing systems. These problems are related to the organization of the processors and memory modules and the processor architecture used for communication between a processor and memory and between processors. Various approaches to solving these problems have been attempted in the past, for example, array processors and shared memory processors.

Multiprocessor systems can be classified generally in terms of coupling strength for communication between processors. Those multiprocessor systems that communicate using a share memory facility between the processors and the shared memory over an interconnection network are generally considered tightly coupled. Loosely coupled multiprocessor systems generally use an input/output (I/O) communication mechanism in each processor, such as message passing, for communicating between the processors over an interconnection network. A wide variety of interconnection networks have been utilized in multiprocessing systems. For example, rings, bus connected, crossbar, tree, shuffle, omega, butterfly, mesh, hypercube, and ManArray networks, have been used in prior multiprocessor systems. From an application or user perspective, specific networks have been chosen primarily based upon performance characteristics and cost to implement tradeoffs.

A network for an application of a multiprocessor system is evaluated based on a number of characteristics. Parameters considered include, for example, a network size of N nodes, where each node has L connection links including input and output paths, a diameter D for the maximum shortest path between any two pair of nodes, and an indication of the cost C in terms of the number of connection paths in the network. A ring network, for example, provides connections between adjacent processors in a linear organization with L=2, D=N/2, and C=N. In another example, a crossbar switch network provides complete connectivity among the nodes with L=N, D=1, and $C=N^2$. Table 1 illustrates these characteristics for a number of networks where N is a power of 2.

| Network of N nodes<br>N a power of 2 | Links<br>(L) | Diameter<br>(D) | Cost<br>(C) |
| --- | --- | --- | --- |
| Ring | 2 | N/2 | N |
| BxB Torus for $N = 2^K$<br>For K even & $B = 2^{K/2}$ | 4 | $B = 2^{K/2}$ | 2N |
| XD Hypercube for<br>$X = Log_2N$ | $Log_2N$ | $Log_2N$ | (X/2)N |
| XD ManArray hypercube<br>for X = 2k and X even | 4 | 2 | $2^{2k-1}((4 + 3^{k-1}) - 1)$ |
| Crossbar | N | 1 | $N^2$ |

FIG. 1A illustrates a prior art 4×4 torus network 100 having sixteen processor (P) elements (PEs). Each PE supports four links in the regular nearest neighborhood connection pattern shown. The diameter is four, which is the maximum shortest path between any two nodes, such as, for example, P00 and P22. The cost is thirty-two representing the thirty-two connections used to interconnect the PEs.

FIG. 1B illustrates a connectivity matrix 150 for the 4×4 torus network 100 of FIG. 1A. Each of the sixteen PEs represents a column and a row of the matrix. A "1" in a cell of the connectivity matrix 150 indicates that the row PE connects to the column PE. For example, four "1"s populate P21 row 154, indicating that P21 connects to P11, P20, P22, and P31. The connectivity matrix 150 is populated only with the nearest neighbor connections.

FIG. 2 illustrates a prior art 4×4 ManArray network 200, as illustrated in U.S. Pat. No. 6,167,502. The 4×4 ManArray network 200 has sixteen processors such as processor 1,3 (0110) 204. Each processor is connected to a local cluster switch, such as local cluster switch 208 associated with a 2×2 processor cluster, such as, 2×2 processor cluster 212. In the cluster switch are a number of multiplexers which are connected to the processors to provide the interconnecting network for the sixteen processors. For example, each of the four processors in the 2×2 processor cluster 212 connect to four multiplexers in the associated local cluster switch 208. The 4×4 ManArray network 200 has an indication of the cost C of 88 and a diameter of 2.

FIG. 3 illustrates a prior art shared memory processor 300 having processor nodes P0-Pp-1 304, memory nodes M0-Mm-1 306, input/output (I/O) nodes I/O0-I/Od-1 308 interconnected by a cross bar switch 310. The cross bar switch provides general data accessing between the processors, memory, and I/O. The processors typically interface to memory over a memory hierarchy which typically locates instruction and data caches local to the processors. The memories M0-Mm-1 typically represent higher levels of the memory hierarchy above the local caches.

The prior techniques of interconnecting memory and processors have to contend with multiple levels of communication mechanisms and complex organizations of control and networks.

SUMMARY OF THE INVENTION

It is appreciated that improvements to processor architecture, network design, and organizations of processors and memory are desired. Such improvements are provided by multiple embodiments of the present invention. In one embodiment of the present invention a network is provided. The network has groups of $A_{g,h}$ nodes, each group having a different g that is the same for each $A_{g,h}$ node in that group, $g \in \{0, 1, \ldots, G-1\}$ and for each group, $h \in \{0, 1, \ldots, H-1\}$, and each $A_{g,h}$ node operable to output an $A_{g,h}$ data value, wherein network nodes are identified according to a G×H matrix of nodes having a 1 to N adjacency of connections between adjacent nodes in each dimension which includes wrap around adjacent nodes and $G \geq N$ and $H \geq N$. The network also has groups of $R_{g,h}$ nodes, each group having a different g that is the same for each $R_{g,h}$ node in that group, $g \in \{0, 1, \ldots, G-1\}$ and for each group, $h \in \{0, 1, \ldots, H-1\}$, each group of $R_{g,h}$ nodes coupled to a corresponding group of $A_{g,h}$ nodes according to a 1 to N adjacency of connections in a first dimension, wherein each $R_{g,h}$ node is operable to select an $A_{g,h}$ data value from a coupled $A_{g,h}$ node and to output the selected $A_{g,h}$ data value as an $R_{g,h}$ data value. The network further has groups of $S_{g,h}$ nodes, each group having a different g that is the same for each $S_{g,h}$ node in that group, $g \in \{0, 1, \ldots, G-1\}$ and for each group, $h \in \{0, 1, \ldots, H-1\}$, each group of $S_{g,h}$ nodes coupled to groups of $R_{g,h}$ nodes according to a 1 to N adjacency of connections in a second dimension, wherein each $S_{g,h}$ node is operable to select an $R_{g,h}$ data value from a coupled $R_{g,h}$ node and to output the selected $R_{g,h}$ data value as an $S_{g,h}$ data value.

In another embodiment of the present invention a network is provided. The network has a plurality of A nodes, each A node identified according to its position in a D-dimensional network and operable to output an A data value, wherein the D-dimensional network is configured with nearest neighbor connectivity between adjacent nodes in each dimension of communication. The network also has a plurality of D stages, one stage for each dimension of communication of the D-dimensional network, each A node coupled to a plurality of N first stage nodes according to an adjacency of nodes in a first dimension of communication, each of the plurality of N first stage nodes coupled to a plurality of N second stage nodes according to an adjacency of nodes in a second dimension of communication, and continuing until each of a plurality of N D−1 stage nodes are coupled to a plurality of N D stage nodes according to an adjacency of nodes in a D dimension of communication, wherein each node is configured to operate on a data value received from a coupled node in a previous stage that was initiated by the A data value output from each of the A nodes.

In a further embodiment of the present invention a network comprising is provided. The network has a plurality of M nodes, each M node identified according to its position in a D-dimensional network and operable to output an M data value, wherein the D-dimensional network is configured with nearest neighbor connectivity between adjacent nodes in each dimension of communication. The network has a plurality of N first stage nodes coupled to each of the plurality of M nodes according to an adjacency of nodes in a first dimension of communication. The network also has a plurality of N second stage nodes coupled to each of the plurality of N first stage nodes according to an adjacency of nodes in a second dimension of communication. The network stages continues up to a plurality of N D stage nodes coupled to each of a plurality of N D−1 stage nodes to according to an adjacency of nodes in a D dimension of communication, wherein each coupled first stage node is configured to operate on an M data value from each coupled M node and to output a first stage node result value, each coupled second stage node is configured to operate on a result value from each coupled first stage node and to output a second stage node result value, and continuing up to each coupled D stage node is configured to operate on a result value from each coupled D−1 stage node and to output a D stage node result value.

These and other features, aspects, techniques and advantages of the invention will be apparent to those skilled in the art from the following detailed description, taken together with the accompanying drawings and claims.

BRIEF DESCRIPTION OF THE DRAWINGS

FIG. 1B illustrates a connectivity matrix for the 4×4 torus network of FIG. 1A;

FIG. 6A illustrates a connectivity matrix for store operations for the WAM16S network of FIG. 4A in accordance with the present invention;

FIG. 6B illustrates a connectivity matrix for load operations for the WAM16L network of FIG. 5A in accordance with the present invention;

FIG. 6C illustrates a connectivity matrix for communicating between processors by combining store WAM16S and load WAM16L operations in accordance with the present invention;

FIG. 16A illustrates an exemplary combined network node that combines a WAM load node and a WAM store node into a single combined node where the load and store nodes support expanded function capabilities and where FIG. 16B illustrates another alternative WAM network node constructed using three sub-node units comprising input and output interfaces and node function units in accordance with the present invention;

DETAILED DESCRIPTION

Figure 1A:
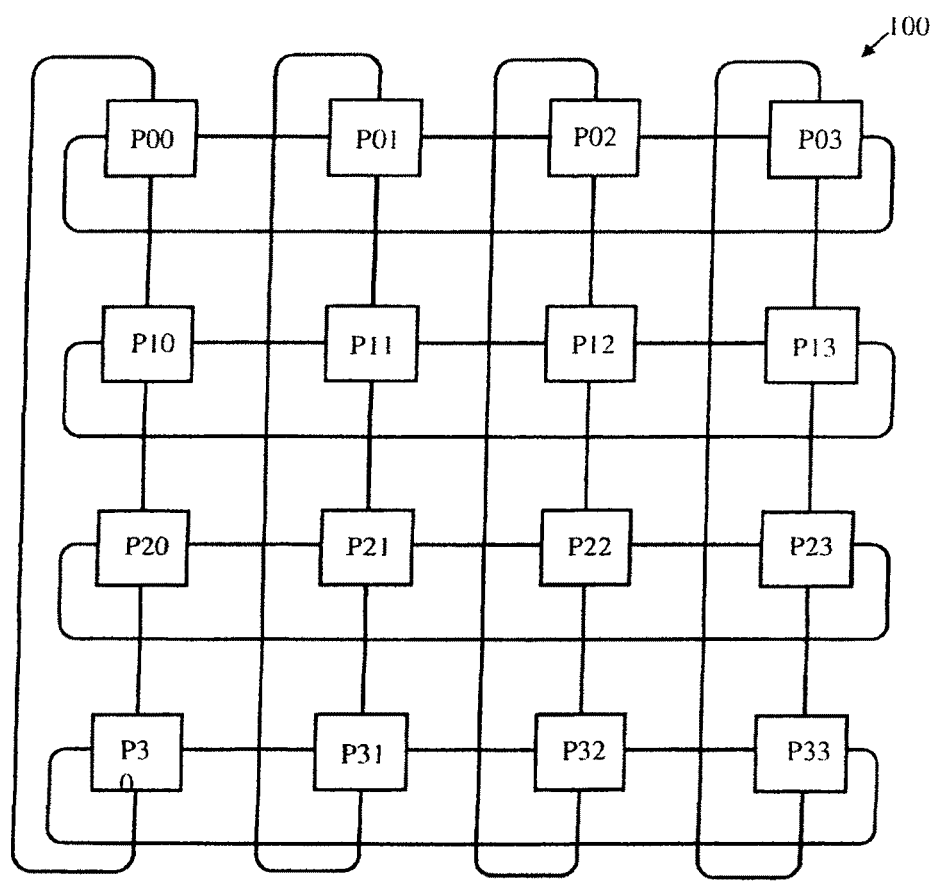
FIG. 1A illustrates a prior art 4×4 torus network having sixteen processing elements (PEs)
Figure 2:
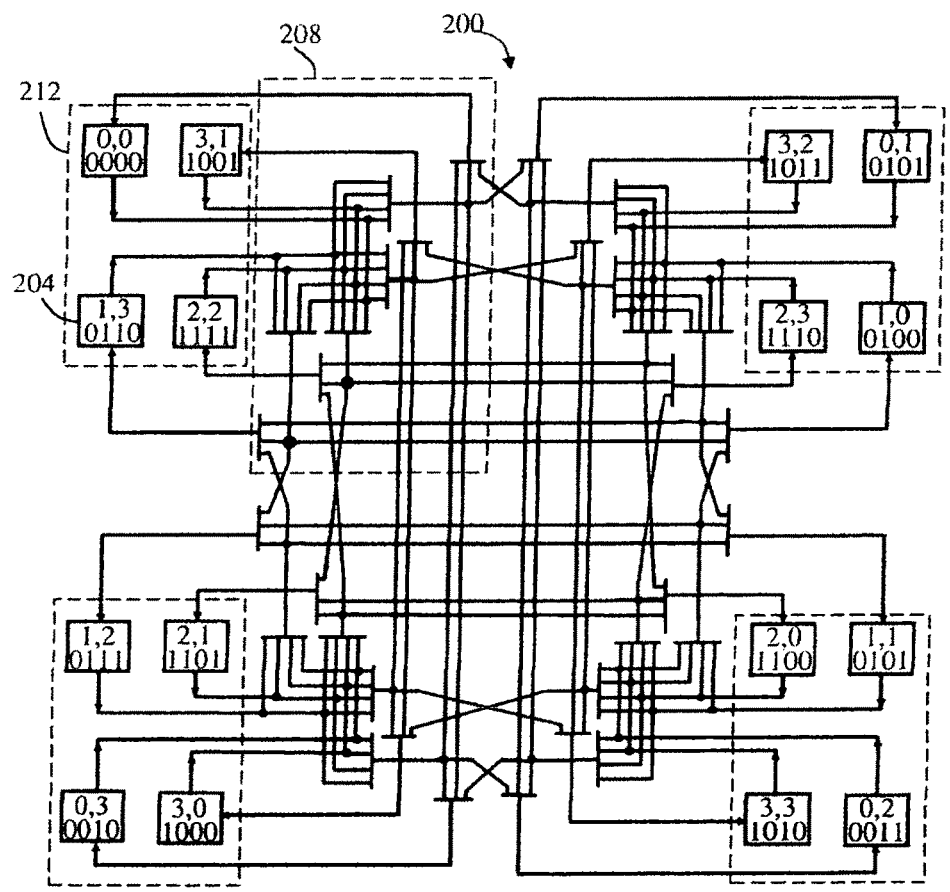
FIG. 2 illustrates a prior art 4×4 ManArray network from U.S. Pat. No. 6,167,502.
Figure 3:
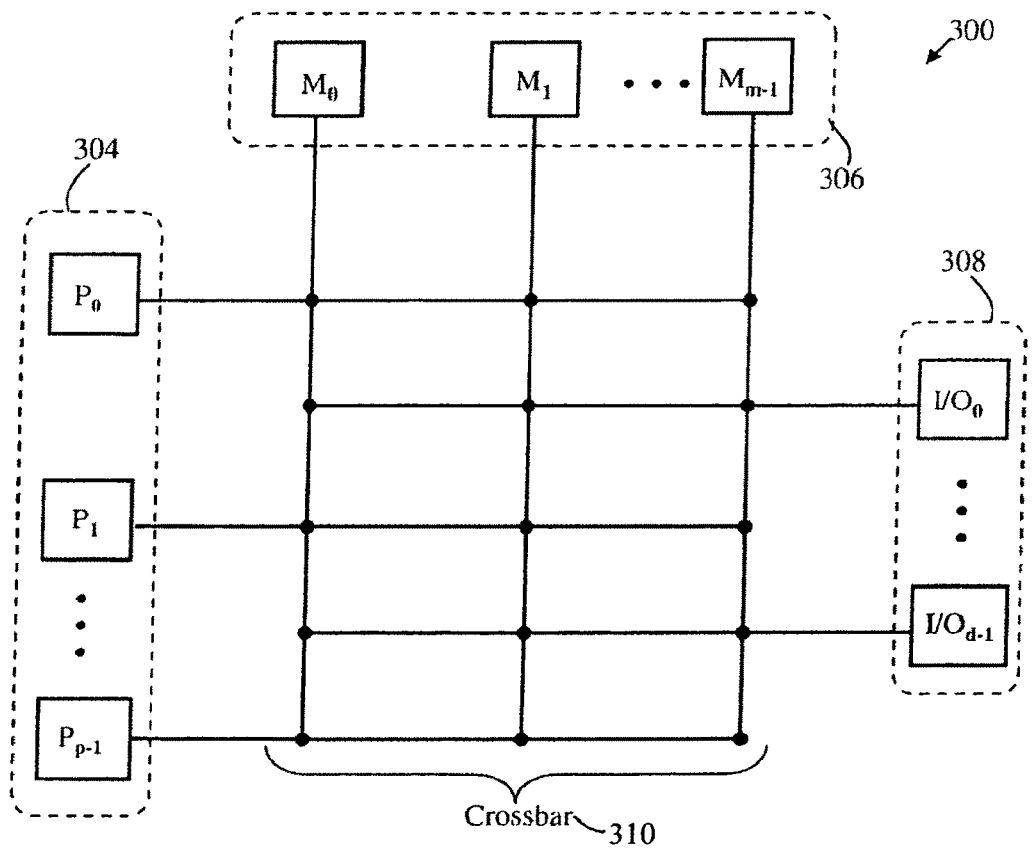
FIG. 3 illustrates a prior art shared memory processor.
Figure 4A:
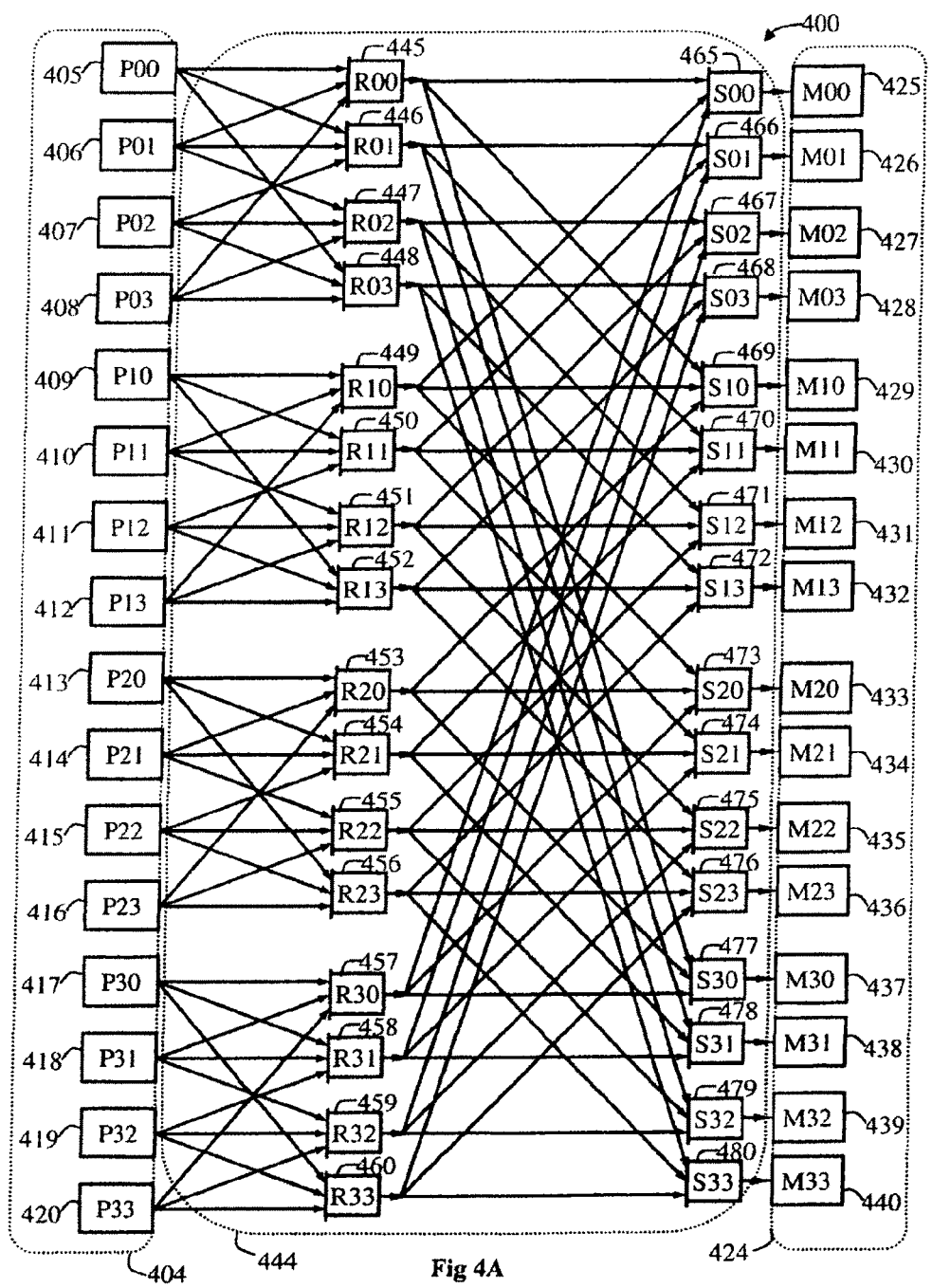
FIG. 4A illustrates a Wings array memory (WAM) sixteen processor (16) network for store (S) operations in accordance with the present invention.

FIG. 4A illustrates a Wings array memory (WAM) sixteen processor (16) (WAM16S) network 400 for store (S) operations. A processor array 404 of sixteen processors 405-420 are illustrated as nodes that each can initiate a store operation to store data in a memory location in the Wings array memory (WAM) 424 consisting of sixteen memory blocks 425-440. The processor and memory block nodes are organized in linear arrays and identified according to a G×H matrix where, in this example, G equals four representing the number of rows in the matrix and H equals four representing the number of columns. A processor $P_{g,h}$, a memory block $M_{g,h}$, and internal nodes of the network are labeled in a row g by column h format where g∈{0,1,...,G−1} and h∈{0,1,...,H−1}. The processors are not directly connected to each other nor are the memory blocks directly connected to any of the other memory blocks.

A two stage WAM network 444 interconnects the processors 405-420 and memory blocks 425-440 for store operations. A first stage of nodes are multiplexers 445-460 which are labeled in a row g by column h $R_{g,h}$ matrix. A second stage of nodes are multiplexers 465-480 which are labeled in a row g by column h $S_{g,h}$ matrix. The processors $P_{g,h}$ each have an output, memory blocks $M_{g,h}$ each have an input, and multiplexers $R_{g,h}$ and $S_{g,h}$ each have three inputs and an output. The processors $P_{g,h}$, the memory blocks $M_{g,h}$, the multiplexers $R_{g,h}$, and the multiplexers $S_{g,h}$ are labeled in the figures as Pgh, Mgh, Rgh, and Sgh, respectively, for ease of notation and reference in the figures. The first stage of multiplexers 445-460 are partitioned into groups by rows of the G=4×H=4 matrix. For example, in the first row g=0 of the processor matrix, the outputs of the processors 405-408 are connected to the inputs of the multiplexers 445-448. For the next row, g=1, the outputs of the processors 409-412 are connected to the inputs of the multiplexers 449-452. The next row, g=2, the outputs of the processors 413-416 are connected to the inputs of the multiplexers 453-456. The last row, g=3, processors 417-420 are connected to multiplexers 457-460.

In each group, the connections are made according to an adjacency of nodes in a first dimension, for example, P00 405 is connected to R00 445, R01 446, and R03 448. P01 406 is connected to R00 445, R01 446, and R02 447. P02 407 is connected to R01 446, R02 447, and R03 448. P03 408 is connected to R00 445, R02 447, and R03 448. Each processor in the second row group P10-P13 409-412, third row group P20-P23 413-416, and fourth row group P30-P33 417-420, are connected in a similar fashion according to their row adjacency to second row multiplexers R10-R13 449-452, third row multiplexers R20-R23 453-456, and fourth row multiplexers R30-R33 457-460, respectively.

The first stage multiplexers 445-460 are connected to the second stage multiplexers 465-480 according to an adjacency of nodes in a second dimension, for example, the output of the multiplexer node R00 445 is connected to the inputs of the multiplexer nodes S00 465, S10 469, and S30 477. In a similar fashion, R01 446 is connected to S01 466, S11 470, and S31 478. R02 447 is connected to S02 467, S12 471, and S32 479. R03 448 is connected to S03 468, S13 472, and S33 480. The multiplexers in the second row group R10-R13 449-452 are connected to the second stage multiplexers according to their column adjacency, such that, R10 449 is connected to S00 465, S10 469, and S20 473, R11 450 is connected to S01 466, S11 470, and S21 474, R12 451 is connected to S02 467, S12 471, and S22 475, and R13 452 is connected to S03 468, S13 472, and S23 476. The third row group R20-R23 453-456 and the fourth row group R30-R33 457-460 are connected in a similar fashion according to their column adjacency associated second stage multiplexers from the multiplexers 465-480.

Each output of the second stage multiplexers connects to the input of their associated memory block at the same row column position. For example, the output of the multiplexer S00 465 connects to the input of the memory block M00 425, the output of the multiplexer S01 466 connects to the input of the memory block M01 426, and so forth. A processor executing a store operation can write data to a single memory block or combinations of up to nine memory blocks from the memory array 424. For example, processor P21 can store data to memories in its connected group of memory blocks M10 429, M20 433, M30 437, M11 430, M21 434, M31 438, M12 431, M22 435, and M32 439.

The adjacency of nodes is represented by a G×H matrix where the nodes of the matrix may be processors, memory blocks, multiplexers, or the like, generally, having nodes $N_{g,h}$ where $g \in \{0,1,\ldots,G-1\}$ and $h \in \{0,1,\ldots,H-1\}$. A connection network, such as the WAM16S network 400 of FIG. 4A, may be generalized as having a first set of nodes, such as processor nodes $P_{g,h}$, for example, connects to a second set of nodes $R_{g,h}$ which connects to a third set of nodes $S_{g,h}$. The third set of nodes $S_{g,h}$ then connects to a fourth set of nodes, such as memory block nodes $M_{g,h}$, for example. The store connectivity of the nodes can be viewed as having nodes $R_{g,h}$ connect as follows:

| Inputs of Node | Connects to the outputs of the Nodes | Where |
|---|---|---|
| $R_{g,h}$ | $P_{g,h}, P_{g,h+1}$, and $P_{g,h-1}$ | h + 1 wraps to 0 when h + 1 = H and h − 1 wraps to H − 1 when h − 1 = −1 |

The nodes $S_{g,h}$ connect as follows:

| Inputs of Node | Connects to the outputs of the Nodes | Where |
|---|---|---|
| $S_{g,h}$ | $R_{g,h}, R_{g+1,h}$, and $R_{g-1,h}$ | g + 1 wraps to 0 when g + 1 = G and g − 1 wraps to G − 1 when g − 1 = −1 |

The nodes $M_{g,h}$ connect as follows:

| Input of Node | Connects to the output of the Node |
|---|---|
| $M_{g,h}$ | $S_{g,h}$ |

For the example WAM16S network 400 of FIG. 4A, the nodes $R_{g,h}$ connect as follows:

| Inputs of Node | Connects to the outputs of the Nodes | Where |
|---|---|---|
| $R_{g,h}$ | $P_{g,h}, P_{g,h+1}$, and $P_{g,h-1}$ | h + 1 wraps to 0 when h + 1 = 4 and h − 1 wraps to 4 − 1 = 3 when h − 1 = −1 |

The nodes $S_{g,h}$ connect as follows:

| Inputs of Node | Connects to the outputs of the Nodes | Where |
|---|---|---|
| $S_{g,h}$ | $R_{g,h}, R_{g+1,h}$, and $R_{g-1,h}$ | g + 1 wraps to 0 when g + 1 = 4 and g − 1 wraps to 4 − 1 = 3 when g − 1 = −1 |

The nodes $M_{g,h}$ connect as follows:

| Input of Node | Connects to the output of the Node |
|---|---|
| $M_{g,h}$ | $S_{g,h}$ |

The store connectivity of the nodes can also be viewed as having nodes $P_{g,h}$ connect as follows:

| Output of Node | Connects to an input of the Nodes | Where |
|---|---|---|
| $P_{g,h}$ | $R_{g,h}, R_{g,h+1}$, and $R_{g,h-1}$ | h + 1 wraps to 0 when h + 1 = H and h − 1 wraps to H − 1 when h − 1 = −1 |

The nodes $R_{g,h}$ connect as follows:

| Output of Node | Connects to an input of the Nodes | Where |
| --- | --- | --- |
| $R_{g,h}$ | $S_{g,h}$, $S_{g+1,h}$, and $S_{g-1,h}$ | g + 1 wraps to 0 when g + 1 = G and g − 1 wraps to G − 1 when g − 1 = −1 |

The nodes $S_{g,h}$ connect as follows:

| Output of Node | Connects to the input of the Node |
| --- | --- |
| $S_{g,h}$ | $M_{g,h}$ |

Figure 4B:
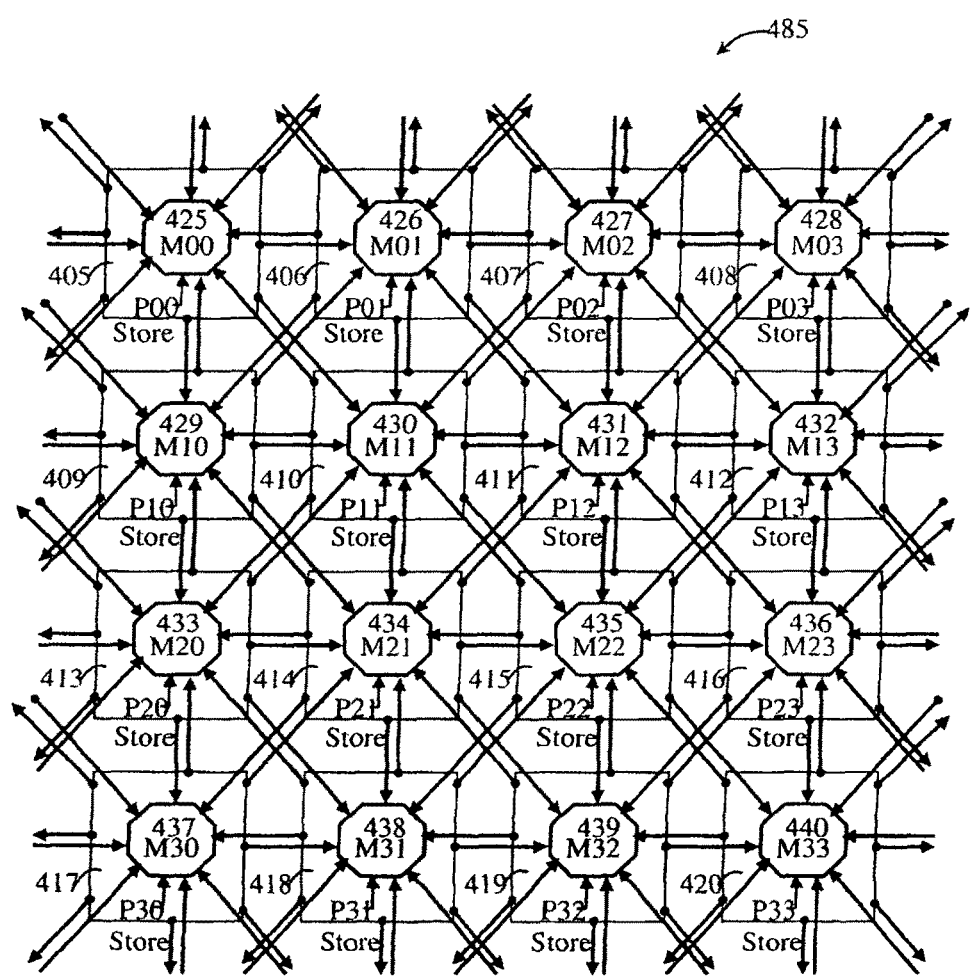
FIG. 4B illustrates the effective store connectivity of the WAM16S network of FIG. 4A in accordance with the present invention.

This store connectivity is more clearly shown in FIG. 4B which illustrates the effective store connectivity 485 of the WAM16S network 400 of FIG. 4A. FIG. 4B is an overhead view of the memory array 424 of FIG. 4A (octagonal blocks) overlaid upon the processor array 404 of FIG. 4A (square blocks). The effective store paths between processors and memories are obtained through the use of the two stage WAM network 444 of FIG. 4A. Such effective store paths are shown as arrow lines connecting a processor to a memory block. A store path between processor $P_{g,h}$ and memory $M_{g,h}$, such as between P21 414 and M21 434, is shown as a short arrow line beginning from the processor label $P_{g,h}$ and pointing to the memory $M_{g,h}$ block. Each memory block can be reached for storing data from a neighborhood of nine processors.

Figure 5A:
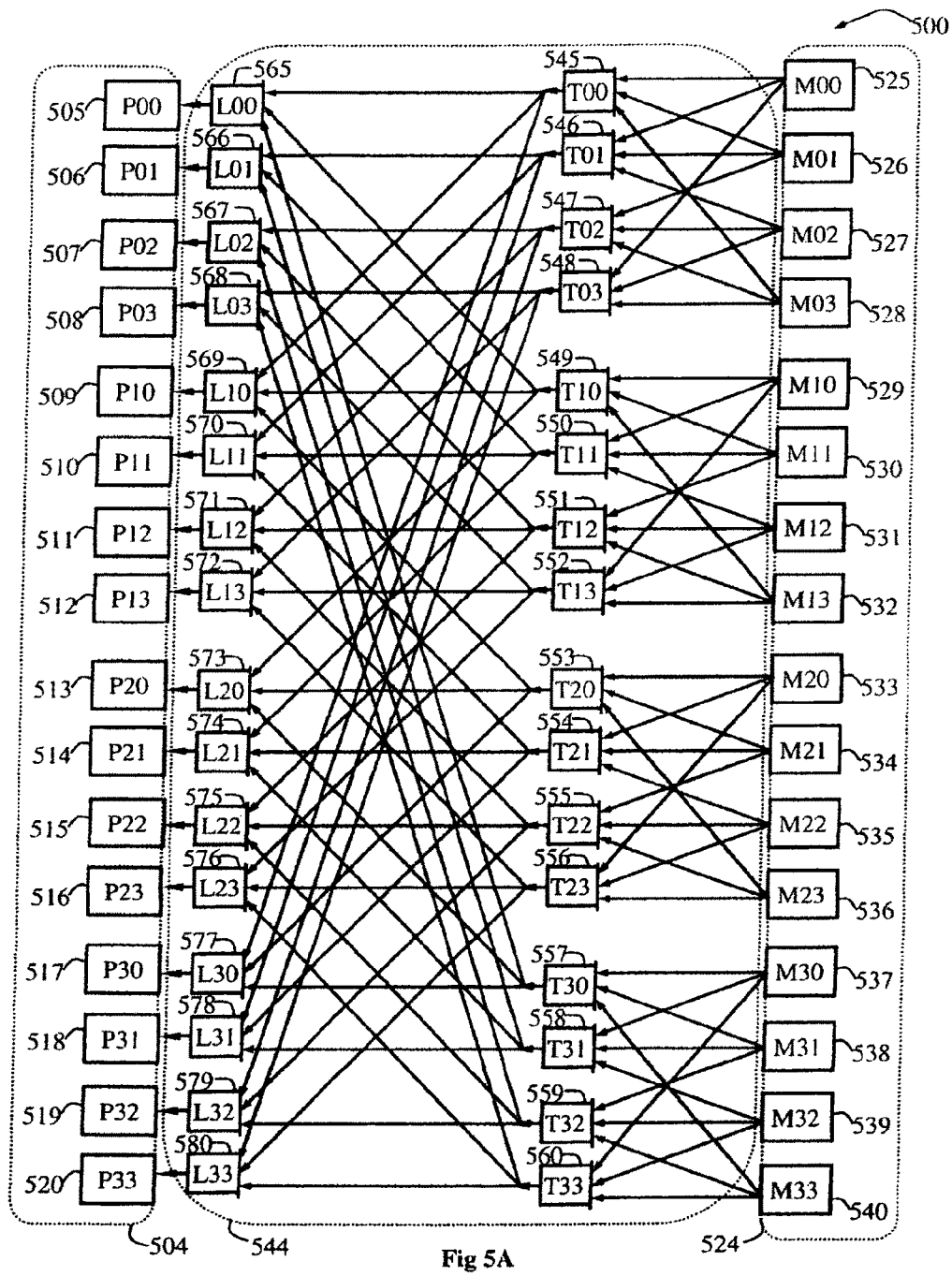
FIG. 5A illustrates a WAM16 load (L) network for load operations in accordance with the present invention.

FIG. 5A illustrates a Wings array memory (WAM) sixteen processor (16) (WAM16L) network 500 for load (L) operations. A processor array 504 of sixteen processors 505-520 are illustrated as nodes that each can initiate a load operation to fetch data from a memory location in the Wings array memory (WAM) 524 consisting of sixteen memory blocks 525-540. The processor and memory block nodes are organized in a linear array and identified according to a G×H matrix where G equals four representing the number of rows in the matrix and H equals four representing the number of columns. A processor $P_{g,h}$ and a memory block $M_{g,h}$ are labeled in a row g by column h format where g∈{0,1, . . . , G−1} and h∈{0,1, . . . , H−1}. The processors are not directly connected to each other nor are the memory blocks directly connected to any of the other memory blocks.

A two stage WAM network 544 interconnects the processors 505-520 and memory blocks 525-540 for load operations. A first stage of nodes are multiplexers 545-560 which are labeled in a row column $T_{g,h}$ matrix. A second stage of nodes are multiplexers 565-580 which are labeled in a row column $L_{g,h}$ matrix. The processors $P_{g,h}$ each have an input, memory blocks $M_{g,h}$ each have an output, and multiplexers $T_{g,h}$ and $L_{g,h}$ each have three inputs and an output. The processors $P_{g,h}$, the memory blocks $M_{g,h}$, the multiplexers $T_{g,h}$, and the multiplexers $L_{g,h}$ are labeled in the figures as Pgh, Mgh, Tgh, and Lgh, respectively, for ease of notation and reference in the figures. The first stage of multiplexers 545-560 are partitioned into groups by rows of the G=4×H=4 matrix. For example, in the first row g=0 of the memory matrix, memories 525-528 are connected to multiplexers 545-548. For the next row, g=1, memories 529-532 are connected to multiplexers 549-552. The next row, g=2, memories 533-536 are connected to multiplexers 553-556. The last row, g=3, memories 537-540 are connected to multiplexers 557-560.

In each group, the connections are made according to an adjacency of nodes in a first dimension, for example, M00 525 is connected to T00 545, T01 546, and T03 548. M01 526 is connected to T00 545, T01 546, and T02 547. M02 527 is connected to T01 546, T02 547, and T03 548. M03 528 is connected to T00 545, T02 547, and T03 548. Each memory block in the second row group M10-M13 529-532, third row group M20-M23 533-536, and fourth row group M30-M33 537-540, are connected in a similar fashion according to their row adjacency to second row multiplexers T10-T13 549-552, third row multiplexers T20-T23 553-556, and fourth row multiplexers T30-T33 557-560, respectively.

The first stage multiplexers 545-560 are connected to the second stage multiplexers 565-580 according to an adjacency of nodes in a second dimension, for example, T00 545 is connected to L00 565, L10 569, and L30 577. T01 546 is connected to L01 566, L11 570, and L31 578. T02 547 is connected to L02 567, L12 571, and L32 579. T03 548 is connected to L03 568, L13 572, and L33 580. The multiplexers in the second row group T10-T13 549-552 are connected to the second stage multiplexers according to their column adjacency, such that, T10 549 is connected to L00 565, L10 569, and L20 573, T11 550 is connected to L01 566, L11 570, and L21 574, T12 551 is connected to L02 567, L12 571, and L22 575, and T13 552 is connected to L03 568, L13 572, and L23 576. The third row group T20-T23 553-556 and the fourth row group T30-T33 557-560 are connected in a similar fashion according to their column adjacency associated second stage multiplexers.

Each output of the second stage multiplexers connects to the load input of their associated processors at the same row column position. For example, the output of the multiplexer L00 565 connects to the input of processor P00 505, the output of the multiplexer L01 566 connects to the input of processor P01 506, and so forth. A processor executing a load operation can select a memory block from a group of nine memory blocks to fetch data from the selected memory block. For example, processor P21 514 can load data from memories in its connected group of memory blocks M10 529, M20 533, M30 537, M11 530, M21 534, M31 538, M12 531, M22 535, and M32 539. Load addresses may follow connection paths in a network configuration such as the WAM16S network 400 of FIG. 4A, for example to provide memory addresses to selected memories as part of a load operation. Alternative methods to handle address paths is discussed in more detail below.

The adjacency of nodes is represented by a G×H matrix where the nodes of the matrix may be processors, memory blocks, multiplexers, or the like, generally, having nodes $N_{g,h}$ where g∈{0,1, . . . ,G−1} and h∈{0,1, . . . ,H−1}. A connection network, such as the WAM16L network 500 of FIG. 5A, may be generalized as having a first set of nodes, such as memory nodes $M_{g,h}$, for example, connects to a second set of nodes $T_{g,h}$ which connects to a third set of nodes $L_{g,h}$. The third set of nodes $L_{g,h}$ then connects to a fourth set of nodes, such as processor nodes $P_{g,h}$, for example. The load connectivity of the nodes can be viewed as having nodes $T_{g,h}$ connect as follows:

| Inputs of Node | Connects to the outputs of the Nodes | Where |
| --- | --- | --- |
| $T_{g,h}$ | $M_{g,h}$, $M_{g,h+1}$, and $M_{g,h-1}$ | h + 1 wraps to 0 when h + 1 = H and h − 1 wraps to H − 1 when h − 1 = −1 |

The nodes $L_{g,h}$ connect as follows:

| Inputs of Node | Connects to the outputs of the Nodes | Where |
|---|---|---|
| $L_{g,h}$ | $T_{g,h}, T_{g+1,h},$ and $T_{g-1,h}$ | g + 1 wraps to 0 when g + 1 = G and g − 1 wraps to G − 1 when g − 1 = −1 |

The nodes $P_{g,h}$ connect as follows:

| Input of Node | Connects to the output of the Node |
|---|---|
| $P_{g,h}$ | $L_{g,h}$ |

For the example WAM16L network 500 of FIG. 5A, the nodes $T_{g,h}$ connect as follows:

| Inputs of Node | Connects to the outputs of the Nodes | Where |
|---|---|---|
| $T_{g,h}$ | $M_{g,h}, M_{g,h+1},$ and $M_{g,h-1}$ | h + 1 wraps to 0 when h + 1 = 4 and h − 1 wraps to 4 − 1 = 3 when h − 1 = −1 |

The nodes $L_{g,h}$ connect as follows:

| Inputs of Node | Connects to the outputs of the Nodes | Where |
|---|---|---|
| $L_{g,h}$ | $T_{g,h}, T_{g+1,h},$ and $T_{g-1,h}$ | g + 1 wraps to 0 when g + 1 = 4 and g − 1 wraps to 4 − 1 = 3 when g − 1 = −1 |

The nodes $P_{g,h}$ connect as follows:

| Input of Node | Connects to the output of the Node |
|---|---|
| $P_{g,h}$ | $L_{g,h}$ |

Figure 5B:
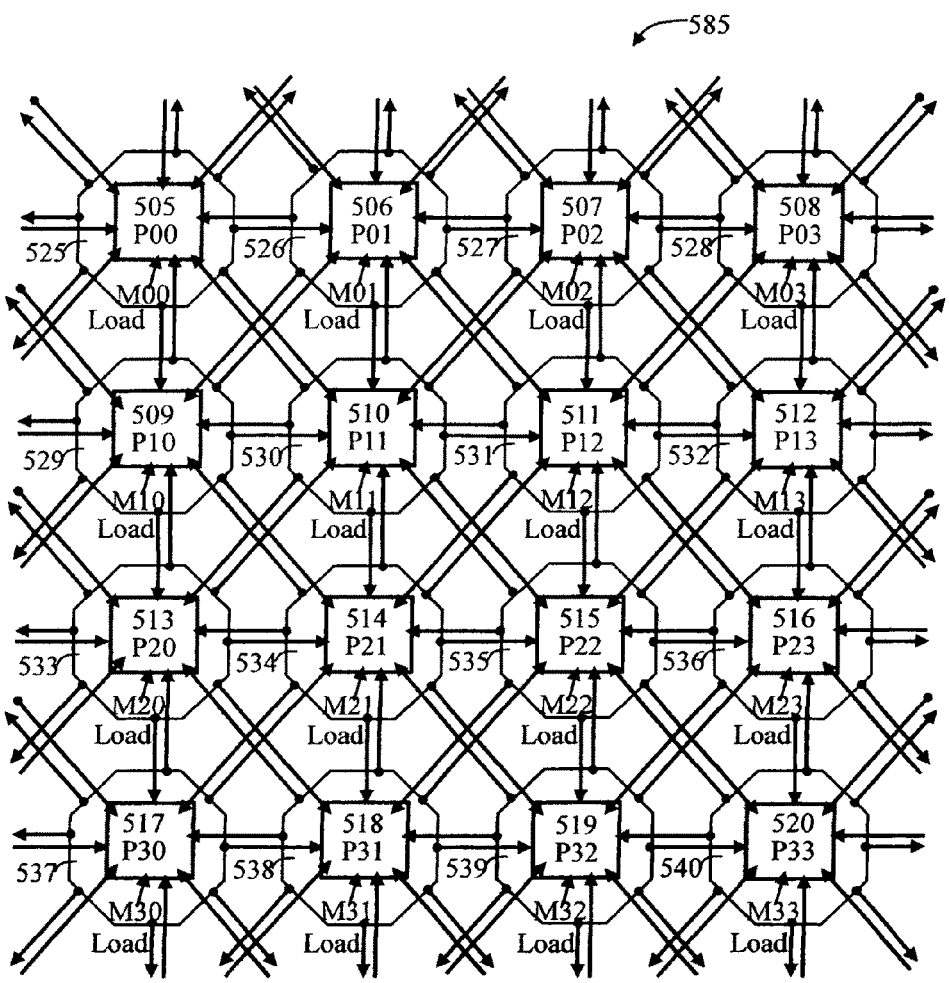
FIG. 5B illustrates the effective load connectivity of the WAM16L network of FIG. 5A in accordance with the present invention.

This load connectivity is more clearly shown in FIG. 5B which illustrates the effective load connectivity 585 of the WAM16S network 500 of FIG. 5A. FIG. 5B is an overhead view of the processor array 504 of FIG. 5A (square blocks) overlaid upon the memory array 524 of FIG. 5A (octagonal blocks). The effective load paths between memories and processors are obtained through the use of the two stage WAM network 544 of FIG. 5A. Such effective load paths are shown as arrow lines connecting a memory block to a processor. A load path between memory $M_{g,h}$ and processor $P_{g,h}$, such as between M21 534 and P21 514, is shown as a short arrow line beginning from the memory $M_{g,h}$ block and pointing to the processor $P_{g,h}$. Each processor can be reached by loading data from a neighborhood of nine memory blocks.

FIG. 6A illustrates a store connectivity matrix 600 for store operations for the WAM16S network 400 of FIG. 4A. The processors are organized in the same linear order as the processor array 404 shown in the WAM16S network 400. The memories are organized in the same linear order as the Wings array memory (WAM) 424 shown in the WAM16S network 400. In addition to the processor and memory labels used in the WAM16S network 400, the processors and memories have a Gray encoded label underneath the $P_{g,h}$ and $M_{g,h}$ labels. A 1 in a cell of the store connectivity matrix 600 indicates that a processor on the same row as the cell has a store connection to a memory block on the same column as the cell. For example, the connectivity of the processors in processor group 602 having processors P10, P11, P12, and P13 connecting to memory blocks in the three memory block groups 604, 606, and 608 is indicated by "1s" as connection points in circled connection sub-matrices 610, 612, and 614.

FIG. 6B illustrates a load connectivity matrix 630 for load operations for the WAM16L network 500 of FIG. 5A. The processors are organized in the same order as the processor array 504 in the WAM16L network 500. The memories are organized in the same linear order as the Wings array memory (WAM) 524 shown in the WAM16L network 500. In addition to the processor and memory labels used in the WAM16L network 500, the processors and memories have a Gray encoded label underneath the $P_{g,h}$ and $M_{g,h}$ labels. A 1 in a cell indicates that a memory block on the same row as the cell has a load connection to a processor on the same column as the cell.

FIG. 6C illustrates a connectivity matrix 670 for communicating between processors by combining store operations on the WAM16S network 400 and load operations on the WAM16L network 500. The connectivity matrix 670 is obtained by multiplying the store connectivity matrix 600 with the load connectivity matrix 630. Such multiplication produces the completely connected matrix 670 shown in FIG. 6C. The advantage indicated by the completely connected matrix 670 is that complete connectivity is achieved with less connection cost than a cross bar switch. It is also possible to pipeline stores and loads such that an effective shortened cycle communication throughput may be obtained while still achieving complete connectivity. For example, with store and load execution times of a single cycle, an effective single cycle communication throughput may be obtained by overlapping store and load operations using software pipelining methods.

Figure 7:
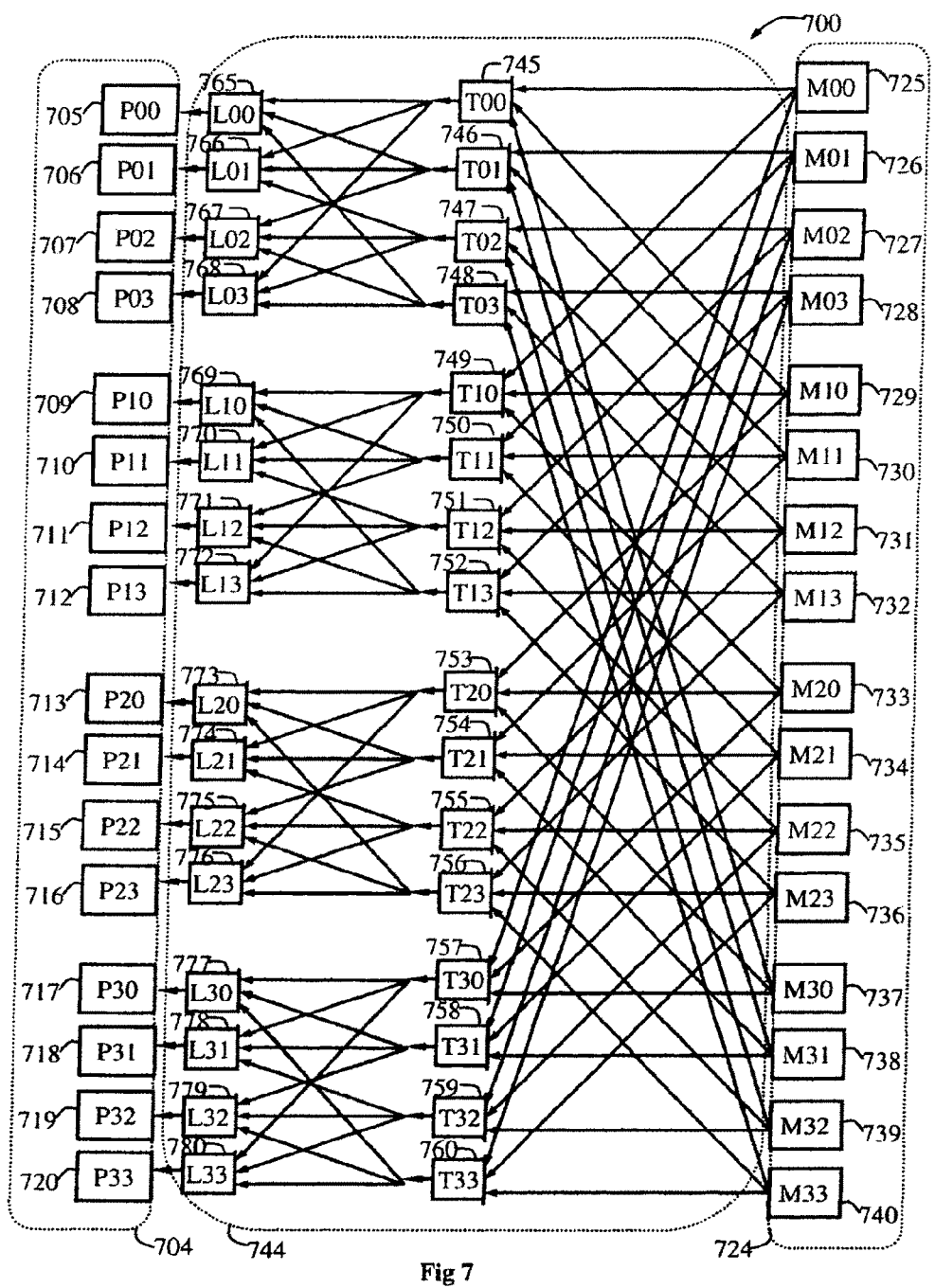
FIG. 7 illustrates an alternative WAM16L network for the purpose of showing the symmetric nature of the WAM network in accordance with the present invention.

FIG. 7 illustrates an alternative WAM16L network 700 for the purpose of showing the symmetric nature of the WAM network. Both the WAM16L network 500 and the WAM16L network 700 have the same load connectivity matrix and can be used interchangeably.

The adjacency of nodes is represented by a G×H matrix where the nodes of the matrix may be processors, memory blocks, multiplexers, or the like having nodes $N_{g,h}$ where g∈{0,1, . . . ,G-1} and h∈{0,1, . . . ,H-1}. A connection network, such as the alternative WAM16L network 700 of FIG. 7, may be generalized as having a first set of nodes, such as memory nodes $M_{g,h}$, for example, connects to a second set of nodes $T_{g,h}$ which connects to a third set of nodes $L_{g,h}$. The third set of nodes $L_{g,h}$ then connects to a fourth set of nodes, such as processor nodes $P_{g,h}$, for example. The load connectivity of the nodes can be viewed as having nodes $T_{g,h}$ connect as follows:

| Inputs of Node | Connects to the outputs of the Nodes | Where |
|---|---|---|
| $T_{g,h}$ | $M_{g,h}, M_{g+1,h},$ and $M_{g-1,h}$ | g + 1 wraps to 0 when g + 1 = G and g − 1 wraps to G − 1 when g − 1 = −1 |

The nodes $L_{g,h}$ connect as follows:

| Inputs of Node | Connects to the outputs of the Nodes | Where |
|---|---|---|
| $L_{g,h}$ | $T_{g,h}, T_{g,h+1}$, and $T_{g,h-1}$ | h + 1 wraps to 0 when h + 1 = H and h − 1 wraps to H − 1 when h − 1 = −1 |

The nodes $P_{g,h}$ connect as follows:

| Input of Node | Connects to the output of the Node |
|---|---|
| $P_{g,h}$ | $L_{g,h}$ |

Figure 8A:
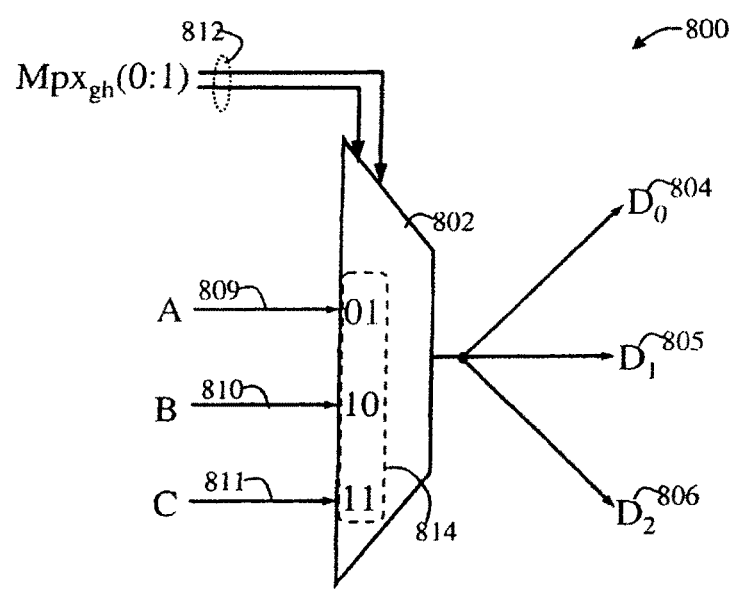
FIG. 8A illustrates a construction of a WAM network node using a four to one multiplexer with a fan out to three locations in accordance with the present invention.

FIG. 8A illustrates a WAM network node 800 constructed using a three to one multiplexer 802 with a fan out to three locations 804-806. The multiplexer has three inputs 809-811 as selected by $mpx_{gh}(0:1)$ control signals 812. The states of the control signals 812 are shown in columnar format 814 inside the multiplexer 802. When the control signals 812 are in a specific state, the input associated with that state is transferred to the multiplexer output that fans out to three places 804-806. For example, multiplexer control signals 812 set at "10" cause the value on input 810 to be sent to the three fan out locations 804-806. The WAM network node 800 would be suitable for using as nodes in the WAM16S Rxx nodes 445-460 of FIG. 4A, Sxx nodes 465-480 of FIG. 4A, WAM16L Txx nodes 545-560 of FIG. 5A, Lxx nodes 565-580 of FIG. 5A, alternative WAM16L Txx nodes 745-760 of FIG. 7, and Lxx nodes 765-780 of FIG. 7.

Figure 8B:
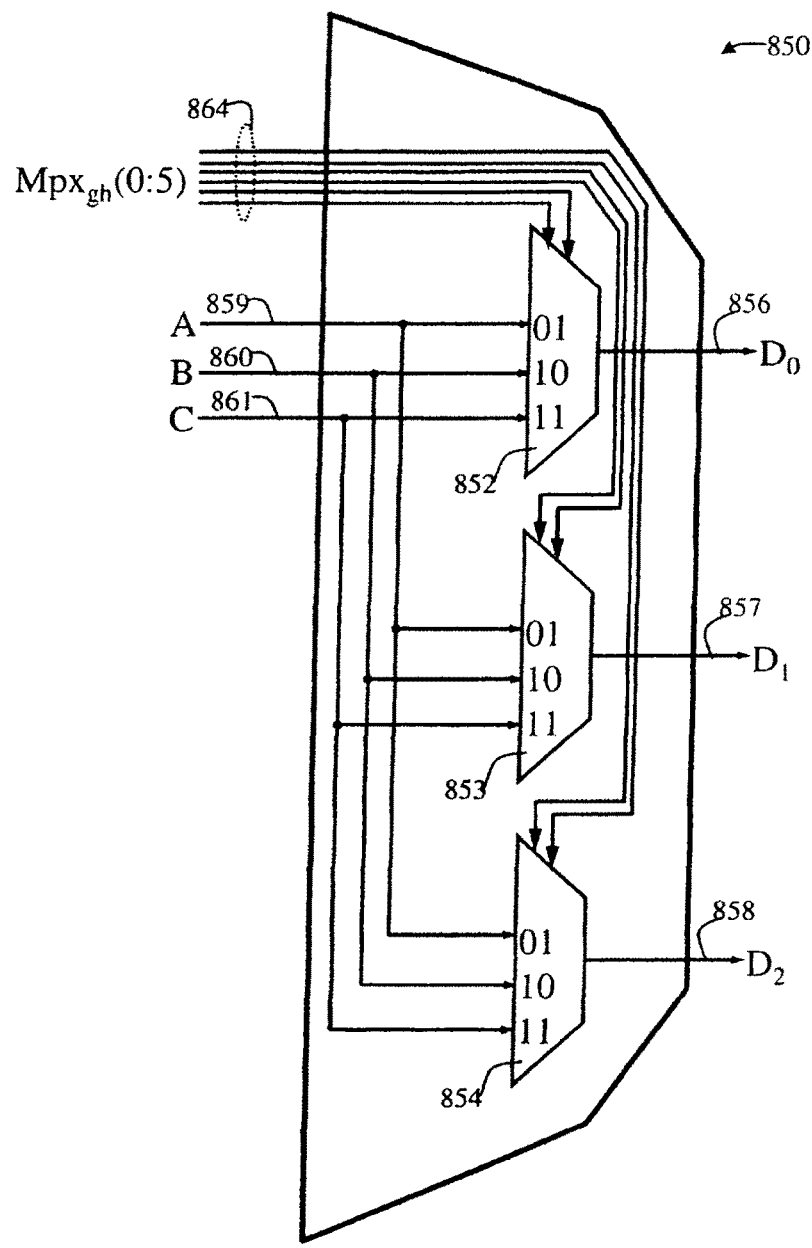
FIG. 8B illustrates an alternative construction of a WAM network node using three four to one multiplexers each with a single fan out to a separate location in accordance with the present invention.

FIG. 8B illustrates an alternative WAM network node 850 constructed using three three to one multiplexers 852-854 each with a single fan out 856-858 to a separate location. The external inputs 859-861 to the alternative WAM network node 850 have the same source as the input signals 809-811 of the WAM network node 800 of FIG. 8A. Each output 856-858 of the alternative WAM network node 850 is separately sourced by its associated multiplexer 852-854, respectively. Since there are three 3 to 1 multiplexers 852-854 in the alternative WAM network node 850, there are three sets of control signals with two lines each comprising mpxgh(0:5) 864 required to appropriately control the three multiplexers 852-854.

Figure 9A:
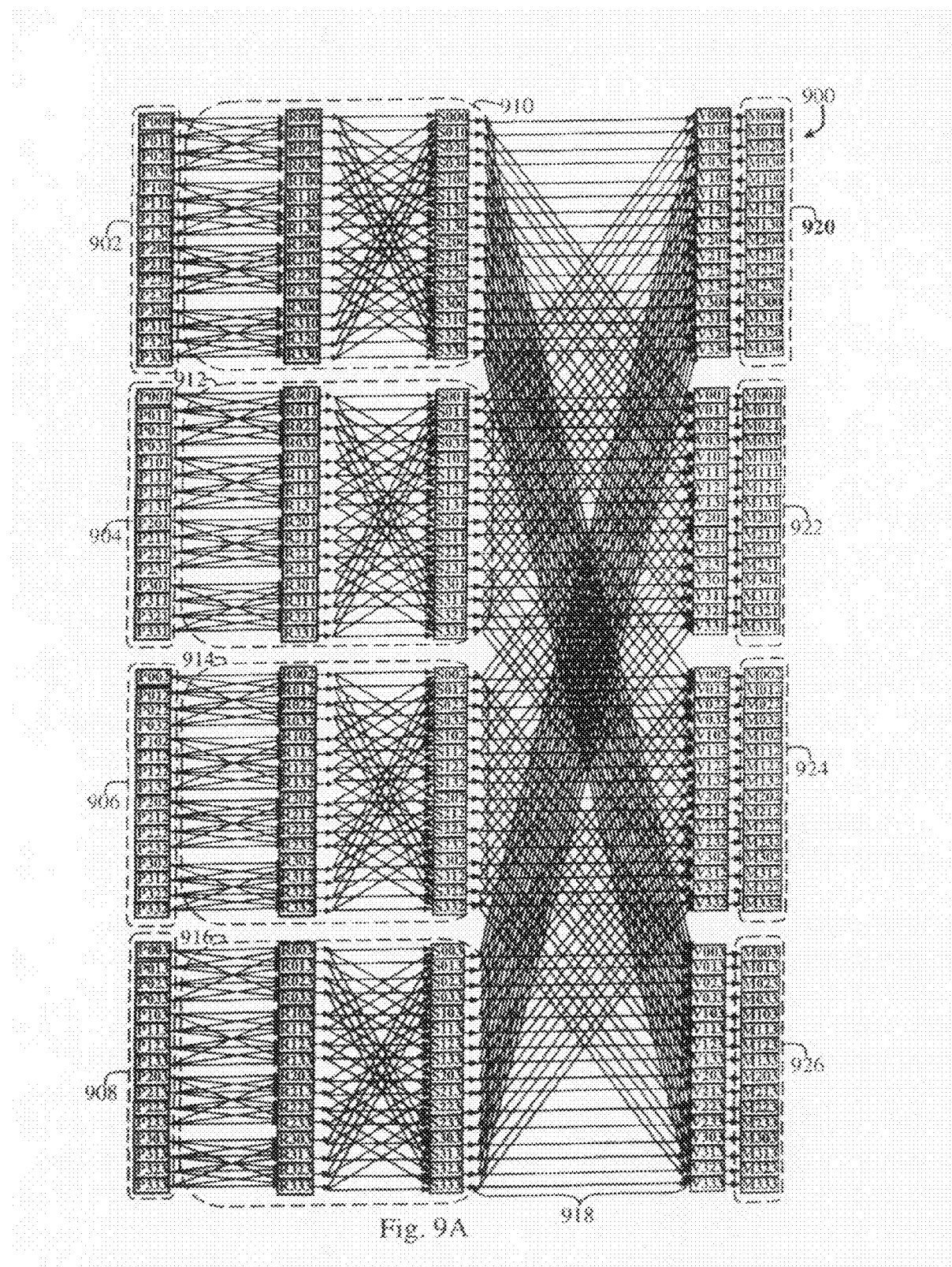
FIG. 9A illustrates a WAM sixty-four processor (64) store (WAM64S) network showing the scalable nature of the Wings array memory network in accordance with the present invention.

FIG. 9A illustrates a WAM sixty-four processor (64) store (WAM64S) network 900 showing the scalable nature of the Wings array memory network. Each group of 16 processors 902, 904, 906, and 908 are connected to a WAM16S network 910, 912, 914, and 916, respectively. The WAM16S networks 910, 912, 914, and 916 are of the same type as the WAM16S network 400. Note that the processor notation, the multiplexer node notation, and the memory notation are based on G×H×K 3 dimensional (3D) cube organization, where G represents the number of rows on a plane, H represents the number of columns on the plane, and K represents the number of planes in the 3D cube organization. A processor $P_{g,h,k}$, a memory $M_{g,h,k}$, a node $R_{g,h,k}$, a node $S_{g,h,k}$, and a node $V_{g,h,k}$ are labeled in a row g by column h by plane k format where $g \in \{0,1,\ldots,G-1\}$, $h \in \{0,1,\ldots,H-1\}$, and $k \in \{0,1,\ldots,K-1\}$. The WAM 64S network has G=4, H=4, and K=4. The processors $P_{g,h,k}$, the memory blocks $M_{g,h,k}$, the multiplexers $R_{g,h,k}$, the multiplexers $S_{g,h,k}$, and the multiplexers $V_{g,h,k}$ are labeled in the figures as Pghk, Mghk, Rghk, Sghk, and Vghk, respectively, for ease of notation and reference in the figures. The WAM64S network has three stages, two stages for the four WAM16S networks 910, 912, 914, and 916 and one stage 918 for the K planes that connects to the 64 memory blocks 920, 922, 924, and 926. A WAM64L network would be symmetric to the WAM64S network 900 in the same manner that the WAM16L network 700 is symmetric to the WAM16S network 400.

Figure 9B:
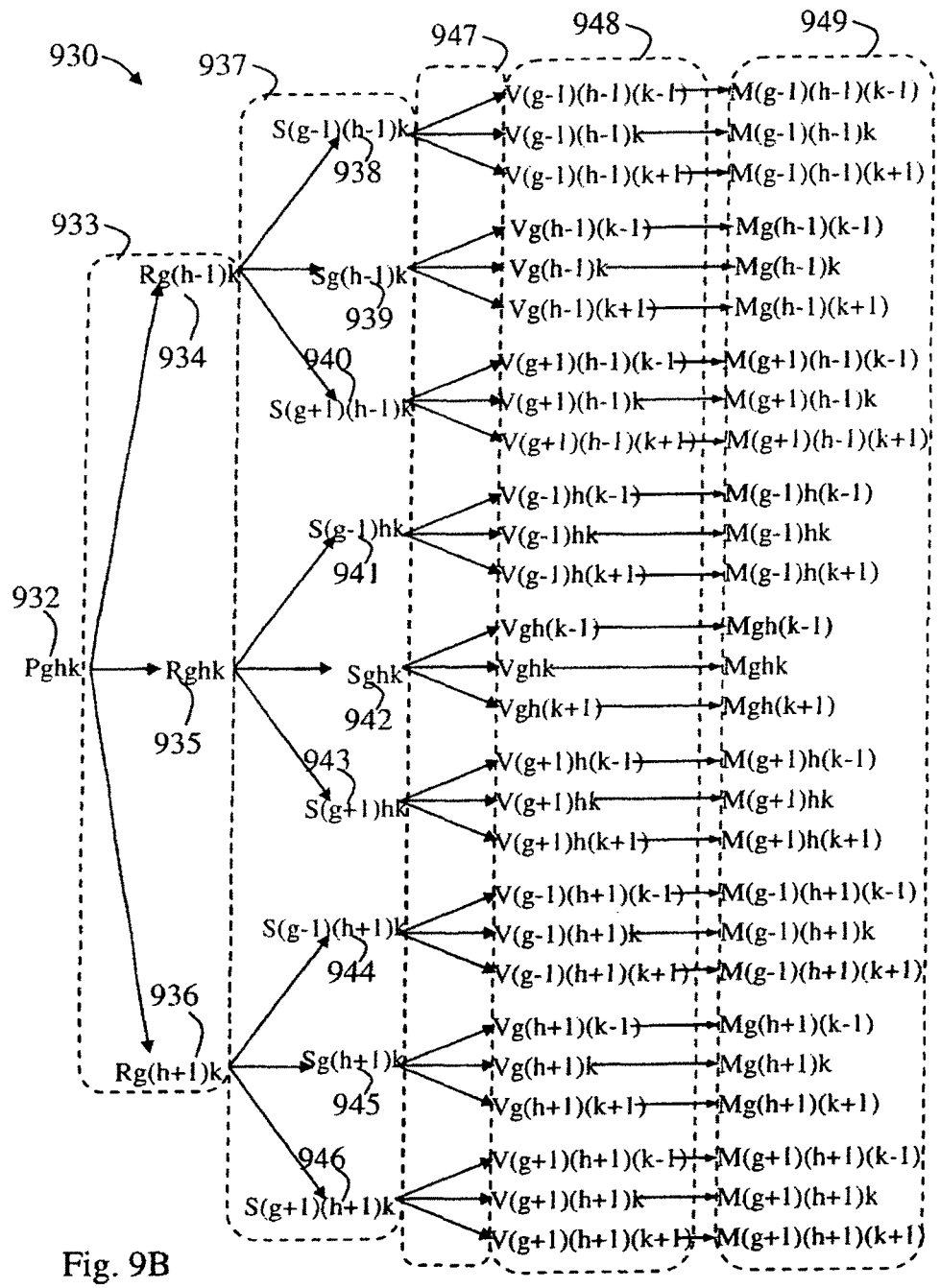
FIG. 9B illustrates a general form of a store path selected from the WAM64S network of FIG. 9A in accordance with the present invention.

FIG. 9B illustrates a general form of a store path 930 selected from the WAM64S network 900. The store path begins at $P_{g,h,k}$ 932 connecting to a first stage 933 of a WAM16S network to three R nodes 934-936. The three R nodes 934-936 connect to a second stage 937 of the WAM16S network to nine S nodes 938-946. The nine S nodes 938-946 connect through a WAM network stage 947 to twenty seven V nodes 948 that each connect directly to a corresponding memory block in the twenty seven memory blocks 949.

Figure 9C:
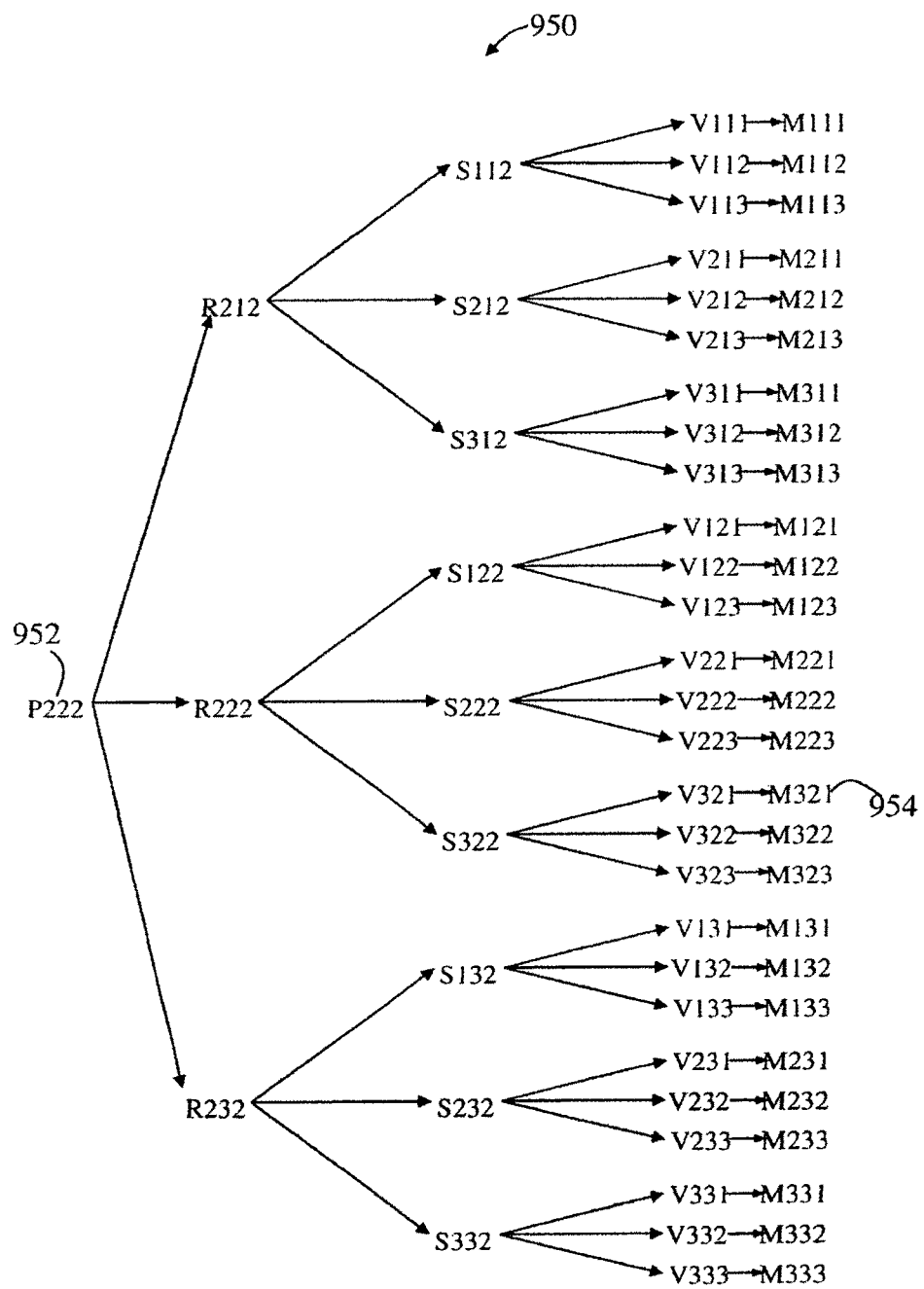
FIG. 9C illustrates a store path selected from the WAM64S network of FIG. 9A in accordance with the present invention.

FIG. 9C illustrates a store path 950 selected from the WAM64S network 900. The store path 950 begins at $P_{2,2,2}$ 952. This store path 950 is formed by substituting g=2, h=2, and k=2 in the subscripted notation of the general form of a store path 930 in FIG. 9B. The node numbers wrap within the range 0-3 for rows g, columns h, and planes k. An example memory node is memory node $M_{3,2,1}$ 954.

Figure 9D:
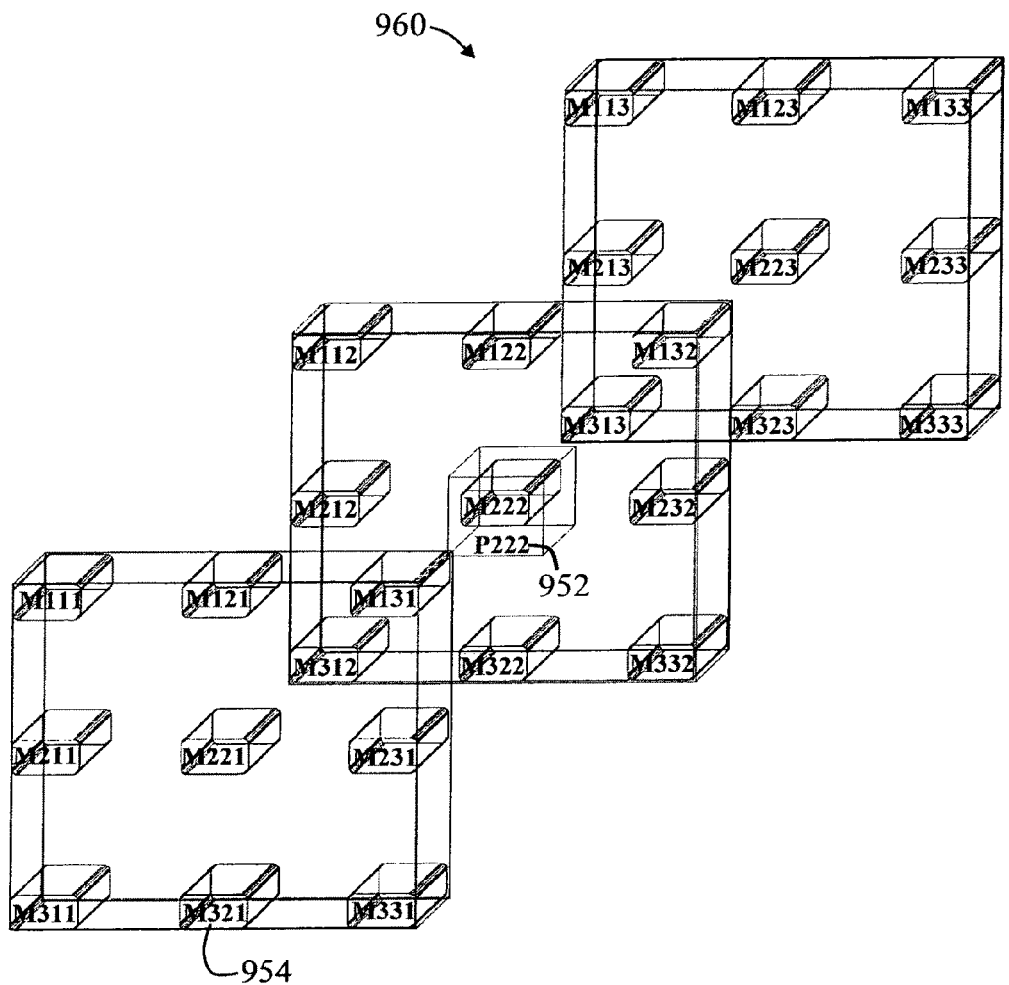
FIG. 9D illustrates a three dimensional organization of the twenty seven memory nodes and processor $P_{2,2,2}$ of FIG. 9C in accordance with the present invention.

FIG. 9D illustrates a three dimensional organization 960 of the twenty seven memory nodes and processor $P_{2,2,2}$ 952 of FIG. 9C. The store path begins at $P_{2,2,2}$ 952 and connects to the twenty seven memory nodes, such as memory node $M_{3,2,1}$ 954.

Figure 9E:
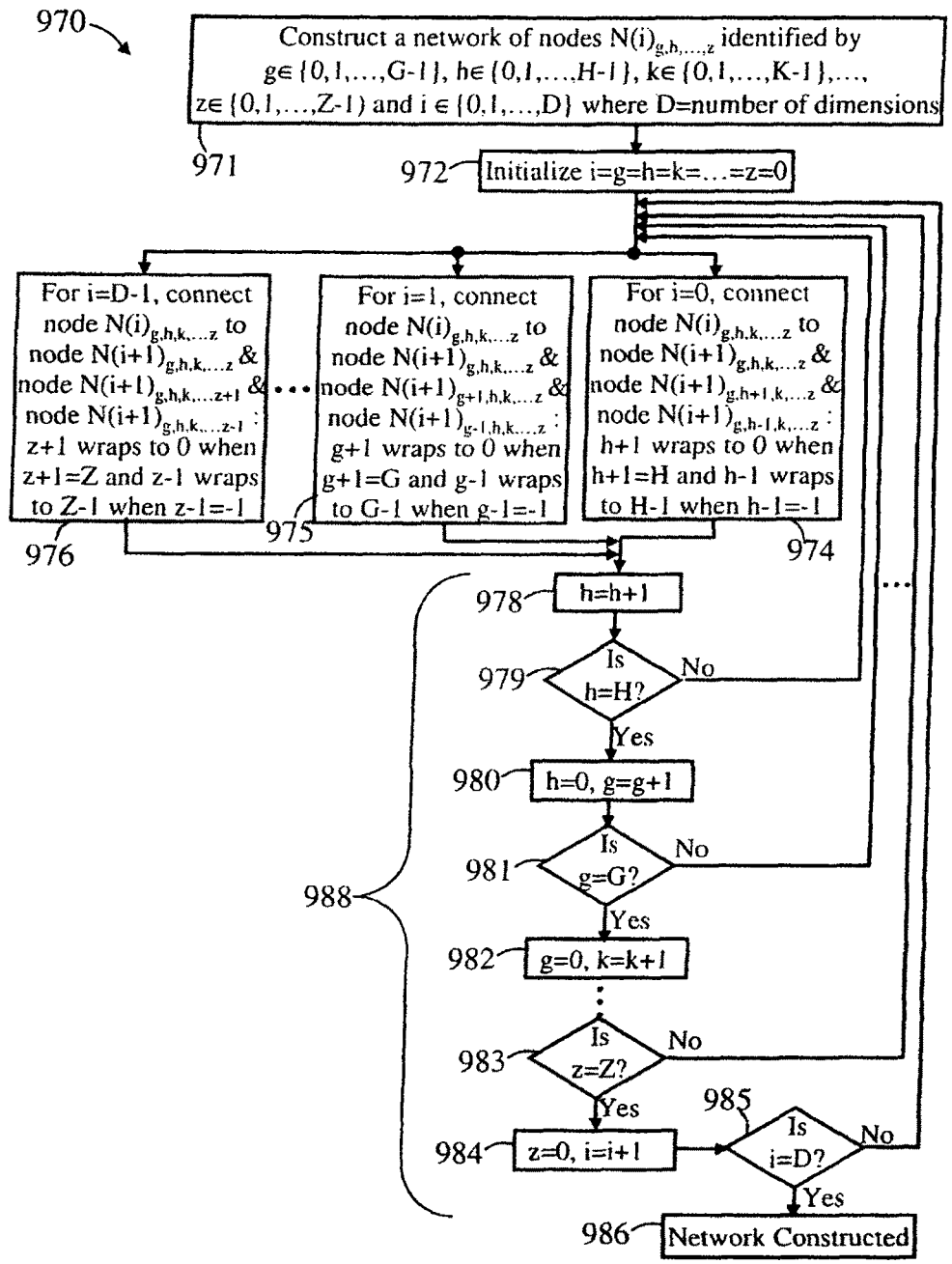
FIG. 9E illustrates a method of constructing a network in accordance with the present invention.

FIG. 9E illustrates a method 970 of constructing a network in accordance with the present invention. The method starts in step 971 where a network of nodes is identified by $g \in \{0,1,\ldots,G-1\}$, $h \in \{0,1,\ldots,H-1\}$, $k \in \{0,1,\ldots,K-1\}$, $z \in \{0,1,\ldots,Z-1\}$ and $i \in \{0,1,\ldots,D\}$ where D is the number of dimensions. In step 972, variables i, g, h, k, . . . , z are initialized to zero.

For i=0 step 974, the first stage of the network is constructed connecting node $N(i)_{g,h,k,\ldots,z}$ to node $N(i+1)_{g,h,k,\ldots,z}$ and to node $N(i+1)_{g,h+1,k,\ldots,z}$ and to $N(i+1)_{g,h-1,k,\ldots,z}$ where h+1 wraps to 0 when h+1=H and h−1 wraps to H−1 when h−1=−1. In step 978, the variable h is incremented by 1. In step 979 it is determined whether h=H. If h does not equal H, then the method returns to step 974. If h does equal H, then the method proceeds to step 980.

In step 980, the variable h is set to zero and the variable g is incremented by 1. In step 981, it is determined whether g=G. If g does not equal 0, then the method returns to step 974. If g does equal G, then the method proceeds to step 982.

In step 982, the variable g is set to zero and the variable k is incremented by 1. The method 970 continues in like manner for the dimensions up to the test for the last dimension in step 983. In step 983, it is determined whether z=Z. If z does not equal Z, then the method returns to step 974. If z does equal Z, then the method proceeds to step 984.

In step 984, the variable z is set to zero and the variable i is incremented by 1. In step 985, it is determined whether i=D. If i does not equal D, then the method proceeds to step 975 with i=1. If i does equal D, then the method stops at step 986 having constructed the network.

For i=1 step 975, the second stage of the network is constructed connecting node $N(i)_{g,h,k,\ldots,z}$ to node $N(i+1)_{g,h,k,\ldots,z}$ and to node $N(i+1)_{g+1,h,k,\ldots,z}$ and to $N(i+1)_{g-1,h,k,\ldots,z}$ where g+1 wraps to 0 when g+1=G and g−1 wraps to G−1 when g−1=−1. In step 978, the variable h is incremented by 1. From step 975, the method proceeds to step 978 and the process is repeated from step 978 through to the step 984. In step 984, the variable z is set to zero and the variable i is incremented by 1. The method continues constructing stages of the network until the point is reached where i=D−1. In step 985 at this point, the process proceeds to step 976 to construct the last stage of the network. Once the last stage of the network has been constructed, the method returns to step 984 and increments the variable i by 1, such that i=D. In step 985, it is determined that i=D and the method proceeds to step 986 having constructed the network. It is noted that steps 988 are adjusted for the number of dimensions D of the network to be constructed. For example, if D=2, as would be the case for the WAM16S network 400 of FIG. 4A, then only variables g and h would be required and steps 982 through steps 983 would not be required. Also, step 984 would be adjusted to g=0, i=i+1.

The WAM16S network 400 of FIG. 4A may be constructed by use of the method 970 where the dimensions (D) is 2. The method 970 would for D=2 follow the steps illustrated in FIG. 9E including step 974 and step 975. Step 974 for i=0 and steps 988 adjusted for D=2 are used to construct the first stage of the WAM16S network 400 between the processors P00 405 through P33 420 and the multiplexers R00 445 through R33 460. Step 975 for i=1 and steps 988 adjusted for D=2 are used to construct the second stage of the WAM16S network 400 between the multiplexers R00 445 through R33 460 and the multiplexers S00 465 through S33 480.

Figure 10A:
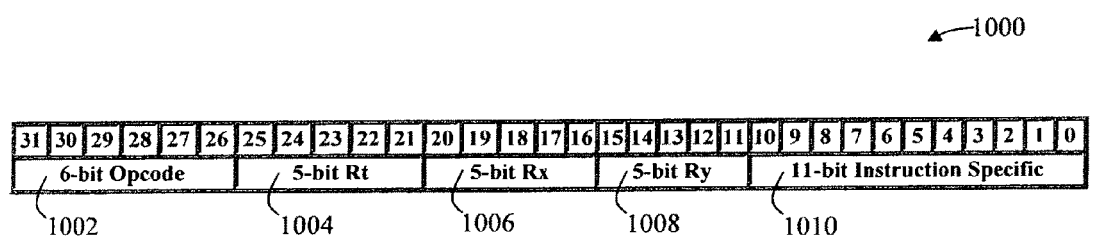
FIG. 10A illustrates a generic type of prior art arithmetic instruction format.

FIG. 10A illustrates a generic type of arithmetic instruction format 1000. The arithmetic instruction 1000 is made up of a 6-bit opcode 1002, a 5-bit Rt register target field 1004, a 5-bit Rx register source field 1006, a 5-bit Ry register source field 1008, and an 11-bit instruction specific field 1010. This format is typical for a processor having a central register file from which arithmetic operands are sourced and arithmetic results are targeted. A thirty two entry register file of, for example, 32-bits, organized as a 32×32-bit multi-port register file, is a typical processor register file requiring 5-bit addressing for each port for direct access of operands. In a memory to memory processor which accesses operands from a memory, the specification of the source and target addresses in the arithmetic instruction typically accommodates a wider addressing range. The wider addressing range is obtained either directly through wider operand address fields in an instruction or through indirect forms of addressing using external addressing registers set up ahead of time.

Figure 10B:
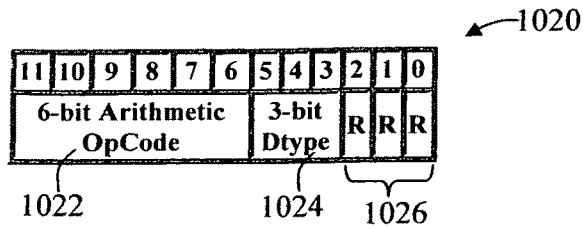
FIG. 10B illustrates a Wings basic arithmetic/logic instruction format in accordance with the present invention.
Figure 10C:
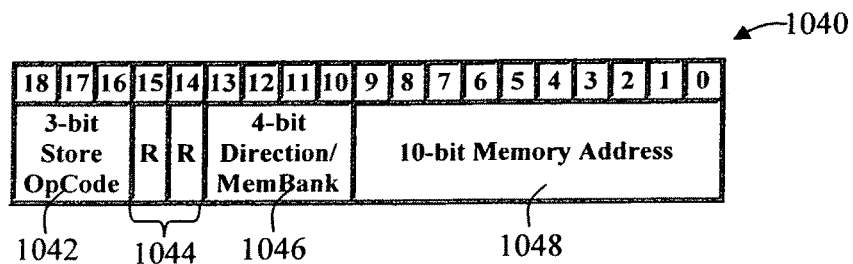
FIG. 10C illustrates a Wings basic store instruction format in accordance with the present invention.
Figure 10D:
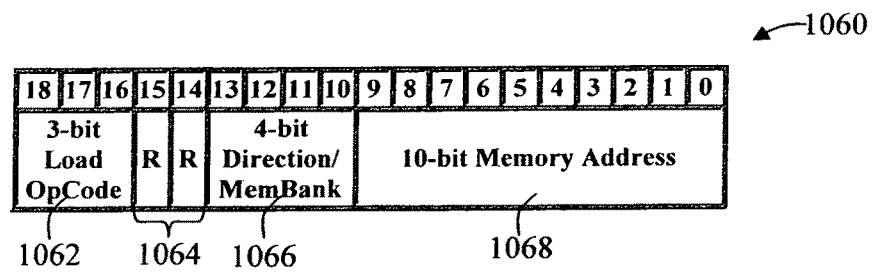
FIG. 10D illustrates a Wings basic load instruction format in accordance with the present invention.

In most processors, a fixed instruction format size is used, such as, 8, 16, 24, 32 and 64 bits or a combination of such instruction formats. FIG. 10A shows one such 32-bit instruction format 1000. The space allocated in the 32-bit instruction format 1000 for three operand address fields 1004, 1006, and 1008 is necessarily limited, since the other instruction bits, such as 1002 and 1010, are required to specify operations necessary in order to execute the instruction as specified by the processor's architecture. In order to break this limitation and provide greater flexibility in specifying operand addresses, for example, with greater range and flexible accessing methods, a new processor architecture, referenced as the Wings architecture, splits a typical instruction format into three separate new types of instruction formats each more optimally organized for their intended purposes. A first instruction format, an arithmetic/logic instruction format 1020, is shown in FIG. 10B to be used to specify arithmetic, logical, shift, bit manipulation, and the like operations. A second instruction format, a store instruction format 1040, is shown in FIG. 10C to be used to specify operations to store results of arithmetic operations to memory. A third instruction format, a load instruction format 1060, is shown in FIG. 10D to be used to specify the accessing of operand data from memory for delivery to execution units. These and other variations are discussed further below.

For example, FIG. 10B illustrates a Wings basic arithmetic/logic (AL) instruction format 1020 having 12-bits to define the operation. The AL format 1020 has no memory source or target operand address fields. A 6-bit opcode field 1022, a 3-bit data type (Dtype) 1024, and three arithmetic/logic instruction specific bits 1026 are all that is required to specify an arithmetic operation in the 12-bit AL instruction format 1020. The Wings processor architecture specifies that whatever data is at the inputs to an AL unit at the start of an execution cycle that is the data received in the AL unit and operated on by the AL unit. The Wings processor architecture also specifies that the results of execution are available at the output of the AL unit at the end of the execution cycle or cycles. An AL instruction does not specify a target storage address in a central register file or a memory unit where the results may be stored. In order to provide operands to an AL unit and store results from an AL unit, an AL instruction must be paired with a load and a store instruction or other such instruction or instructions to provide source operands and to take result operands for further processing or storage.

For example, FIG. 10C illustrates a Wings basic store instruction format 1040 having 19-bits to define the operation. The store instruction format 1040 uses a 3-bit store opcode 1042, two store instruction specific bits 1044, a 4-bit direction/memory bank (MemBank) selection field 1046, and a 10-bit memory address 1048 in the 19-bit instruction format. As specified by the opcode 1042 or in combination with the store instruction specific bits 1044, the store instruction causes a result to be taken from a specified execution unit and store the result to the target memory address. The target memory address is determined from the combination of the 4-bit direction/MemBank selection field 1046 and the 10-bit memory address 1048. Direct, indirect, and other addressing forms may be specified using separate addressing registers if required.

Figure 10E:
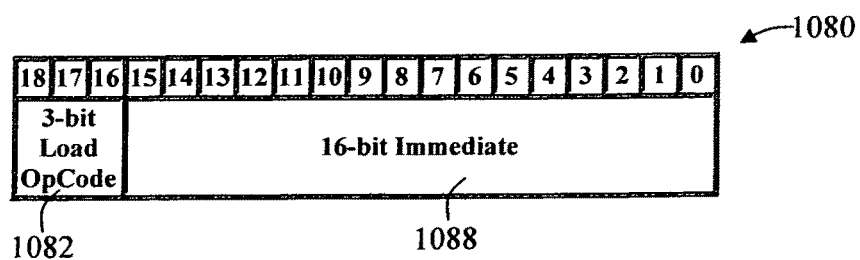
FIG. 10E illustrates a Wings basic load immediate format in accordance with the present invention.

FIG. 10D illustrates a Wings basic load instruction format 1060 having 19-bits to define the operation. The load instruction format uses a 3-bit load opcode 1062, two load instruction specific bits 1064, a 4-bit direction/memory bank (MemBank) selection field 1066, and a 10-bit memory address 1068 in the 19-bit instruction format. As specified by the opcode 1062 or in combination with the load instruction specific bits 1064, the load instruction fetches at least one source operand from a specified memory address for delivery to an execution unit. The memory address is determined from the combination of the 4-bit direction/MemBank selection field 1066 and the 10-bit memory address 1068. Direct, indirect, and other addressing forms may be specified using separate addressing registers if required. FIG. 10E illustrates a Wings basic load immediate format 1080 having 19-bits to define the operation. The load immediate format uses a 3-bit load immediate opcode 1082 and a 16-bit immediate field 1088 in the 19-bit instruction format. The 3-bit load immediate opcode 1082, for example, may specify the execution unit that is to use the immediate data.

It is anticipated the depending upon the application the processor architecture may expand or contract the illustrated instruction formats. For example, 8-bit arithmetic and 16-bit load and store instruction formats, and 16-bit arithmetic and 24-bit load and store instruction formats can be envisioned, as well as other variations, such as, 14-bit arithmetic and 25-bit load and store instruction formats. The instruction format is determined primarily from the number of and type of operations to be specified for each class of instruction.

A secondary consideration may be how the instructions are packed for storage as programs in external memory. For example, with use of base address registers local in the PEs, a dual load instruction may be specified that selects two source operands from blocks of memory by generating two addresses. The dual load instruction would be used in place of two single load instructions. With a dual load instruction format of 27-bits, a store instruction of 23-bits, and an arithmetic instruction of 14-bits, a packed instruction storage space of 64-bits would be required. The packed instruction storage space could be unpacked locally to the processor when loading instruction memories, for example, as may be specified in direct memory access (DMA) type operations. Instruction memories, such as the execution unit instruction memories of a Wings processor may be used. See U.S. Provisional Application Ser. No. 10/648,154 entitled "Methods and Apparatus For Meta-Architecture Defined Programmable Instruction Fetch Functions Supporting Assembled Variable Length Instruction Processors", which is incorporated by reference in its entirety.

Figure 11A:
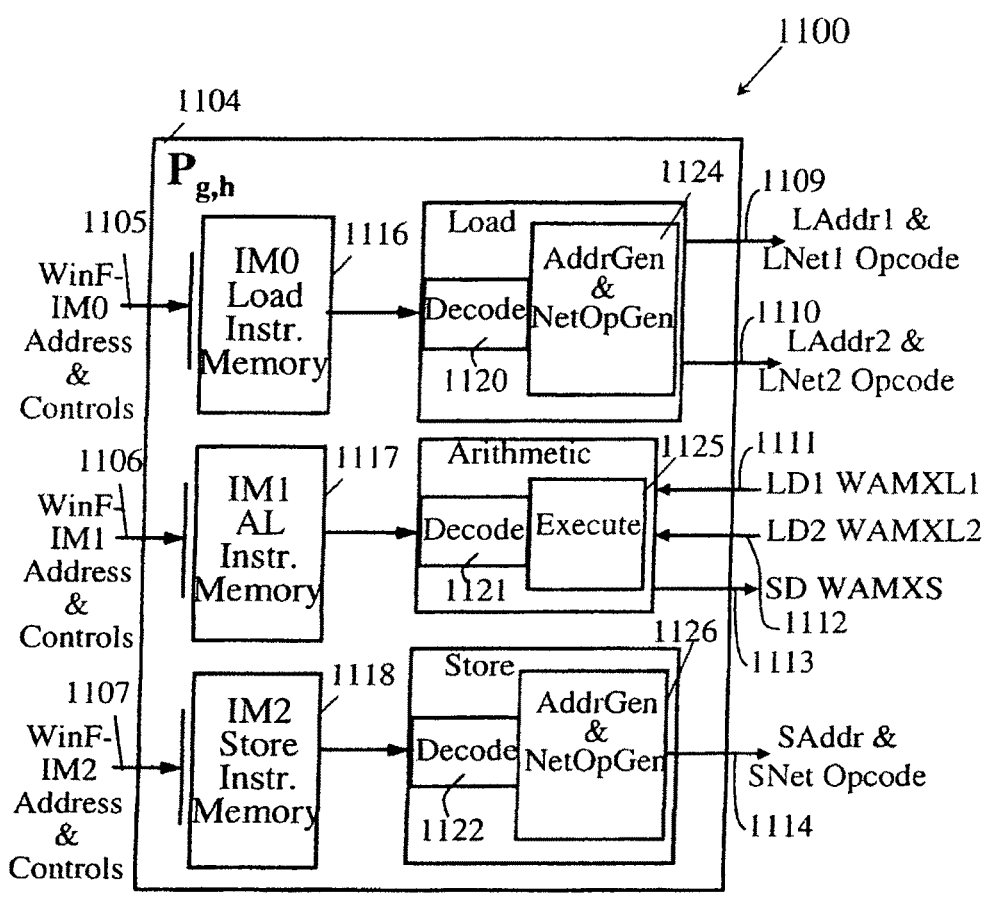
FIG. 11A illustrates a Wings processor node for use with the WAM networks and using the Wings basic instruction formats in accordance with an embodiment of the present invention.

FIG. 11A illustrates a Wings processor node 1100 for use with the WAM networks, such as the WAM16S network 400, WAM 16L network 500 and 700, and WAM64S network 900. The Wings processor node 1100 uses the Wings basic instruction formats, 1020, 1040, 1060, and 1080. The Wings processor node 1100 consists of a processor $P_{g,h}$ 1104 with input connections for instruction memory addresses WinF-IM0 address and controls 1105, WinF-IM1 address and controls 1106, and WinF-IM2 address and controls 1107. The processor $P_{g,h}$ 1104 has output connections for WAM network connections 1109-1114 which are described in more detail below.

As noted above, the 12-bit arithmetic and 19-bit load and store instruction formats are one set of example formats that can be specified for the processor nodes. Depending upon the application, the number and type of unique instructions may require different instruction formats in order to meet the requirements. It was also noted that it is desirable to optimize the instruction format to the needs of the instruction type, such as arithmetic/logic instructions, load and store instructions for example. Since the instruction formats may take various numbers of bits, an architecture supporting a wide variety of formats is required. The Wings architecture, as described in US Patent Application Publication US 2004/0039896, is an architecture that would allow different instruction sizes for each instruction type supported by a separate instruction memory unit. The Wings architecture supplies instruction addresses to local instruction memories in each processor, such as load instruction memory IM0 1116, arithmetic instruction memory IM1 1117, and store instruction memory IM2 1118 to select an instruction from each memory. The selected instruction is supplied on individual instruction buses to separate decode units 1120-1122 and then executed in each separate execution unit 1124-1126, respectively.

The load execute unit 1124 generates a data fetch address or load address for each load instruction supplied by the load instruction memory IM0 1116. For example, if two load instructions were supplied then two load addresses and network opcodes would be generated, such as load address 1 & load network 1 opcode 1109 and load address 2 & load network 2 opcode 1110. These fetch addresses and network opcodes are set through the network to each multiplexer node that is under control of the processor. In the WAM16L network 700, each processor node $P_{g,h}$, for example, controls the network node associated with the direct path to memory block $M_{g,h}$. For example in FIG. 7, processor P03 708 controls nodes L03 768 and T03 748, processor P21 714 controls nodes L21 774 and T21 754. In a single instruction multiple data (SIMD) mode of operation, each direction associated with a load and store instruction from all the nodes involved in the operation provide the same direction command code. For example, a load from the east would be specified in a bit field of a load instruction and that bit field portion of the load instruction would be the same for all load instructions in all processors involved in the operation. It is appreciated that different execution specific instruction operations such as different directions of load or store operations may be specified among a group of executing nodes where the communication operations do not conflict. As another example, in a specified group of processor nodes the non-communication oriented bit field portions of the load instructions may be different for each processor node such that data from different memory addresses may be fetched. When data is returned through the WAM network, it is loaded directly to the arithmetic unit of each processor that is doing a load operation, for example, receiving load data on load operand 1 WAMXL1 1111 and load operand 2 WAMXL2 1112.

To associate an arithmetic operation with a load instruction, the latency of the fetch through the WAM network must be accounted for. For example, with a single cycle allocated to address a memory block and obtain the data at the memory block output and a single cycle allocated to transfer the fetched data across the network to a processor node, two cycles may be used for a data load operation.

Store operations follow a similar path with a store operand data at a specified memory address is sent through the store WAMXS network to the memory based on the direction command in the store instruction. The store operand WAMXS 1113 and store address & store network opcode 1114 are sent through the network to the desired memory block for storage.

Figure 11B:
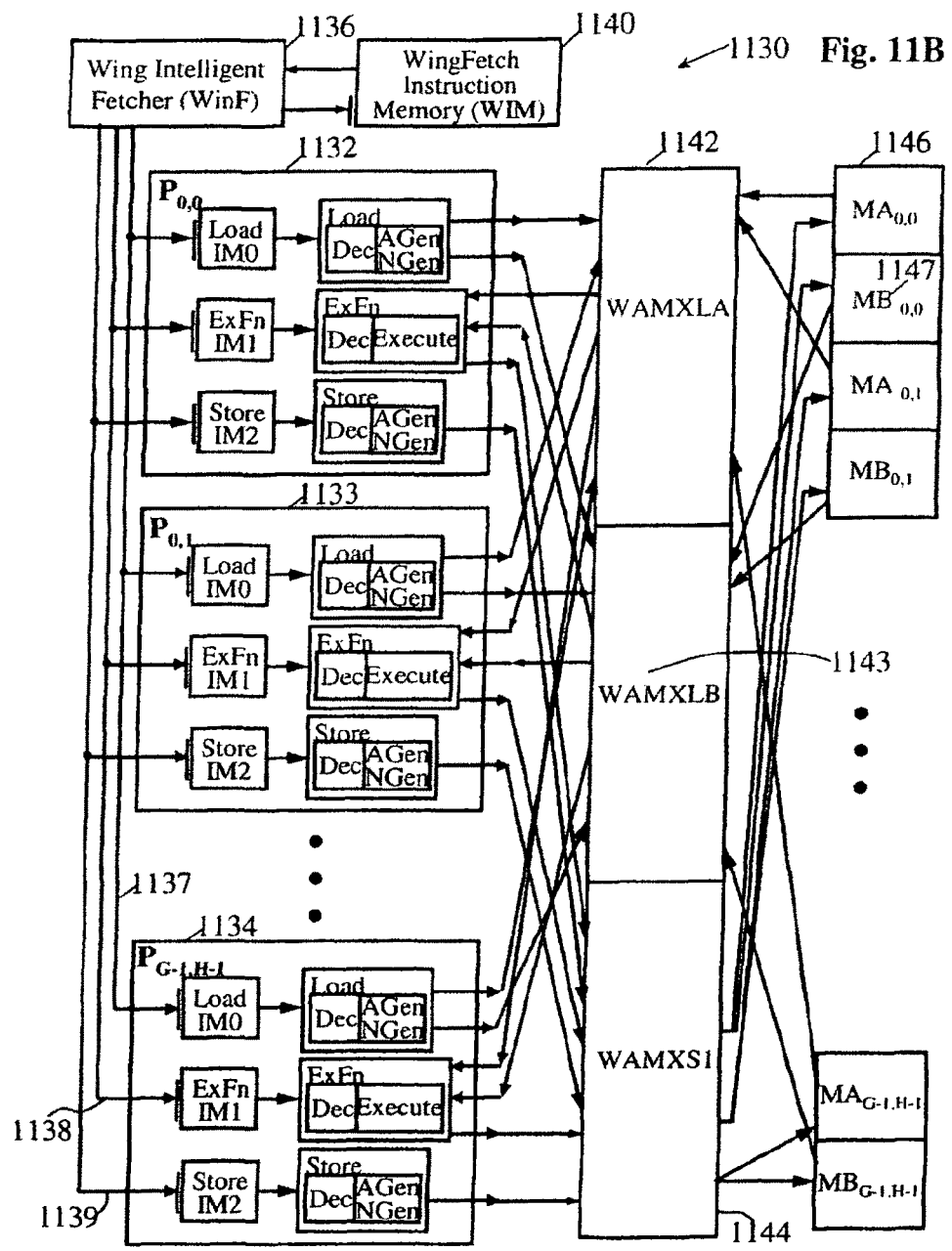
FIG. 11B illustrates an example of a WAM processor system in accordance with the present invention.

FIG. 11B illustrates an example of a WAM processor system 1130. G×H processors $P_{0,0}$ 1132, $P_{0,1}$ 1133, ..., $P_{G-1,H-1}$ 1134 are connected to a Wings intelligence fetcher (WinF) 1136 through three instruction memory address lines 1137-1139. For example, instruction memory address and control lines 1137-1139. The memory address and control lines are similar to the WinF IM0 address and controls 1105, WinF IM1 address and controls 1106, and WinF IM2 address and controls 1107, respectively, as shown in the processor 1100 of FIG. 11A. The Wings intelligent fetcher 1136 fetches its instructions from the Wings fetch instruction memory (WIM) 1140. The multiple processors connect to data memory through WAM networks, such as two WAMXL load networks, WAMXLA 1142 and WAMXLB 1143, and a WAMXS store network WAMXS1 1144. With two WAM load networks, either multi-port memories or two memory blocks per associated processor node may be used, for example. In FIG. 11B the WAM processor system 1130 uses two memory blocks per associated processor node. For example, there are two memory blocks, $MA_{0,0}$ 1146 and $M13_{0,0}$ 1147 associated with processor node $P_{0,0}$ 1132.

Figure 11C:
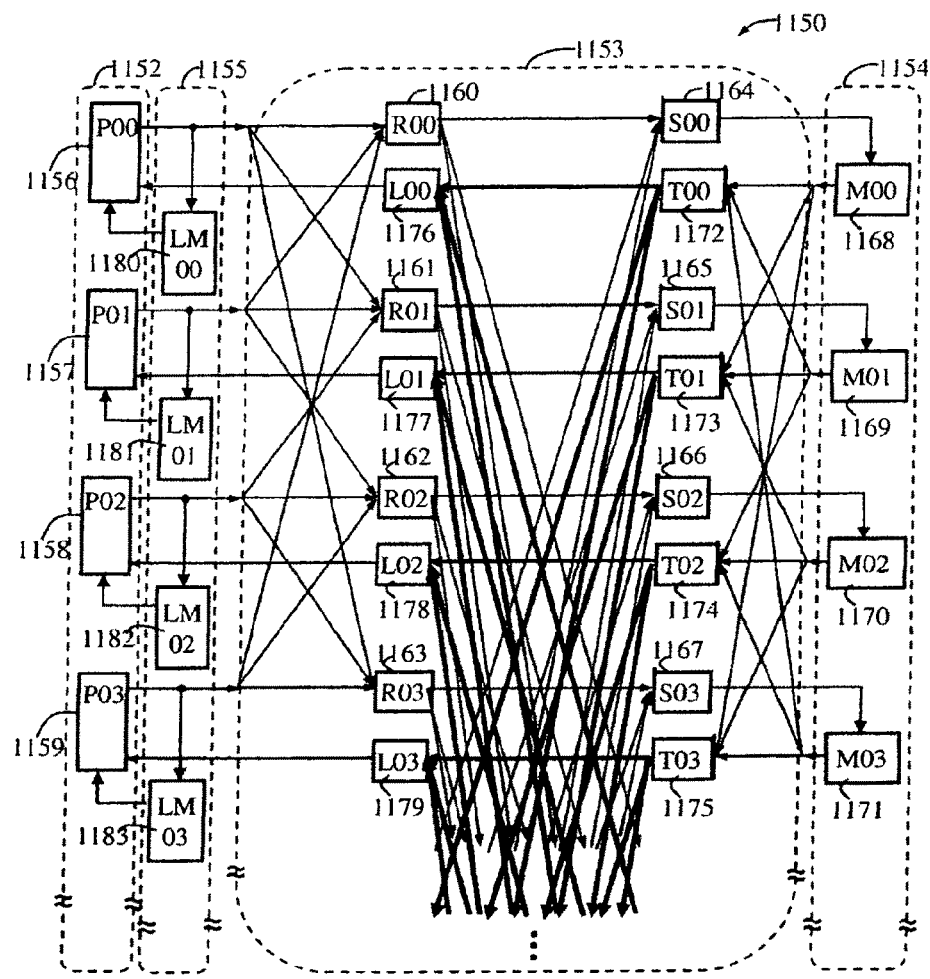
FIG. 11C illustrates a WAM16 processor subsystem with a set of processor nodes, a WAM16S/WAM16L combined network, a first set of memories, and a second set of memories in accordance with the present invention.

FIG. 11C illustrates a WAM16 processor subsystem 1150 with a set of processor nodes 1152, a WAM16S/WAM16L combined network 1153, a first set of memories 1154, and a second set of memories 1155 in accordance with the present invention. The WAM16S/WAM16L combined network 1153 is made up of a WAM16S network, such as WAM16S network 400 of FIG. 4A, and a WAM16L network, such as WAM16L network 500. The WAM16S/WAM16L combined network 1153 is used for connecting processor nodes 1152 to the first set of memories 1154. The second set of memories 1155 connects locally to the processor nodes 1152. With this organization simultaneous dual memory loads to the processor nodes 1152 can be supported. Four processor nodes 1156-1159 are illustrated in FIG. 11C that are part of a larger sixteen processor node network, such as illustrated in FIGS. 4A and 5A, for example. For store operations processor nodes 1156-1159 send data to the Rxx nodes 1160-1163. For example, processor node P01 1157 sends data to R00 1160, R01 1161, and R02 1162. The Rxx nodes 1160-1163 connect to Sxx nodes 1164-1167 and other nodes in the WAM16S/WAM16L combined network 1153. The Sxx nodes 1164-1167 connect to memories 1168-1171, respectively. Though a single block of memory is shown for each of the memories 1168-1171, it is appreciated that the memories 1168-1171 may be partitioned into multiple memory blocks each accessible by use of addressing ranges. The desired memory block may be specified through the memory address that is associated with the data being sent through the network for storage in memory.

For network load operations, a processor node initiates a network load operation by sending a data fetch address and network opcode through the network to the desired memory. The addressed memory fetches data at the specified address and send the data through the WAM16S/WAM16L combined network 1153 back to the processor node that initiated the network load operation, such as one of the processor nodes 1156-1159. The memories 1168-1171 are connected to Txx nodes 1172-1175. For example, memory M00 1168 sends data to T00 1172, T01 1173, and T03 1175. The Txx nodes 1172-1175 connect to Lxx nodes 1176-1179 and other nodes in the WAM16S/WAM16L combined network 1153. The Lxx nodes 1176-1179 connect to the processor nodes 1156-1159, respectively.

For local load operations, a processor node initiates a local load operation by sending a data fetch address directly to the local memory associated with the processor node. The local memory accesses the data and provides it locally to the requesting processor node. For example, processor nodes 1156-1159 may load data from local memories 1180-1183, respectively.

Depending upon the application and processor cycle time, it is possible to store through a WAMXS network into memory in a single cycle and to load data from a memory through a WAMXL network into a processor also in a single cycle. Such performance may be appropriate for low power applications, for example. For this type of situation, a software pipeline of storing and loading may be easily obtained providing a single cycle throughput for communicating data between processor nodes for any node in the system.

Figure 11D:
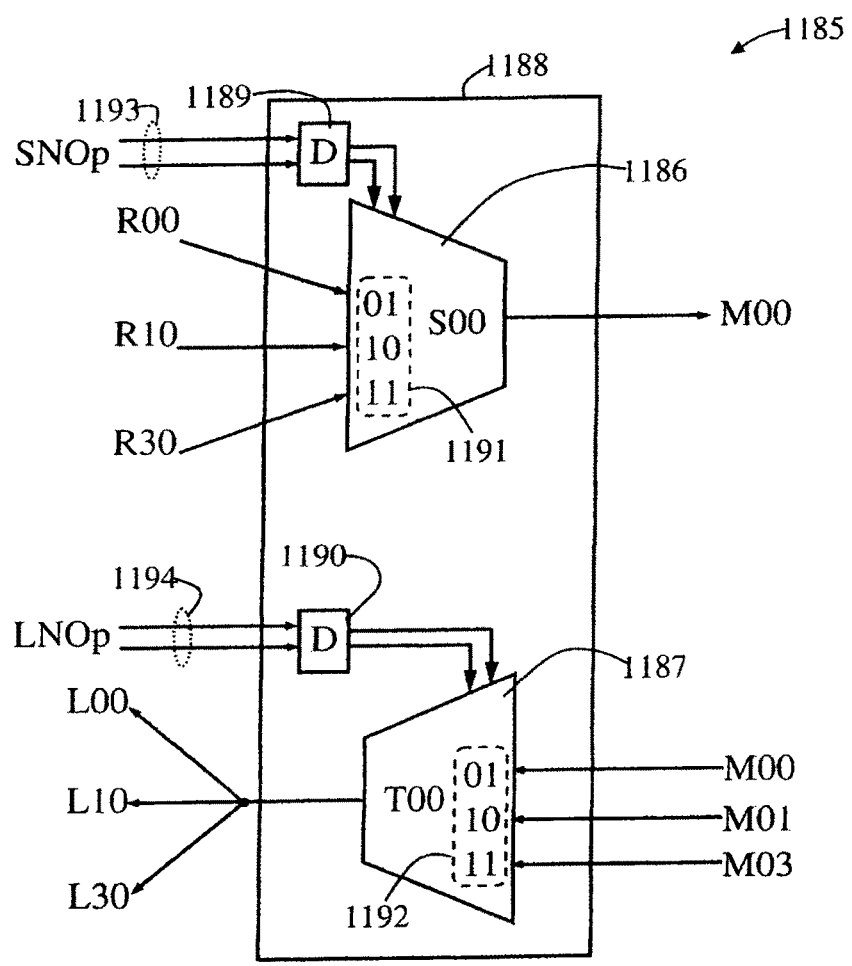
FIG. 11D illustrates a combined network node that combines a WAM16L node and a WAM16S node into a single node and illustrates the function aspect of the WAM nodes in accordance with the present invention.

FIG. 11D illustrates a combined network node 1185 that combines a WAM16S node 1186 and a WAM16L 1187 node into a single node 1188. The single node 1188 illustrates the functional aspect of the WAM nodes. The WAM16S node 1186 and WAM16L node 1187 operate under control signal inputs provided by decoder 1189 and 1190, respectively. The outputs of the decoders 1189 and 1190 are represented by the binary state lists 1191 and 1192, respectively. The decoders 1189 and 1190 receive control signals SNOp 1193 and LNOp 1194, respectively. For simple directional path control for the data through the networks, the WAM16S node 1186 and WAM16L 1187 node may be multiplexers selecting the path according to the binary state indicated in the node diagram. In an alternative embodiment, the control signals SNOp 1193 and LNOp 1194 are used directly without need for a decoder. The controls signals SNOp 1193 and LNOp 1194 connect directly to binary multiplexer control inputs that are used for controlling the multiplexers. In another alternative embodiment, the decoders 1189 and 1190 in select modes of operation pass the control signals through the decoders and providing no additional decoding function. For additional functions of the nodes 1186 and 1187, the nodes 1186 and 1187 may provide different operations on data coming into the nodes, as may be required by an application. These additional functions may be specified by a more complex decoder implementation of decoders 1189 and 1190 and an expansion of the control signals SNOp 1193 and LNOp 1194. For example, operations on individual data such as shift operations may be specified and more complex operations on multiple input paths, such as compare and addition operations and the like may also be specified.

Figure 12A:
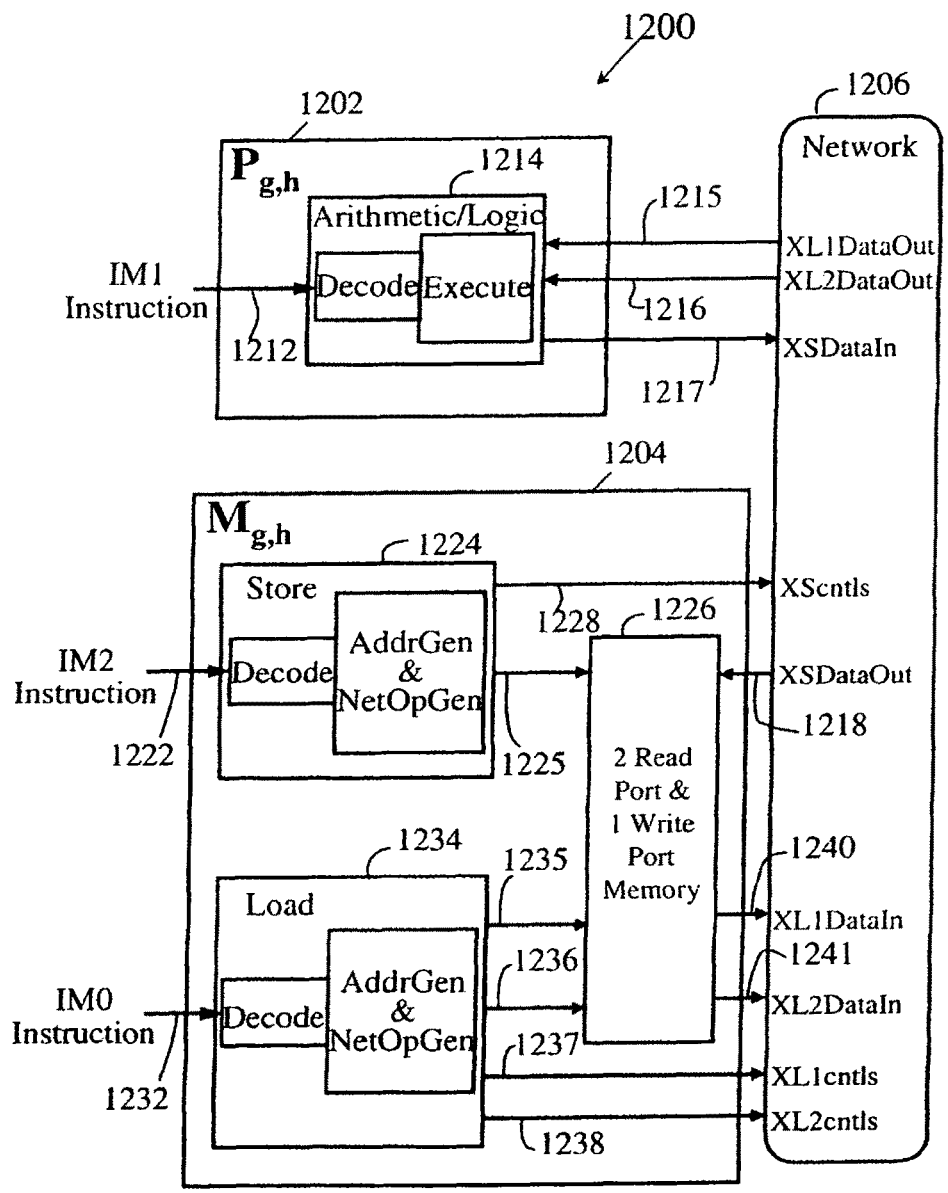
FIG. 12A illustrates Wings processor node made up of an execution node and a memory node in accordance with an embodiment of the present invention.

FIG. 12A illustrates Wings processor node 1200 made up of an execution node 1202 and a memory node 1204 in accordance with an embodiment of the present invention. The split organization of the processor node 1200 allows the execution node 1202 to be placed at the data input and output connections of a WAM store network, such as the WAM16S network 400 of FIG. 4A and a WAM load network, such as the WAM16L network 500 of FIG. 5A. The split organization of the processor node 1200 also allows the memory node 1204 to be placed at the data input and output connections of a WAM store network and a WAM load network. A WAM store network combined with a WAM load network is represented by network 1206.

The execution node 1202 receives arithmetic/logic instructions over an IM1 instruction bus 1212 connected to an arithmetic decode and execution unit 1214. The arithmetic/logic (AL) instructions each have a format such as the AL instruction format 1020 of FIG. 10B. The received AL instruction is decoded and executed using source operands XL1DataOut 1215 and XL2DataOut 1216 supplied from the network 1206. The arithmetic decode and execute unit 1214 generates a result XSDataIn 1217 that is sent to the network 1206. The AL instruction itself contains no source or target operand information.

The memory node 1204 receives store instructions over an IM2 instruction bus 1222 connected to a store decode and execute unit 1224. The store instructions each have a format such as the store instruction format 1040 of FIG. 10C. The received store instruction is decoded and executed generating address lines 1225 that are supplied to memory 1226 and controls (XScntls) 1228 supplied to the network 1206. XSDataIn 1217 follows the data path of a WAM store network that is part of the network 1206 and outputs a XSDataOut 1218. The XSDataOut 1218 is connected to the memory 1226 and written to memory 1226 when the store instruction is executed. The Xscntls 1228 provide multiplexer control signals to the store portion of the network 1206, such as the WAM16S network 400 of FIG. 4A, such as multiplexer node 1186 of FIG. 11D.

The memory node 1204 further receives load instructions over an IM0 instruction bus 1232 connected to a load decode and execute unit 1234. The load instructions each have a format such as the load instruction format 1060 of FIG. 10D. The received load instruction is decoded and executed generating load address lines to be output to the memory 1226. For dual load instructions, for example, address lines 1235 and 1236 are generated. Associated with the generated address lines 1235 and 1236 are corresponding control lines XL1cntls 1237 and XL2cntls 1238, respectively. The XL1cntls 1237 and XL2cntls 1238 provide multiplexer control signals to the load portion of the network 1206, such as having two WAM16L networks 500 of FIG. 5A and using a multiplexer node, such as, multiplexer node 1187 of FIG. 11D for each node of the load networks. The two load address lines 1235 and 1236 cause two data operands to be read from memory 1226 and output on XL1DataIn 1240 and XL2DataIn 1241 that are connected to the network 1206. The XL1DataIn 1240 and XL2DataIn 1241 follow a WAM load network path to reach the XL1DataOut 1215 and XLO2DataOut 1216, respectively.

By placing the load and store execute units 1234 and 1224 in close proximity to the memory 1226, the load address lines 1235 and 1236 and store address lines 1225 do not have to pass through the network 1206. The control signals XL1cntls 1237, XL2cntls 1238, and XScntls 1228 are used for multiplexer control in network 1206.

Figure 12B:
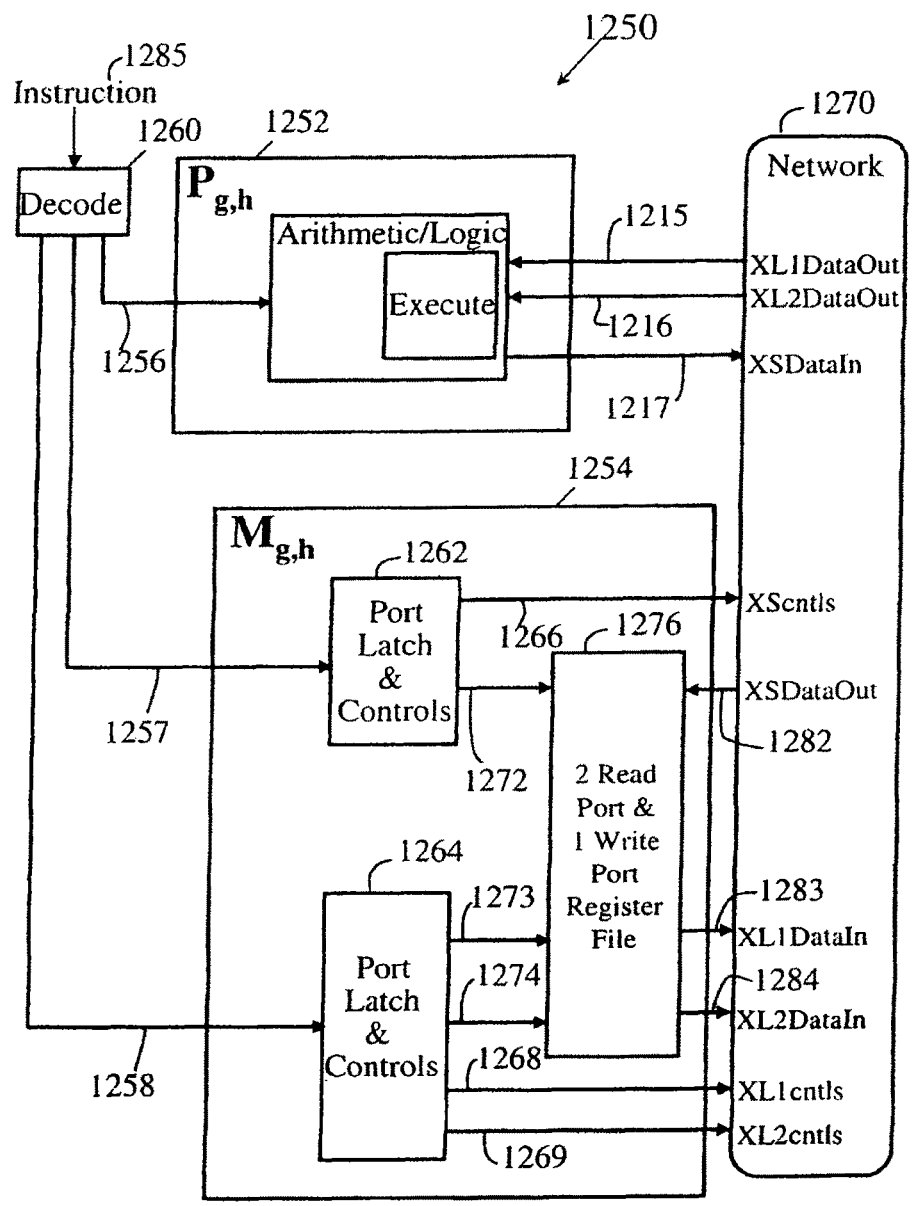
FIG. 12B illustrates processor node made up of an execution node and a memory node in accordance with an embodiment of the present invention.

FIG. 12B illustrates processor node 1250 made up of an execution node 1252 and a memory node 1254 in accordance with an embodiment of the present invention. The execution node 1252 does not have a decoder and receives decoded arithmetic/logic instruction control signals 1256 from an external instruction decoder such as decoder 1260. The memory node 1254 does not have a decoder and receives decoded store and load instructions control signals 1257 and 1258, respectively, from an external instruction decoder such as decoder 1260. The store and load instruction control signals 1257 and 1258 are received in port latch and control units 1262 and 1264, respectively. The port latch and control unit 1262 supplies the XScntls 1266 to a network 1270. The port latch and control unit 1264 supplies the XL1cntls 1268 and XL2cntls 1269 to the network 1270. The port latch and control unit 1262 supplies the write address 1272 to a multiport memory, such as memory 1276. Data received from the network on XSDataOut 1282 is stored in the multiport memory 1276. The port latch and control unit 1264 supplies the read addresses 1273 and 1274 to a multiport memory, such as the memory 1276 to access two data values. The data values are supplied to the network on XL1DataIn 1283 and XL2DataIn 1284. In this fashion, single instructions, such as instructions 1285 may be separately decoded and use the features and advantages of the present invention.

Figure 13:
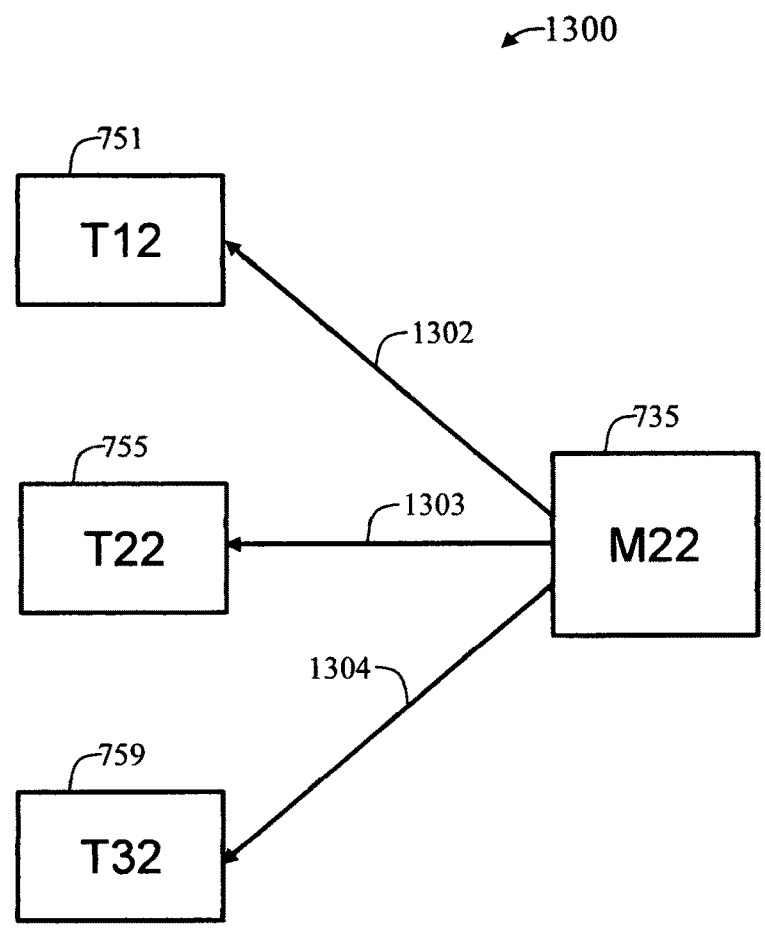
FIG. 13 illustrates a memory node to T node subsystem in accordance with the present invention.

FIG. 13 illustrates a memory node to T node subsystem 1300 in accordance with the present invention. The subsystem 1300 comprises a memory node M22 735 coupled to three T nodes, T12 751, T22 755, and T32 759 as representative nodes from the WAM16L network 700 of FIG. 7. The memory node M22 735 is coupled to T12 751 with a first bus 1302, coupled to T22 755 with a second bus 1303, and coupled to T32 759 with a third bus 1304. The memory node M22 735 may separately control the three busses 1302-1304 to pass different information to each T node in parallel. The memory node M22 735 may also control the three buses 1302-1304 to pass the same information to each T node in parallel, such as may be required for a broadcast type of operation or the like. The memory node M22 735 may also pass different combinations of information or no information on the three buses. The information passed on the buses is generally information that is stored in memory on the memory node M22 735.

Figure 14:
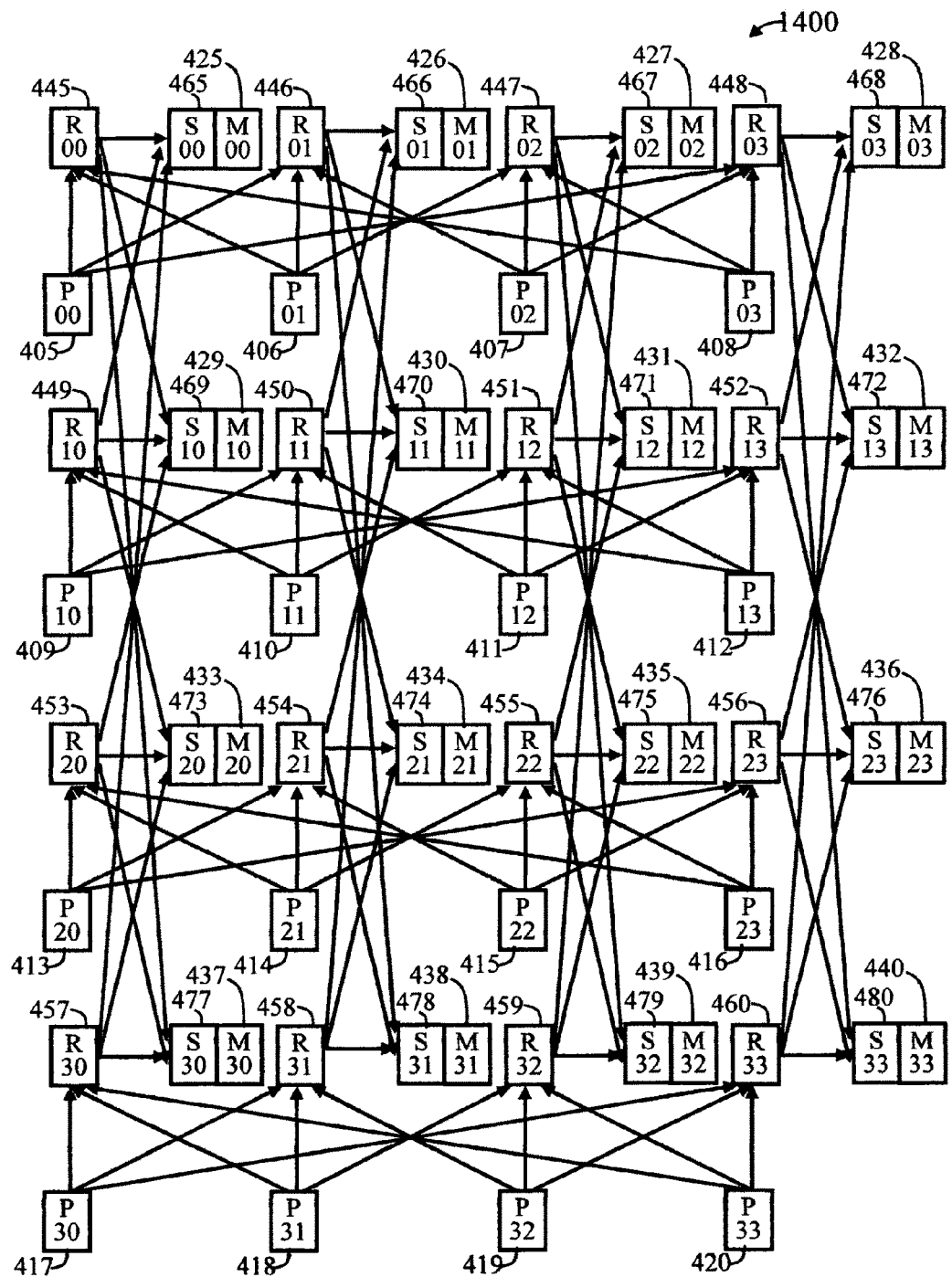
FIG. 14 illustrates an exemplary WAM16S network in a physical layout form of the WAM 16 store (WAM16S) network of FIG. 4A in accordance with the present invention.

FIG. 14 illustrates an exemplary WAM16S network 1400 in a physical layout form of the WAM sixteen processor store (WAM16S) network 400 of FIG. 4A in accordance with the present invention. The processors 405-420, memory blocks 425-440, and network R nodes 445-460 and S nodes 465-480 are distributed according to a G×H matrix where G=H=4. Each processor $P_{g,h}$, memory block $M_{g,h}$, and internal nodes of the network are labeled in a row g by column h format where g∈{0,1,2,3} and h∈{0,1,2,3}. The processors $P_{g,h}$ 405-420 and first stage nodes $R_{g,h}$ 445-460 are separately coupled across each row g. The first stage nodes $R_{g,h}$ 445-460 and the second stage nodes $S_{g,h}$ 465-480 are separately coupled across each columns h. In an exemplary implementation, the processors $P_{g,h}$ 405-420 and first stage nodes $R_{g,h}$ 445-460 may be organized on one layer of a multi-layer silicon chip. A different layer of the chip may be utilized for the coupling between the first stage nodes $R_{g,h}$ 445-460 and the second stage nodes $S_{g,h}$ 465-480. The memory blocks 425-440 may be configured on the same layer with the second stage nodes $S_{g,h}$ 465-480 or on a different layer, such as the top layer of the chip, for example. In such an organization, the memory blocks 425-440 may be overlaid upon the processors as shown in FIG. 4B.

Figure 15:
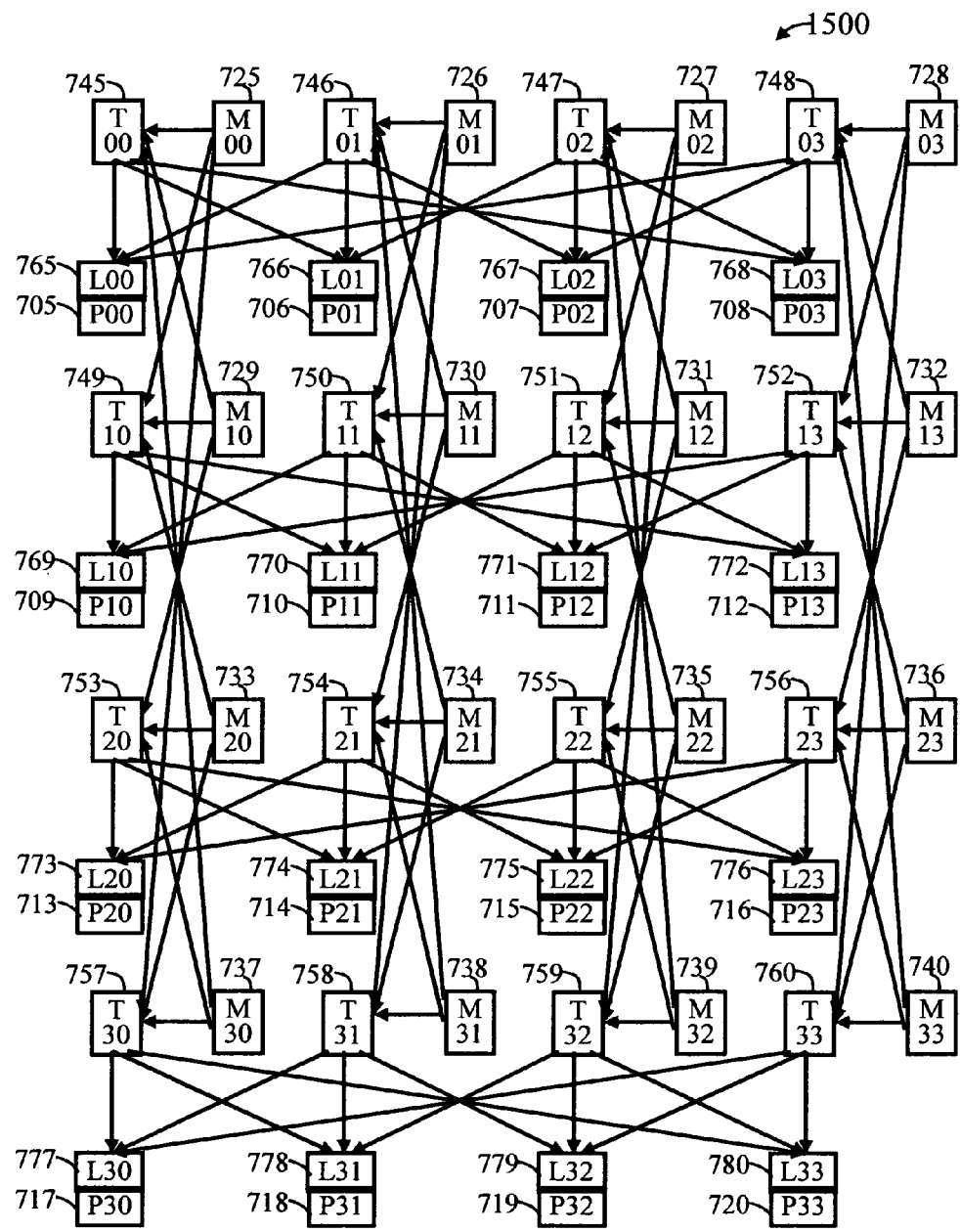
FIG. 15 illustrates an exemplary WAM16L network physical layout form of the alternative WAM16L network of FIG. 7 in accordance with the present invention.

FIG. 15 illustrates an exemplary WAM16L network 1500 physical layout form of the alternative WAM16L network 700 of FIG. 7 in accordance with the present invention. Processor nodes 705-720, memory nodes 725-740, and network nodes 745-760 and 765-780 are distributed according to a G×H matrix where G=H=4. Each processor node $P_{g,h}$, memory node $M_{g,h}$, and internal nodes of the network are labeled in a row g by column h format where g∈{0,1,2,3} and h∈{0,1,2,3}. A first set of nodes, such as memory nodes $M_{g,h}$ 725-740, for example, and a second set of nodes $T_{g,h}$ 745-760 are separately coupled across each column h. The second set of nodes $T_{g,h}$ 745-760 and a third set of nodes $L_{g,h}$ 765-780 are separately coupled across each row g. The third set of nodes $L_{g,h}$ 765-780 are coupled to a fourth set of nodes, such as processor nodes $P_{g,h}$ 705-720. In an exemplary implementation, the processors $P_{g,h}$ 705-720 and third set of nodes $L_{g,h}$ 765-780 may be organized on one layer of a multi-layer silicon chip. A different layer of the chip may be utilized for the coupling between the second set of nodes $T_{g,h}$ 745-760 and the third set of nodes $L_{g,h}$ 765-780. The memory nodes 725-740 may be configured on the same layer with the second set of nodes $T_{g,h}$ 745-760 or on a different layer, such as the top layer of the chip. In such an organization the memory nodes 725-740 may be overlaid upon the processors in a similar manner as shown in FIG. 4B with load paths utilized instead of the store paths shown in FIG. 4B.

Figure 16A:
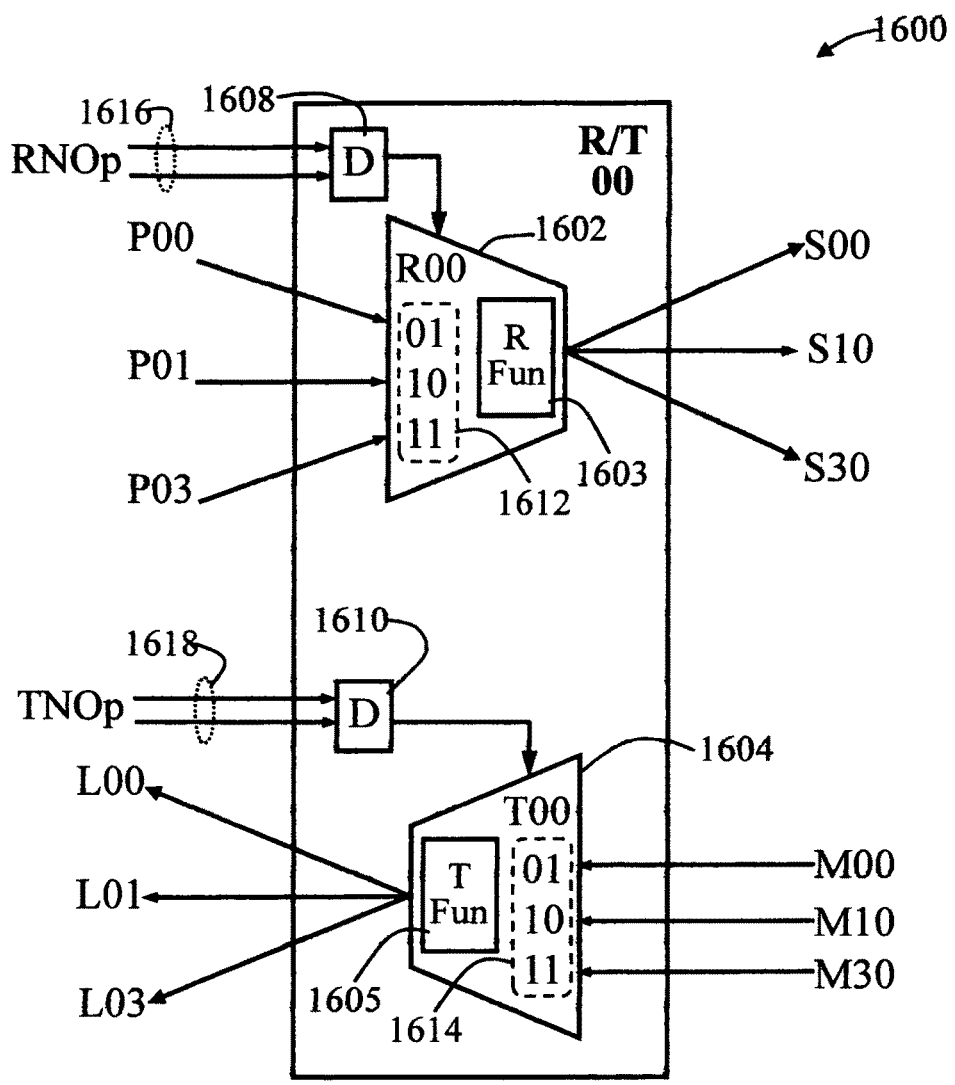
FIGS. 16A and 16B where

FIG. 16A illustrates an exemplary combined network node 1600 that combines a WAM load node and a WAM store node into a combined node where the load and store nodes support expanded function capabilities in accordance with the present invention. The combined node 1600 illustrates functional capabilities of the WAM nodes. The R00 node 1602 is similar to the WAM16S R00 node 445 of FIG. 4A and the T00 node 1604 is similar to the WAM16L T00 node 745 of FIG. 7. Both the R00 node 1602 and the T00 node 1604 are configured to operate in response to a control signal provided by decoder 1608 and 1610, respectively. The outputs of the decoders 1608 and 1610 may be represented by the binary state lists 1612 and 1614, respectively. The decoders 1608 and 1610 receive control signals RNOp 1616 and TNOp 1618, respectively. For simple directional path control for the data through the networks, the R function (RFun) circuit 1603 and T function (TFun) circuit 1605 may be multiplexers selecting a path according to the binary state lists 1612 and 1614 indicated in the node diagram. For example, the multiplexers within the RFun circuit 1603 or within the TFun circuit 1605 may be a single multiplexer as shown in FIG. 8A or organized as a set of multiplexers as shown in FIG. 8B.

In another embodiment, the "Sxx" nodes, such as the WAM16S S00 node 465 of FIG. 4A, and the "Lxx" nodes, such as the WAM16L L00 node 765 of FIG. 7, may be organized separately or combined in a similar manner to the combined node 1600. The S00 node 465 and the L00 node 765 may be internally organized as a set of multiplexers, for example as shown in FIG. 8B. In a network using such nodes, a memory node Mxx, coupled to its associated Sxx node, may be configured as a three port memory node. Similarly, a processor node Pxx, coupled to its associated Lxx node, may be configured as having three input ports.

In alternative embodiments, the RFun circuit 1603 and the TFun circuit 1605 may be multiplexers, function circuits, such as arithmetic or logic circuits, or combinations of multiplexers and function circuits. For example, control signals RNOp 1616 and TNOp 1618 may be used directly to control the RFun circuit 1603 and the TFun circuit 1605, respectively, without need for a decoder. The controls signals RNOp 1616 and TNOp 1618 may be coupled directly to binary multiplexer control inputs, for example, that are used for controlling multiplexers in the respective function circuit. In another alternative embodiment, the decoders 1608 and 1610, in select modes of operation, may pass the control signals through the decoders and the decoders provide no additional decoding function. The nodes 1602 and 1604 may be configured to provide different operations on data coming into the nodes, as may be required by an application. These additional functions may be specified by a more complex decoder implementation of decoders 1608 and 1610 and an expansion of the control signals RNOp 1616 and TNOp 1618. For example, the RFun circuit 1603 and the TFun circuit 1605 may be configured to provide operations on individual data such as specifying shift operations or more complex operations on multiple input paths, such as multiplication, multiplication and accumulation (MAC), compare, addition operations, such as a three input addition for 1 to 3 adjacency networks, a five input addition for 1 to 5 adjacency networks, or the like, complex number operations, or the like may also be specified. A 1 to N adjacency network is described in more detail below. The R00 node 1602 and the T00 node 1604 and their associated decoders may also be separately placed.

Figure 16B:
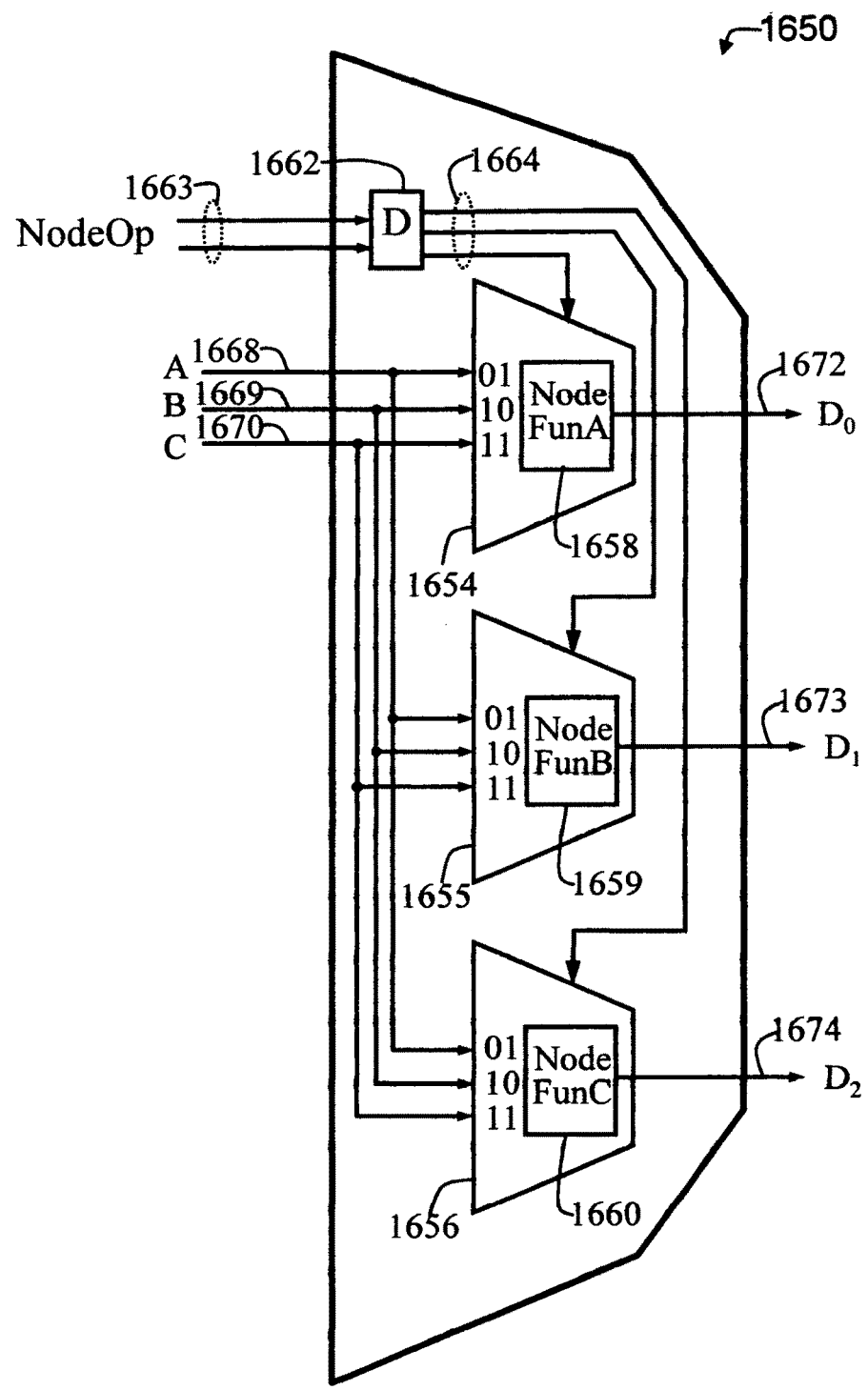

FIG. 16B illustrates another alternative WAM network node 1650 constructed using three sub-node units 1654-1656 comprising input and output interfaces and node function units (NodeFuns) 1658-1660, respectively. Since there are three NodeFuns 1658-1660 in the alternative WAM network node 1650, a decoder 1662 is configured to decode NodeOp input 1663 and generate three sets of control signals 1664 to appropriately control the three NodeFuns 1658-1660. External inputs 1668-1670 to the alternative WAM network node 1650 may be sent from a processor node, a previous node in the network, or from a memory node, for example. In one embodiment, input A 1668 may be selected by NodeFunA 1658, input B 1669 may be selected by NodeFunB 1659, and input C 1670 may be selected by NodeFunC 1660. In other embodiments, the inputs 1668-1670 may be selected by the NodeFuns 1658-1660 in a different order or in different combinations, such as inputs 1668-1670 selected in each of the NodeFuns 1658-1660 and with different operations configured in each of the NodeFun units. Each of the three NodeFuns 1658-1660 may be appropriately configured with a function as required or as selected for a particular implementation. Each output 1672-1674 of the alternative WAM network node 1650 is separately sourced by its associated NodeFuns 1658-1660, respectively.

Figure 17:
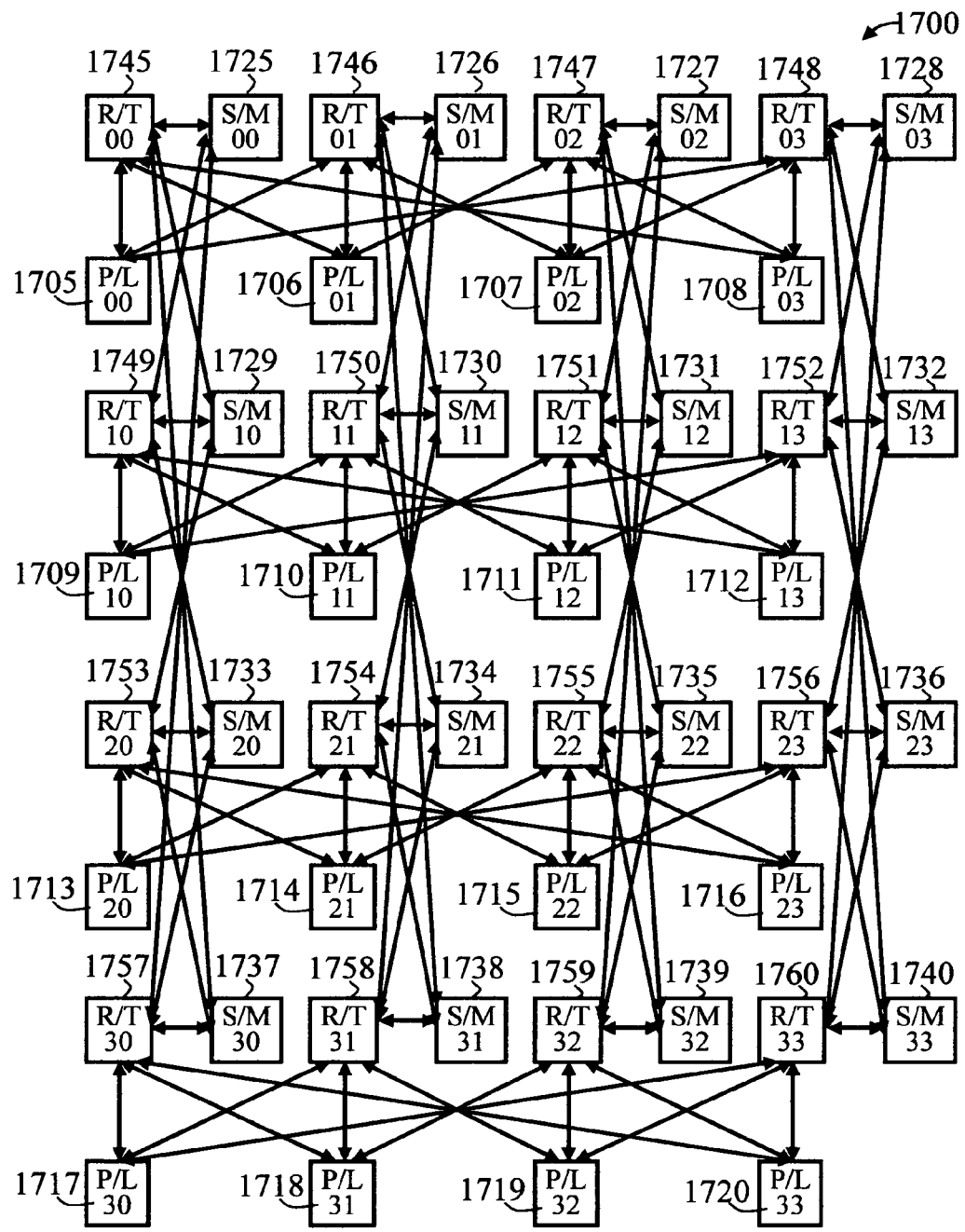
FIG. 17 illustrates an exemplary layout of the WAM16S network of FIG. 4A combined with the alternative WAM16L network of FIG. 7 in a physical layout form in accordance with the present invention.

FIG. 17 illustrates an exemplary configuration 1700 of the WAM16S network of FIG. 4A combined with the alternative WAM16L network of FIG. 7 in a physical layout form in accordance with the present invention. Processor nodes P00-P33 are combined with network nodes L00-L33 as P/L00-P/L33 nodes 1705-1720, respectively. Memory nodes M00-M33 are combined with network nodes S00-S33 as S/M00-S/M33 nodes 1725-1740, respectively. Network nodes R00-R33 are combined with network nodes T00-T33 as R/T00-R/T33 nodes 1745-1760, respectively. The R/T00-R/T33 nodes 1745-1760 are patterned after the exemplary combined network node 1600 of FIG. 16A. The P/L00-P/L33 nodes 1705-1720, the S/M00-S/M33 nodes 1725-1740, and the R/T00-R/T33 nodes 1745-1760 are distributed according to a G×H matrix where G=H=4. Each processor node $P_{g,h}$, memory node $M_{g,h}$, and internal nodes of the network are labeled in a row g by column h format where g∈{0,1,2,3} and h∈{0,1,2,3}. The S/M00-S/M33 nodes 1725-1740 and the R/T00-R/T33 nodes 1745-1760 are separately coupled across each column h. The R/T00-R/T33 nodes 1745-1760 and the P/L00-P/L33 nodes 1705-1720 are separately coupled across each row g. In an exemplary implementation, the P/L00-P/L33 nodes 1705-1720 may be organized on a first layer of a multi-layer silicon chip. A different layer of the chip may be utilized for the coupling between the R/T00-R/T33 nodes 1745-1760 and the P/L00-P/L33 nodes 1705-1720. The coupling between the S/M00-S/M33 nodes 1725-1740 and the WT00-R/T33 nodes 1745-1760 may be configured on a third different layer. In another embodiment the S/M00-S/M33 nodes 1725-1740 may be configured on the top layer of the chip. These and other layout configurations may be used to minimize wire length and implementation complexity. In such an organization, the memory nodes may be overlaid upon the processors in a similar manner as shown in FIG. 4B with load paths and store paths included.

Figure 18:
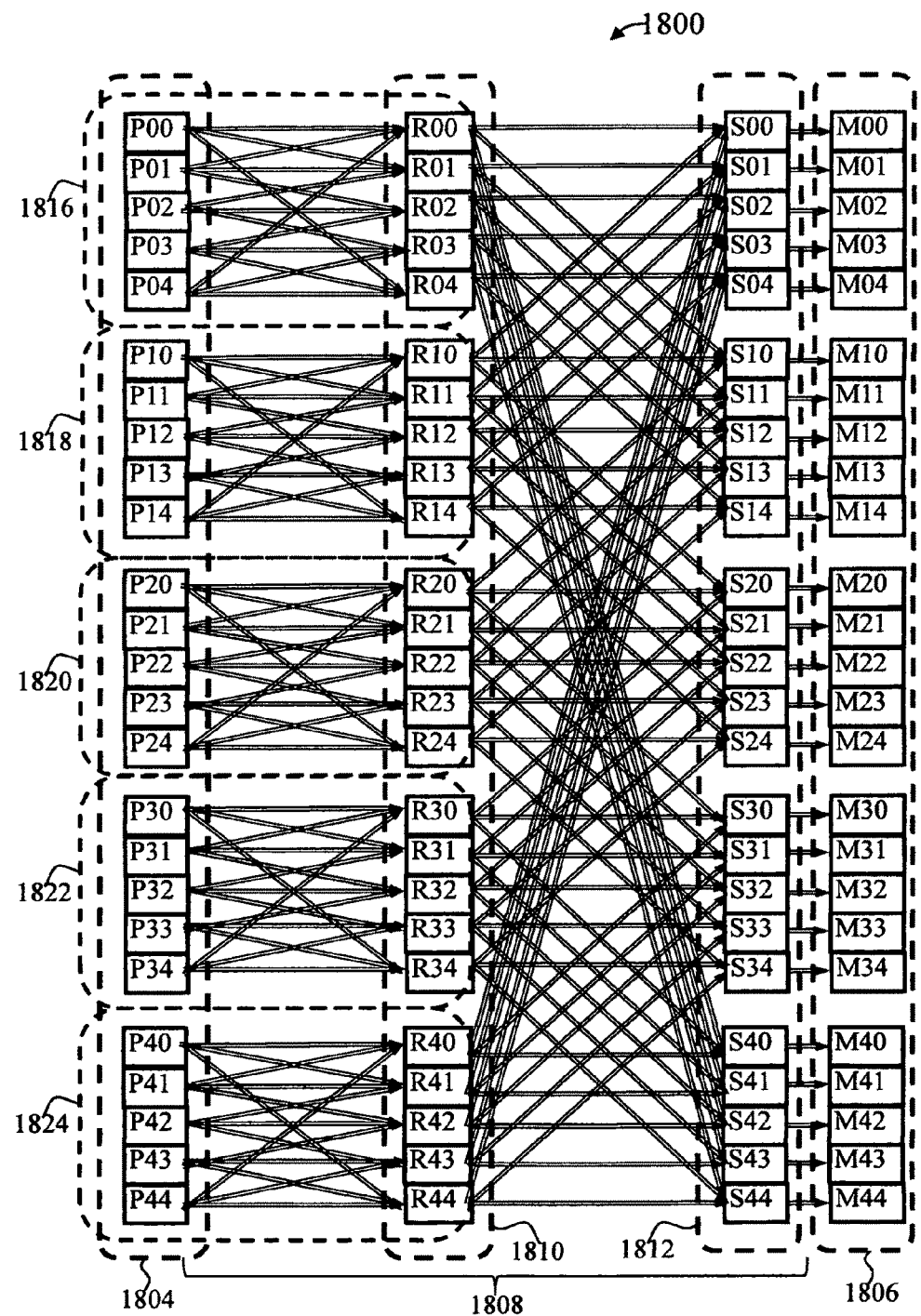
FIG. 18 illustrates a Wings array memory (WAM) twenty five processor (WAM25S) network for store (S) operations.

FIG. 18 illustrates a Wings array memory (WAM) twenty five processor (WAM25S) network 1800 for store (S) operations. The processor nodes 1804 and memory nodes 1806 are organized in linear arrays and identified according to a G×H matrix where, in this example, G equals five representing the number of rows in the matrix and H equals five representing the number of columns. Each processor $P_{g,h}$, memory node $M_{g,h}$, and internal nodes of the two stage network 1808 are labeled in a row g by column h format where g∈{0,1, ..., G−1} and h∈{0,1, ..., H−1}. The processors are not directly connected to each other nor are the memory blocks directly connected to any of the other memory blocks.

The two stage WAM network 1808 couples the processor nodes 1804 and memory nodes 1806 for store operations. A first stage of $R_{g,h}$ nodes 1810 are labeled in a row g by column h matrix. A second stage of $S_{g,h}$ nodes 1812 are also labeled in a row g by column h matrix. The processors $P_{g,h}$ each have an output, the memory nodes $M_{g,h}$ each have an input, and the $R_{g,h}$ nodes and the $S_{g,h}$ nodes each have three inputs and an output. The processors $P_{g,h}$, the memory blocks $M_{g,h}$, the multiplexers $R_{g,h}$, and the multiplexers $S_{g,h}$ are labeled in the figures as Pgh, Mgh, Rgh, and Sgh, respectively, for ease of notation and reference in the figures. The first stage of processors $P_{g,h}$ and $R_{g,h}$ nodes are partitioned into groups by rows of the G=5×H=5 matrix. For example, in the g=0 row 1816, the outputs of the processors P00, P01, P02, P03, and P04 are coupled to the inputs of the R00, R01, R02, R03, and R04 nodes. For the g=1 row 1818, the outputs of the processors P10, P11, P12, P13, and P14 are coupled to the inputs of the R10, R11, R12, R13, and R14 nodes. For the g=2 row 1820, the outputs of the processors P20, P21, P22, P23, and P24 are coupled to the inputs of the R20, R21, R22, R23, and R24 nodes. For the g=3 row 1822, processors P30, P31, P32, P33, and P34 are coupled to the R30, R31, R32, R33, and R34 nodes. For the g=4 row 1824, processors P40, P41, P42, P43, and P44 are coupled to the R40, R41, R42, R43, and R44 nodes.

In each group, the connections are made according to an adjacency of nodes in a first dimension. For example, in the g=0 row 1816, P00 is coupled to R00, R01, and R04. P01 is coupled to R00, R01, and R02. P02 is coupled to R01, R02, and R03. P03 is coupled to R02, R03, and R04. P04 is coupled to R00, R03, and R04. Each processor in the g=1 row 1818, P10-P14, the g=2 row 1820 P20-P24, the g=3 row 1822 P30-P34, and g=4 row 1824 P40-P44, are coupled to R nodes in a similar fashion as the g=0 row 1816 according to the nodes adjacency in the rows.

The $R_{g,h}$ nodes are coupled to the $S_{g,h}$ nodes according to an adjacency of nodes in a second dimension. Each output of the $S_{g,h}$ nodes is coupled to the input of their associated memory node at the same row column position. A processor executing a store operation can write data to a single memory node or combinations of up to nine memory nodes from the memory array 1806. For example, processor P21 can store data to memories in its coupled group of memory nodes, including M10, M20, M30, M11, M21, M31, M12, M22, and M32.

The adjacency of nodes is represented by a G×H matrix where the nodes of the matrix may be processors, arithmetic function units, memory nodes, multiplexers, sensors, or the like, generally, having nodes $N_{g,h}$ where $g \in \{0,1,\ldots,G-1\}$ and $h \in \{0,1,\ldots,H-1\}$. A connection network, such as the WAM25S network 1800 of FIG. 18, may be generalized as having a first set of nodes, such as processor nodes $P_{g,h}$, for example, coupled to a second set of nodes $R_{g,h}$ which are coupled to a third set of nodes $S_{g,h}$. The third set of nodes $S_{g,h}$ then are coupled to a fourth set of nodes, such as memory nodes $M_{g,h}$, for example.

The store connectivity of the nodes can be viewed as follows:

| Output of Node | Coupled to an input of the Nodes | Where |
|---|---|---|
| $P_{g,h}$ | $R_{g,h}, R_{g,h+1}$, and $R_{g,h-1}$ | h + 1 wraps to 0 when h + 1 = H and h − 1 wraps to H − 1 when h − 1 = −1 |

The $R_{g,h}$ nodes are coupled to the $S_{g,h}$ nodes as follows:

| Output of Node | Coupled to an input of the Nodes | Where |
|---|---|---|
| $R_{g,h}$ | $S_{g,h}, S_{g+1,h}$, and $S_{g-1,h}$ | g + 1 wraps to 0 when g + 1 = G and g − 1 wraps to G − 1 when g − 1 = −1 |

The nodes $S_{g,h}$ nodes are coupled to the $M_{g,h}$ nodes as follows:

| Output of Node | Connects to the input of the Node |
|---|---|
| $S_{g,h}$ | $M_{g,h}$ |

A connectivity matrix $A_4$ for the connections between the processors $P_{g,h}$ and the $R_{g,h}$ nodes in a row g=0, termed a 1 to 3 adjacency for notational purposes, for the WAM16S network of FIG. 4A is shown in Table 1. A "1" in a cell of the connectivity matrix indicates a connection between the PEs and R nodes in a row. For example, three "1"s populate P02 row, indicating that P02 connects to R01, R02, and R03 but not to R00. Table 2 is a 4×4 identity matrix $I_4$.

TABLE 1

|  | 4 × 4 | R00 | R01 | R02 | R03 |
|---|---|---|---|---|---|
| $A_4 =$ | P00 | 1 | 1 | 0 | 1 |
|  | P01 | 1 | 1 | 1 | 0 |
|  | P02 | 0 | 1 | 1 | 1 |
|  | P03 | 1 | 0 | 1 | 1 |

TABLE 2

| $I_4 =$ | 1 | 0 | 0 | 0 |
|---|---|---|---|---|
|  | 0 | 1 | 0 | 0 |
|  | 0 | 0 | 1 | 0 |
|  | 0 | 0 | 0 | 1 |

Tensor product algebra is used to describe the Wings network connectivity. Using tensor product notation, a tensor product of two matrices $Y_2$ and $I_4$ is $I_4 \otimes Y_2$, where $I_4$ is the identity matrix and $$Y_2 = \begin{bmatrix} a & b \\ c & d \end{bmatrix}:$$

$$\left(\begin{bmatrix} 1 & 0 & 0 & 0 \\ 0 & 1 & 0 & 0 \\ 0 & 0 & 1 & 0 \\ 0 & 0 & 0 & 1 \end{bmatrix} \otimes \begin{bmatrix} a & b \\ c & d \end{bmatrix}\right) = \begin{bmatrix} a & b & 0 & 0 & 0 & 0 & 0 & 0 \\ c & d & 0 & 0 & 0 & 0 & 0 & 0 \\ 0 & 0 & a & b & 0 & 0 & 0 & 0 \\ 0 & 0 & c & d & 0 & 0 & 0 & 0 \\ 0 & 0 & 0 & 0 & a & b & 0 & 0 \\ 0 & 0 & 0 & 0 & c & d & 0 & 0 \\ 0 & 0 & 0 & 0 & 0 & 0 & a & b \\ 0 & 0 & 0 & 0 & 0 & 0 & c & d \end{bmatrix}$$

$Y_2 \otimes I_4$, where $I_4$ is the identity matrix and $$Y_2 = \begin{bmatrix} a & b \\ c & d \end{bmatrix}:$$

$$\left(\begin{bmatrix} a & b \\ c & d \end{bmatrix} \otimes \begin{bmatrix} 1 & 0 & 0 & 0 \\ 0 & 1 & 0 & 0 \\ 0 & 0 & 1 & 0 \\ 0 & 0 & 0 & 1 \end{bmatrix}\right) = \begin{bmatrix} a & 0 & 0 & 0 & b & 0 & 0 & 0 \\ 0 & a & 0 & 0 & 0 & b & 0 & 0 \\ 0 & 0 & a & 0 & 0 & 0 & b & 0 \\ 0 & 0 & 0 & a & 0 & 0 & 0 & b \\ c & 0 & 0 & 0 & d & 0 & 0 & 0 \\ 0 & c & 0 & 0 & 0 & d & 0 & 0 \\ 0 & 0 & c & 0 & 0 & 0 & d & 0 \\ 0 & 0 & 0 & c & 0 & 0 & 0 & d \end{bmatrix}$$

A number of useful properties of tensor products include a mixed product rule $[(A \otimes B)(C \otimes D) = AC \otimes BD]$, an associative property $[A \otimes (B \otimes C) = (A \otimes B) \otimes C]$, and an identity property $[I_{x,y} = I_x \otimes I_y]$.

The first stage of the WAM16S network 400 of FIG. 4A for the processor nodes Pxx to the Rxx nodes may be represented by $I_4 \otimes A_4$ where $\otimes$ indicates the tensor product. The second stage of FIG. 4A for the Rxx nodes to the Sxx nodes may be represented by $A_4 \otimes I_4$. The combination of the two stages is given by:

$$(I_4 \otimes A_4)(A_4 \otimes I_4) = A_4 \otimes A_4$$

The first stage of FIG. 7 for the memory nodes Mxx to the Txx nodes may be represented by $A_4 \otimes I_4$. The second stage of FIG. 7 for the Txx nodes to the Lxx nodes may be represented by $I_4 \otimes A_4$. The combination of the two stages is given by:

$$(A_4 \otimes I_4)(I_4 \otimes A_4) = A_4 \otimes A_4$$

The combination of the store and load networks is given by:

$$(A_4 \otimes A_4)(A_4 \otimes A_4) = (A_4 * A_4) \otimes (A_4 * A_4)$$

For $(A_4 \otimes A_4)(A_4 \otimes A_4)$ to represent a completely connected network, the matrix $(A_4 * A_4)$ must be all ones, otherwise a path is not connected. Using binary matrix multiplication where multiplication of two elements is a logical AND operation and addition of two elements is a logical OR operation, $(A_4*A_4)$ is:

$$\begin{bmatrix} 1 & 1 & 0 & 1 \\ 1 & 1 & 1 & 0 \\ 0 & 1 & 1 & 1 \\ 1 & 0 & 1 & 1 \end{bmatrix} * \begin{bmatrix} 1 & 1 & 0 & 1 \\ 1 & 1 & 1 & 0 \\ 0 & 1 & 1 & 1 \\ 1 & 0 & 1 & 1 \end{bmatrix} = \begin{bmatrix} 1 & 1 & 1 & 1 \\ 1 & 1 & 1 & 1 \\ 1 & 1 & 1 & 1 \\ 1 & 1 & 1 & 1 \end{bmatrix}$$

Thus the combination of the WAM16S network 400 of FIG. 4A and the load WAM16L network 700 of FIG. 7 is a completely connected network with a diameter of 2.

A connectivity matrix $A_5$ for the connections between the processors $P_{g,h}$ and the $R_{g,h}$ nodes in a row g=0, termed a 1 to 3 adjacency for notational purposes, for the WAM25S network of FIG. 18 is shown in Table 3.

TABLE 3

| | 5 × 5 | R00 | R01 | R02 | R03 | R04 |
|---|---|---|---|---|---|---|
| $A_5 =$ | P00 | 1 | 1 | 0 | 0 | 1 |
| | P01 | 1 | 1 | 1 | 0 | 0 |
| | P02 | 0 | 1 | 1 | 1 | 0 |
| | P03 | 0 | 0 | 1 | 1 | 1 |
| | P04 | 1 | 0 | 0 | 1 | 1 |

Table 4 is a 5×5 identity matrix $I_5$.

TABLE 4

| $I_5 =$ | 1 | 0 | 0 | 0 | 0 |
|---|---|---|---|---|---|
| | 0 | 1 | 0 | 0 | 0 |
| | 0 | 0 | 1 | 0 | 0 |
| | 0 | 0 | 0 | 1 | 0 |
| | 0 | 0 | 0 | 0 | 1 |

The WAM25S network of FIG. 18 having two stages may be represented by:

$$(I_5 \otimes A_5)(A_5 \otimes I_5) = A_5 \otimes A_5$$

A corresponding load WAM25L network having two stages may be represented by:

$$(A_5 \otimes I_5)(I_5 \otimes A_5) = A_5 \otimes A_5$$

The combination of the store and load networks may be represented by:

$$(A_5 \otimes A_5)(A_5 \otimes A_5) = (A_5*A_5) \otimes (A_5*A_5)$$

For $(A_5 \otimes A_5)(A_5 \otimes A_5)$ to represent a completely connected network, the matrix $(A_5*A_5)$ must be all ones, otherwise a path is not connected. Using binary matrix multiplication where multiplication of two elements is a logical AND operation and addition of two elements is a logical OR operation, $(A_5*A_5)$ is:

$$\begin{bmatrix} 1 & 1 & 0 & 0 & 1 \\ 1 & 1 & 1 & 0 & 0 \\ 0 & 1 & 1 & 1 & 0 \\ 0 & 0 & 1 & 1 & 1 \\ 1 & 0 & 0 & 1 & 1 \end{bmatrix} * \begin{bmatrix} 1 & 1 & 0 & 0 & 1 \\ 1 & 1 & 1 & 0 & 0 \\ 0 & 1 & 1 & 1 & 0 \\ 0 & 0 & 1 & 1 & 1 \\ 1 & 0 & 0 & 1 & 1 \end{bmatrix} = \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}$$

Thus, the combination of the WAM25S network 1800 of FIG. 18 and the load WAM16L network is a completely connected network with a diameter of 2.

The 4×4 WAM16S/WAM16L combined network having the connectivity network 670 of FIG. 6C has a diameter of 2 between any two processor nodes or between any two memory nodes in the combined network. The 5×5 WAM25S/WAM25L combined network also has a diameter of 2 between any two processor nodes or between any two memory nodes in the combined network.

FIG. 9A illustrates a WAM64 tore network having sixty-four processor elements (Ps), a network for store operations, having sixty-four first stage multiplexers (Rs), sixty-four second stage multiplexers (Ss), sixty-four third stage multiplexers (Vs), and sixty-four memory elements (Ms). The WAM64 store network is based on a G×H×K 3-dimensional cube organization. The first stage connections of FIG. 9A, for connections Pxx to Rxx in a first dimension, where the Rxx nodes are multiplexer nodes, may be represented by $(I_4 \otimes (I_4 \otimes A_4))$. The second stage of FIG. 9A, for connections Rxx to Sxx in a second dimension, where the Sxx nodes are multiplexer nodes, may be represented by $(I_4 \otimes (A_4 \otimes I_4))$. The third stage of FIG. 9A, for connections Sxx to Vxx in a third dimension, where the nodes Vxx are multiplexer nodes, may be represented by $((A_4 \otimes I_4) \otimes I_4)$. The combination of the three stages may be represented by:

$$(I_4 \otimes (I_4 \otimes A_4))(I_4 \otimes (A_4 \otimes I_4))((A_4 \otimes I_4) \otimes I_4) = (A_4 \otimes (A_4 \otimes A_4))$$

Since, without consideration of the direction of the connection paths, the connections for the load network are generally the same as the connections for the store network, the connection matrix for the load network may be represented by $(A_4 \otimes (A_4 \otimes A_4))$. Thus, the combination of the store and load networks may be represented by:

$$(A_4 \otimes (A_4 \otimes A_4))(A_4 \otimes (A_4 \otimes A_4)) = A_4(A_4) \otimes (A_4(A_4) \otimes A_4(A_4))$$

For $(A_4 \otimes (A_4 \otimes A_4))(A_4 \otimes (A_4 \otimes _4))$ to represent a completely connected network, the matrix $A_4(A_4)$ must be all ones, otherwise a path is not connected. As shown above, the matrix $A_4(A_4)$ has been shown to be all ones. Thus, the WAM store network of FIG. 9A combined with a WAM load network of equivalent organization is a completely connected network.

Figure 19A:
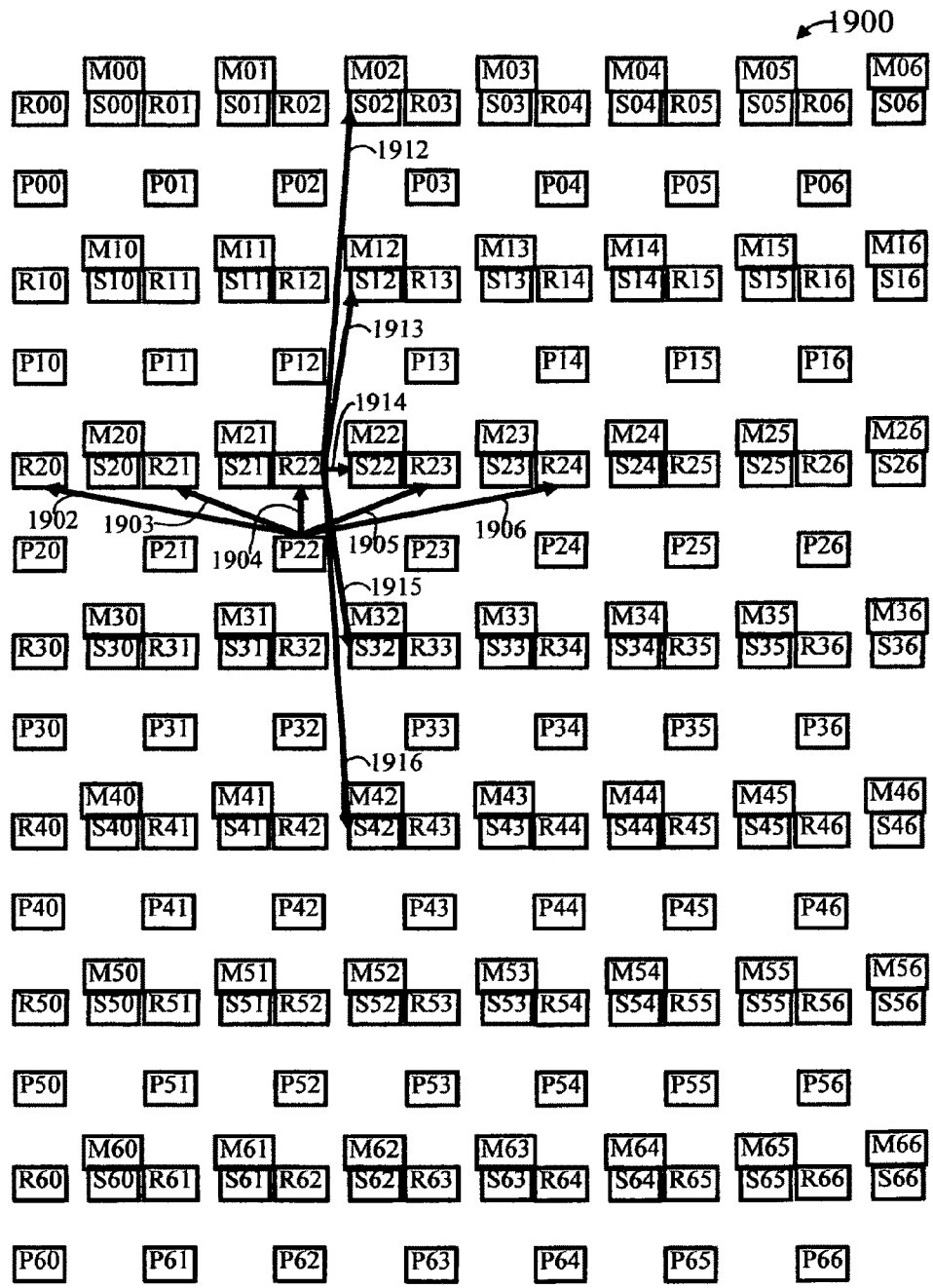
FIG. 19A illustrates a selected processor to memory path in a Wings array memory (WAM) forty nine processor (WAM49S) network for store (S) operations in accordance with the present invention.

FIG. 19A illustrates a representative processor to memory path in a Wings array memory (WAM) forty nine processor (WAM49S) network 1900 for store (S) operations in accordance with the present invention. The processor nodes and memory nodes are identified according to a G=7×H=7 matrix where G equals seven representing the number of rows in the matrix and H equals seven representing the number of columns. The nodes are labeled in a row g by column h format where g∈{0,1,...,G-1} and h∈{0,1,...,H-1}. The processors are not directly connected to each other nor are the memory blocks directly connected to any of the other memory blocks.

The concept of adjacency is extended in a Wings array system. In a standard four neighborhood N×N mesh or torus, a $P_{row,column}(P_{r,c})$ node is adjacent to nodes $P_{r,c-1}$ and $P_{r,c+1}$ in a first dimension. The $P_{r,c+1}$ node is adjacent to the nodes $P_{r,c+2}$ and $P_{r,c}$ in the first dimension. The $P_{r,c-1}$ node is adjacent to the nodes $P_{r,c-2}$ and $P_{r,c}$ in the first dimension. Couplings of the nodes at the edges of a mesh may be implemented in an application specific manner. Wraparound couplings between nodes at the edges of a torus are described in further detail below. Couplings between nodes in a first stage of a Wings array system are made according to a double adjacency of nodes in a first dimension. In the first stage, a double adjacency of nodes in a first dimension is defined for a $P_{r,c}$ node to be coupled to nodes $R_{r,c-2}, R_{r,c-1}, R_{r,c}, R_{r,c+1}$, and $R_{r,c+2}$. For example, the representative P22 node to memory path for the first stage begins with the P22 node coupled to node R20 over path 1902, to node R21 over path 1903, to node R22 over path 1904, to node R23 over path 1905, and to node R24 over path 1906. Couplings between nodes in a second stage of the Wings array system are made according to a double adjacency of nodes in a second dimension. In the second stage, a double adjacency of nodes in a second dimension is defined for an $R_{r,c}$ node to be coupled to nodes $S_{r-2,c}, S_{r-1,c}, S_{r,c}, S_{r+1,c},$ and $S_{r+2,c}$. For example, in the second stage, the R22 node is coupled to node S02 over path 1912, to node S12 over path 1913, to node S22 over path 1914, to node S32 over path 1915, and to node S42 over path 1916. In a Wings array memory network, a processor node executing a store operation can write data to a single memory node or to combinations of up to twenty five memory nodes.

Figure 19B:
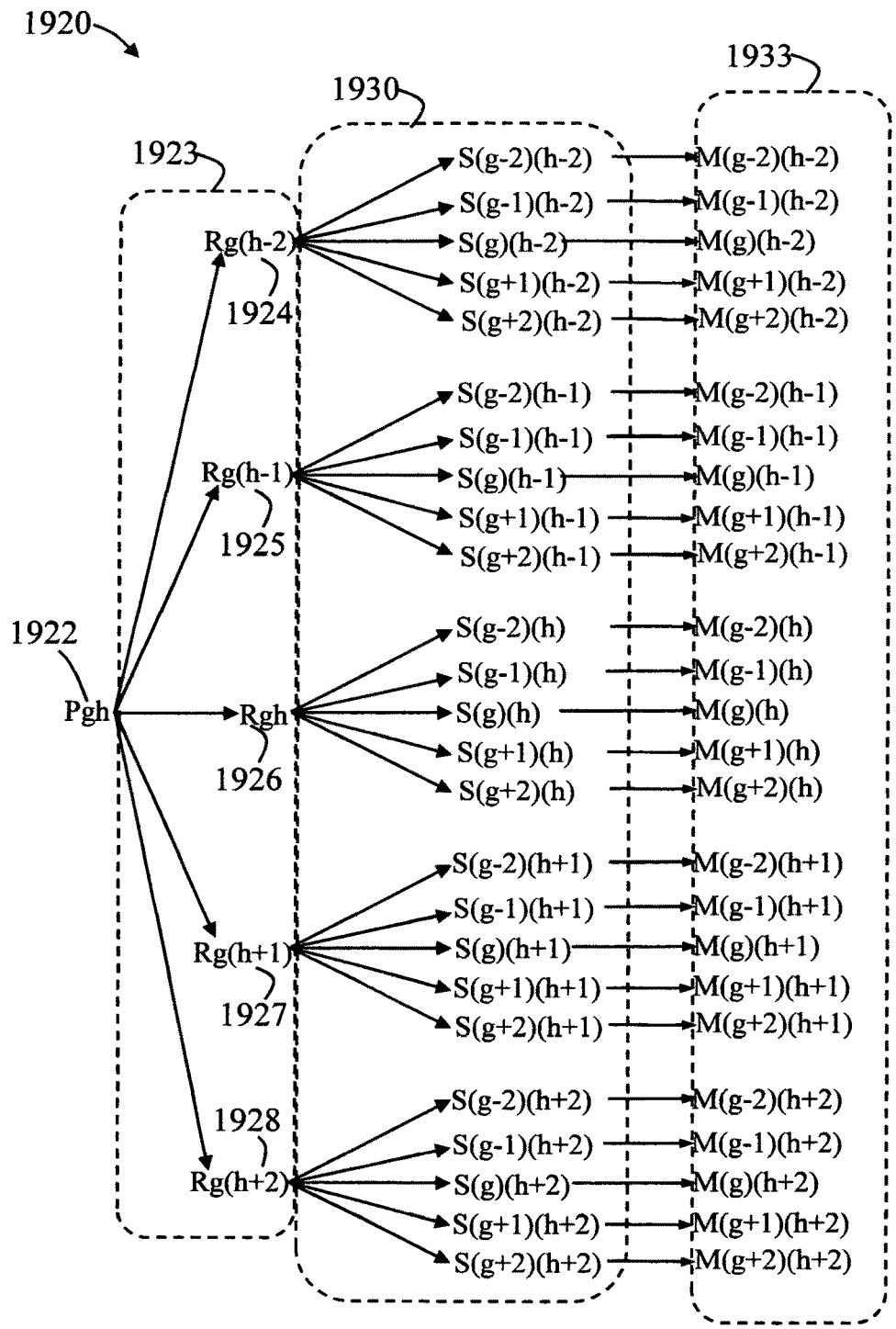
FIG. 19B illustrates a general form of a double adjacency store path selected from the WAM49S network of FIG. 19A in accordance with the present invention.

The double adjacency of nodes is represented in a G×H matrix where the nodes of the matrix may be processors, arithmetic function units, memory nodes, multiplexers, sensors, or the like, generally, having nodes $N_{g,h}$ where $g \in \{0,1,\ldots,G-1\}$ and $h \in \{0,1,\ldots,H-1\}$. FIG. 19B illustrates a general form of a double adjacency store path 1920 selected from the WAM49S network 1900 of FIG. 19A in accordance with the present invention. The store path begins at $P_{g,h}$ 1922 connecting in a first stage 1923 of a WAM49S network to five R nodes 1924-1928. The five R nodes 1924-1928 connect in a second stage 1930 of the WAM49S network to twenty five S nodes that each connect directly to a corresponding memory node in the twenty five memory nodes group 1933.

The adjacent connections are as follows:

| Output of Node | Coupled to an input of the Nodes | Where |
|---|---|---|
| $P_{g,h}$ | $R_{g,h}, R_{g,h+1}, R_{g,h+2},$ $R_{g,h-1},$ and $R_{g,h-2}$ | h + 1 wraps to 0 when h + 1 = H, h + 2 wraps to 0 when h + 2 = H, h + 2 wraps to 1 when h + 2 = H + 1 and h − 1 wraps to H − 1 when h − 1 = −1, h − 2 wraps to H − 1 when h − 2 = −1, h − 2 wraps to H − 2 when h − 2 = −2 |

The $R_{g,h}$ nodes are coupled to the $S_{g,h}$ nodes as follows:

| Output of Node | Coupled to an input of the Nodes | Where |
|---|---|---|
| $R_{g,h}$ | $S_{g,h}, S_{g+1,h}, S_{g+2,h},$ $S_{g-1,h},$ and $S_{g-2,h}$ | g + 1 wraps to 0 when g + 1 = G, g + 2 wraps to 0 when g + 2 = G, g + 2 wraps to 1 when g + 2 = G + 1 and g − 1 wraps to G − 1 when g − 1 = −1, g − 2 wraps to G − 1 when g − 2 = −1, g − 2 wraps to G − 2 when g − 2 = −2 |

The nodes $S_{g,h}$ nodes are coupled to the $M_{g,h}$ nodes as follows:

| Output of Node | Connects to the input of the Node |
|---|---|
| $S_{g,h}$ | $M_{g,h}$ |

Figure 19C:
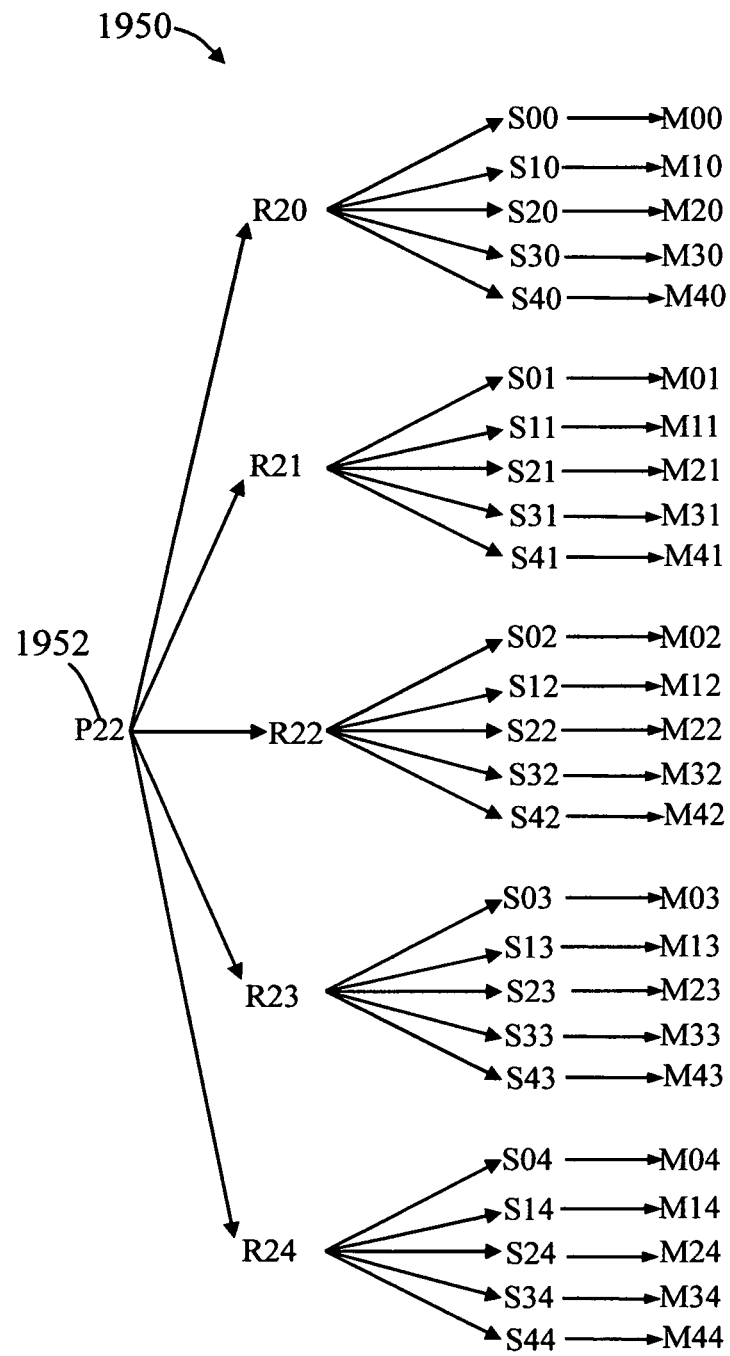
FIG. 19C illustrates an exemplary double adjacency store path selected from the WAM49S network.

FIG. 19C illustrates an exemplary double adjacency store path 1950 selected from the WAM49S network 1900. The store path 1950 begins at P22 1952. This store path 1950 is formed by substituting g=2 and h=2 in the subscripted notation of the general form of the double adjacency store path 1920 in FIG. 19B. For example, processor P22 can store data to memories in its coupled group of twenty five memory nodes, including M00, M10, M20, M30, M40, M01, M11, M21, M31, M41, M02, M12, M22, M32, M42, M03, M13, M23, M33, M43, M04, M14, M24, M34, and M44.

A connectivity matrix $A_7$ for the connections between the nodes $P_{g,h}$ and the nodes $R_{g,h}$ in a row g=0, termed a 1 to 5 double adjacency for notational purposes, for the WAM49S network of FIG. 19A is shown in Table 5.

TABLE 5

|  | 7 × 7 | R00 | R01 | R02 | R03 | R04 | R05 | R06 |
|---|---|---|---|---|---|---|---|---|
| $A_7 =$ | P00 | 1 | 1 | 1 | 0 | 0 | 1 | 1 |
|  | P01 | 1 | 1 | 1 | 1 | 0 | 0 | 1 |
|  | P02 | 1 | 1 | 1 | 1 | 1 | 0 | 0 |
|  | P03 | 0 | 1 | 1 | 1 | 1 | 1 | 0 |
|  | P04 | 0 | 0 | 1 | 1 | 1 | 1 | 1 |
|  | P05 | 1 | 0 | 0 | 1 | 1 | 1 | 1 |
|  | P06 | 1 | 1 | 0 | 0 | 1 | 1 | 1 |

Table 6 is a 7×7 identity matrix $I_7$.

TABLE 6

| $I_7 =$ | 1 | 0 | 0 | 0 | 0 | 0 | 0 |
|---|---|---|---|---|---|---|---|
|  | 0 | 1 | 0 | 0 | 0 | 0 | 0 |
|  | 0 | 0 | 1 | 0 | 0 | 0 | 0 |
|  | 0 | 0 | 0 | 1 | 0 | 0 | 0 |
|  | 0 | 0 | 0 | 0 | 1 | 0 | 0 |
|  | 0 | 0 | 0 | 0 | 0 | 1 | 0 |
|  | 0 | 0 | 0 | 0 | 0 | 0 | 1 |

The WAM49S network of FIG. 19A having two stages may be represented by:

$$(I_7 \otimes A_7)(A_7 \otimes I_7) = A_7 \otimes A_7$$

A corresponding load WAM49L network with two stages may be represented by:

$$(A_7 \otimes I_7)(I_7 \otimes A_7) = A_7 \otimes A_7$$

The combination of the store and load networks is given by:

$$(A_7 \otimes A_7)(A_7 \otimes A_7) = (A_7 * A_7) \otimes (A_7 * A_7)$$

For $(A_7 \otimes A_7)(A_7 \otimes A_7)$ to represent a completely connected network, the matrix $(A_7 * A_7)$ must be all ones, otherwise a path is not connected. Using binary matrix multiplication where multiplication of two elements is a logical AND operation and addition of two elements is a logical OR operation, $(A_7 * A_7)$ is:

$$\begin{bmatrix} 1 & 1 & 1 & 0 & 0 & 1 & 1 \\ 1 & 1 & 1 & 1 & 0 & 0 & 1 \\ 1 & 1 & 1 & 1 & 1 & 0 & 0 \\ 0 & 1 & 1 & 1 & 1 & 1 & 0 \\ 0 & 0 & 1 & 1 & 1 & 1 & 1 \\ 1 & 0 & 0 & 1 & 1 & 1 & 1 \\ 1 & 1 & 0 & 0 & 1 & 1 & 1 \end{bmatrix} * \begin{bmatrix} 1 & 1 & 1 & 0 & 0 & 1 & 1 \\ 1 & 1 & 1 & 1 & 0 & 0 & 1 \\ 1 & 1 & 1 & 1 & 1 & 0 & 0 \\ 0 & 1 & 1 & 1 & 1 & 1 & 0 \\ 0 & 0 & 1 & 1 & 1 & 1 & 1 \\ 1 & 0 & 0 & 1 & 1 & 1 & 1 \\ 1 & 1 & 0 & 0 & 1 & 1 & 1 \end{bmatrix} = \begin{bmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{bmatrix}$$

Thus, the combination of the WAM49S network 1900 of FIG. 19A and the corresponding load WAM49L network is a completely connected network with a diameter of 2.

A connectivity matrix $A_9$ for the connections between the processors $P_{g,h}$ and the $R_{g,h}$ nodes in a row g=0, termed a 1 to 5 double adjacency for notational purposes, for a 9×9 WAM81S network is shown in Table 7.

TABLE 7

| 9×9 | | R00 | R01 | R02 | R03 | R04 | R05 | R06 | R07 | R08 |
|---|---|---|---|---|---|---|---|---|---|---|
| $A_9 =$ | P00 | 1 | 1 | 1 | 0 | 0 | 0 | 0 | 1 | 1 |
| | P01 | 1 | 1 | 1 | 1 | 0 | 0 | 0 | 0 | 1 |
| | P02 | 1 | 1 | 1 | 1 | 1 | 0 | 0 | 0 | 0 |
| | P03 | 0 | 1 | 1 | 1 | 1 | 1 | 0 | 0 | 0 |
| | P04 | 0 | 0 | 1 | 1 | 1 | 1 | 1 | 0 | 0 |
| | P05 | 0 | 0 | 0 | 1 | 1 | 1 | 1 | 1 | 0 |
| | P06 | 0 | 0 | 0 | 0 | 1 | 1 | 1 | 1 | 1 |
| | P07 | 1 | 0 | 0 | 0 | 0 | 1 | 1 | 1 | 1 |
| | P08 | 1 | 1 | 0 | 0 | 0 | 0 | 1 | 1 | 1 |

Table 8 is a 9×9 identity matrix $I_9$.

TABLE 8

| $I_9 =$ | 1 | 0 | 0 | 0 | 0 | 0 | 0 | 0 | 0 |
|---|---|---|---|---|---|---|---|---|---|
| | 0 | 1 | 0 | 0 | 0 | 0 | 0 | 0 | 0 |
| | 0 | 0 | 1 | 0 | 0 | 0 | 0 | 0 | 0 |
| | 0 | 0 | 0 | 1 | 0 | 0 | 0 | 0 | 0 |
| | 0 | 0 | 0 | 0 | 1 | 0 | 0 | 0 | 0 |
| | 0 | 0 | 0 | 0 | 0 | 1 | 0 | 0 | 0 |
| | 0 | 0 | 0 | 0 | 0 | 0 | 1 | 0 | 0 |
| | 0 | 0 | 0 | 0 | 0 | 0 | 0 | 1 | 0 |
| | 0 | 0 | 0 | 0 | 0 | 0 | 0 | 0 | 1 |

The WAM81S network having two stages may be represented by:

$$(I_9 \otimes A_9)(A_9 \otimes I_9) = A_9 \otimes A_9$$

A WAM81L network two stages may be represented by:

$$(A_9 \otimes I_9)(I_9 \otimes A_9) = A_9 \otimes A_9$$

The combination of the store and load networks may be represented by:

$$(A_9 \otimes A_9)(A_9 \otimes A_9) = (A_9 * A_9) \otimes (A_9 * A_9)$$

For $(A_9 \otimes A_9)(A_9 \otimes A_9)$ to represent a completely connected network, the matrix $(A_9 * A_9)$ must be all ones, otherwise a path is not connected. Using binary matrix multiplication where multiplication of two elements is a logical AND operation and addition of two elements is a logical OR operation, $(A_9 * A_9)$ is:

$$\begin{bmatrix} 1 & 1 & 1 & 0 & 0 & 0 & 0 & 1 & 1 \\ 1 & 1 & 1 & 1 & 0 & 0 & 0 & 0 & 1 \\ 1 & 1 & 1 & 1 & 1 & 0 & 0 & 0 & 0 \\ 0 & 1 & 1 & 1 & 1 & 1 & 0 & 0 & 0 \\ 0 & 0 & 1 & 1 & 1 & 1 & 1 & 0 & 0 \\ 0 & 0 & 0 & 1 & 1 & 1 & 1 & 1 & 0 \\ 0 & 0 & 0 & 0 & 1 & 1 & 1 & 1 & 1 \\ 1 & 0 & 0 & 0 & 0 & 1 & 1 & 1 & 1 \\ 1 & 1 & 0 & 0 & 0 & 0 & 1 & 1 & 1 \end{bmatrix} * \begin{bmatrix} 1 & 1 & 1 & 0 & 0 & 0 & 0 & 1 & 1 \\ 1 & 1 & 1 & 1 & 0 & 0 & 0 & 0 & 1 \\ 1 & 1 & 1 & 1 & 1 & 0 & 0 & 0 & 0 \\ 0 & 1 & 1 & 1 & 1 & 1 & 0 & 0 & 0 \\ 0 & 0 & 1 & 1 & 1 & 1 & 1 & 0 & 0 \\ 0 & 0 & 0 & 1 & 1 & 1 & 1 & 1 & 0 \\ 0 & 0 & 0 & 0 & 1 & 1 & 1 & 1 & 1 \\ 1 & 0 & 0 & 0 & 0 & 1 & 1 & 1 & 1 \\ 1 & 1 & 0 & 0 & 0 & 0 & 1 & 1 & 1 \end{bmatrix} = \begin{bmatrix} 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \end{bmatrix}$$

The 9×9 WAM81S network having the 1 to 5 double adjacency connectivity network of Table 7 when combined with a 9×9 WAM81L network has a diameter of 2 between any two processor nodes or between any two memory nodes in the combined network. Using a similar process, as described above, a 1 to 7 triple adjacency connectivity network may be constructed and used to show that a 7×7 network is configurable for a diameter of one and a network up to a 13×13 network is configurable using load and store communications for a diameter of two. Couplings between nodes in a first stage of a Wings array system are made according to a triple adjacency of nodes in a first dimension. In the first stage, a triple adjacency of nodes in a first dimension is defined for a $P_{r,c}$ node to be coupled to nodes $R_{r,c-3}$, $R_{r,c-2}$, $R_{r,c-1}$, $R_{r,c}$, $R_{r,c+1}$, $R_{r,c+2}$, and $R_{r,c+3}$. Couplings between nodes in a second stage of the Wings array system are made according to a triple adjacency of nodes in a second dimension. In the second stage, a triple adjacency of nodes in a second dimension is defined for a $R_{r,c}$ node to be coupled to nodes $S_{r-3,c}$, $S_{r-2,c}$, $S_{r-1,c}$, $S_{r,c}$, $S_{r+1,c}$, $S_{r+2,c}$, and $S_{r+3,c}$. Also, using a similar process, as described above, a 1 to 9 quadruple adjacency connectivity network may be constructed and used to show that a 9×9 network is configurable for a diameter of one and a network up to a 17×17 network is configurable using load and store communications for a diameter of two.

In general, couplings between nodes in a first stage of a Wings array system are made according to an N-level adjacency of nodes in a first dimension of a G×H matrix of nodes, where $G \geq N$ and $H \geq N$. In the first stage, an N-level adjacency of nodes in a first dimension is defined for a $P_{r,c}$ node to be coupled to nodes $R_{r,c-\lfloor N/2 \rfloor}, \ldots, R_{r,c-2}, R_{4,c-1}, R_{r,c}, R_{r,c+1}, R_{r,c+2}, \ldots R_{r,c+\lfloor N/2 \rfloor}$, where N is a positive odd integer and $\lfloor N/2 \rfloor$ is the floor of N/2 which is the largest integer less than N/2 since N is odd. Couplings between nodes in a second stage of the Wings array system are made according to an N-level adjacency of nodes in a second dimension of the G×H matrix of nodes, where $G \geq N$ and $H \geq N$. In the second stage, an N-level adjacency of nodes in a second dimension is defined for an $R_{r,c}$ node to be coupled to nodes $$S_{r-\lfloor N/2 \rfloor,c}, \ldots, S_{r-2,c}, S_{r-1,c}, S_{r,c}, S_{r+1,c}, S_{r+2,c}, \ldots, S_{r+\lfloor N/2 \rfloor,c}.$$

It is noted that other network configurations may be constructed using the principles of the present invention, such as having mixed levels of adjacency of connections in different dimensions of communication. For example, a network may be constructed having a 1 to 3 single adjacency of connections in a first dimension and a 1 to 5 double adjacency of connections in a second dimension. The choice of whether to use the same level of adjacency of connections in each dimension or a combination of levels of adjacency of connections in different dimensions may be based on an application requirement.

A listing of a number of network adjacency organizations using the same adjacency in each dimension and associated properties is shown in Table 9.

TABLE 9

| Adjacency Connections | 2D Network configurable for a diameter of 1 | 2D Network configurable for a diameter of 2 | 3D Network configurable for a diameter of 2 |
|---|---|---|---|
| 1 to 3 Single Adjacency | 3 × 3 | Up to 5 × 5 | 5 × 5 × 5 |
| 1 to 5 Double Adjacency | 5 × 5 | Up to 9 × 9 | 9 × 9 × 9 |
| 1 to 7 Triple Adjacency | 7 × 7 | Up to 13 × 13 | 13 × 13 × 13 |
| 1 to 9 Quadruple Adjacency | 9 × 9 | Up to 17 × 17 | 17 × 17 × 17 |

Neural network models may provide insights into techniques for solving difficult computer system problems. For example, neural networks generally require highly parallel computations, a high level of connectivity among processing and memory nodes, efficient communication between nodes, and cooperative computing to support learning and artificial intelligence capabilities. The Wings network and computational architecture provides a scalable massively parallel approach that exploits storage and processing in the connections between computational nodes. By using a scalable WAM network using load and store instructions for communications, it may be possible to demonstrate that intelligence is not just a result of computation, but that the couplings between nodes and the information that resides in such couplings plays an equal if not more important role in defining intelligence. Also, a Wings network system supporting neural processing may be switched to more standard forms of parallel computation thereby providing a unique paradigm that combines neural with standard computational techniques.

A 2-dimensional (2D) Wings neural network (2DWNN) processor is defined as a 2D G×H network of neurons, each neuron having an N×N array of synaptic weight values stored in coupled memory nodes, where $G \geq N$, $H \geq N$, and N is determined from a 1 to N adjacency of connections used in the G×H network. A 3-dimensional (3D) Wings neural network processor is defined as a 3D G×H×K network of neurons, each neuron with an N×N×N array of synaptic weight values stored in coupled memory nodes, where $G \geq N$, $H \geq N$, $K \geq N$, and N is determined from a 1 to N adjacency of connections used in the G×H×K network. A virtual neural network is defined for each neuron with an M×M×M array of synaptic weight values stored in the coupled memory nodes, where M is greater than the N determined from the 1 to N adjacency of connections used in the network. For the 2DWNN with a 1 to 3 adjacency of connections, the neuron processors are configured to operate according to:

$$P_{g,h} = F(W_{(g,h),(g-1,h-1)} * P_{g-1,h-1} + W_{(g,h),(g,h-1)} * P_{g,h-1} + W_{(g,h),(g+1,h-1)} * P_{g+1,h-1} + W_{(g,h),(g-1,h)} * P_{g-1,h} + W_{(g,h),(g,h)} * P_{g,h} + W_{(g,h),(g+1,h)} * P_{g+1,h} + W_{(g,h),(g-1,h+1)} * P_{g-1,h+1} + W_{(g,h),(g,h+1)} * P_{g,h+1} + W_{(g,h),(g+1,h+1)} * P_{g+1,h+1}),$$

where $W_{(x),(y)}$ is interpreted to mean the weight of a connection from neuron y to neuron x, for example, the weight $W_{(g,h),(g+1,h-1)}$ is interpreted to mean the weight of a connection from neuron (g+1,h−1) to neuron g,h. The neuron processor P nodes apply a function F, which for a neural network may take the form of a sigmoid function of the received input. The $P_{g,h}$ neuron output is applied to a coupled store network to be communicated to a corresponding memory node $M_{g,h}$ in the N×N array of synaptic weight values.

Figure 20A:
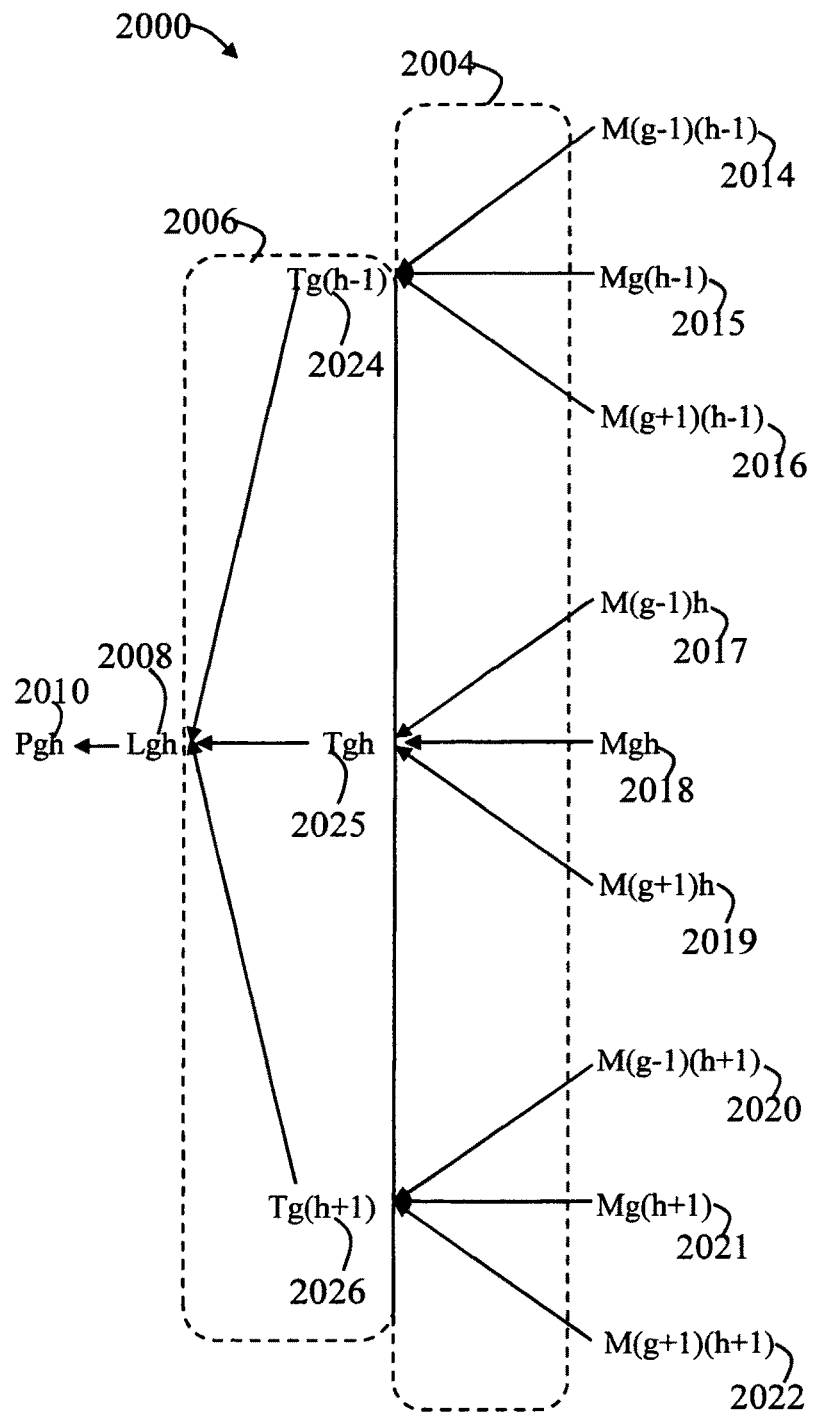
FIG. 20A illustrates a load path to a neuron processor Pgh in accordance with the present invention.

An exemplary 2D neural network may be implemented based on the exemplary configuration 1700 of FIG. 17 which combined the WAM16S network of FIG. 4A with the alternative WAM16L network of FIG. 7. The Wings neural networks are configured with internal nodes having similar capabilities as described for the combined network node 1650 with expanded functions of FIG. 16B. FIG. 20A illustrates a load path 2000 to a neuron processor Pgh 2010 in accordance with the present invention. The L and T nodes comprise arithmetic functions as shown in FIGS. 20B-20E and described in more detail below. Each memory node supplies a current Pgh node value and an associated plurality of weight values to the T nodes in the load network, first stage 2004. Based on the 1 to 3 adjacency of connections, memory nodes 2014-2016 provide current P node values and weight values to Tg(h−1) node 2024, memory nodes 2017-2019 provide current P node values and weight values to Tgh node 2025, and memory nodes 2020-2022 provide current P node values and weight values to Tg(h+1) node 2026. The T nodes 2024-2026 multiply the current P node values with the received weight value and provide a 3 to 1 summation of the multiplied values to the Lgh node 2008 in a second stage 2006. The L nodes provide a summation of weighted neuron values to the neuron processor Pgh 2010 to generate the next neuron value. The newly generated neuron value is communicated back to the memory nodes using a WAM store network. It is noted that registers, buffers, queues and the like which may be required for a particular implementation are not shown for clarity of illustrating the inventive concepts.

Figure 20B:
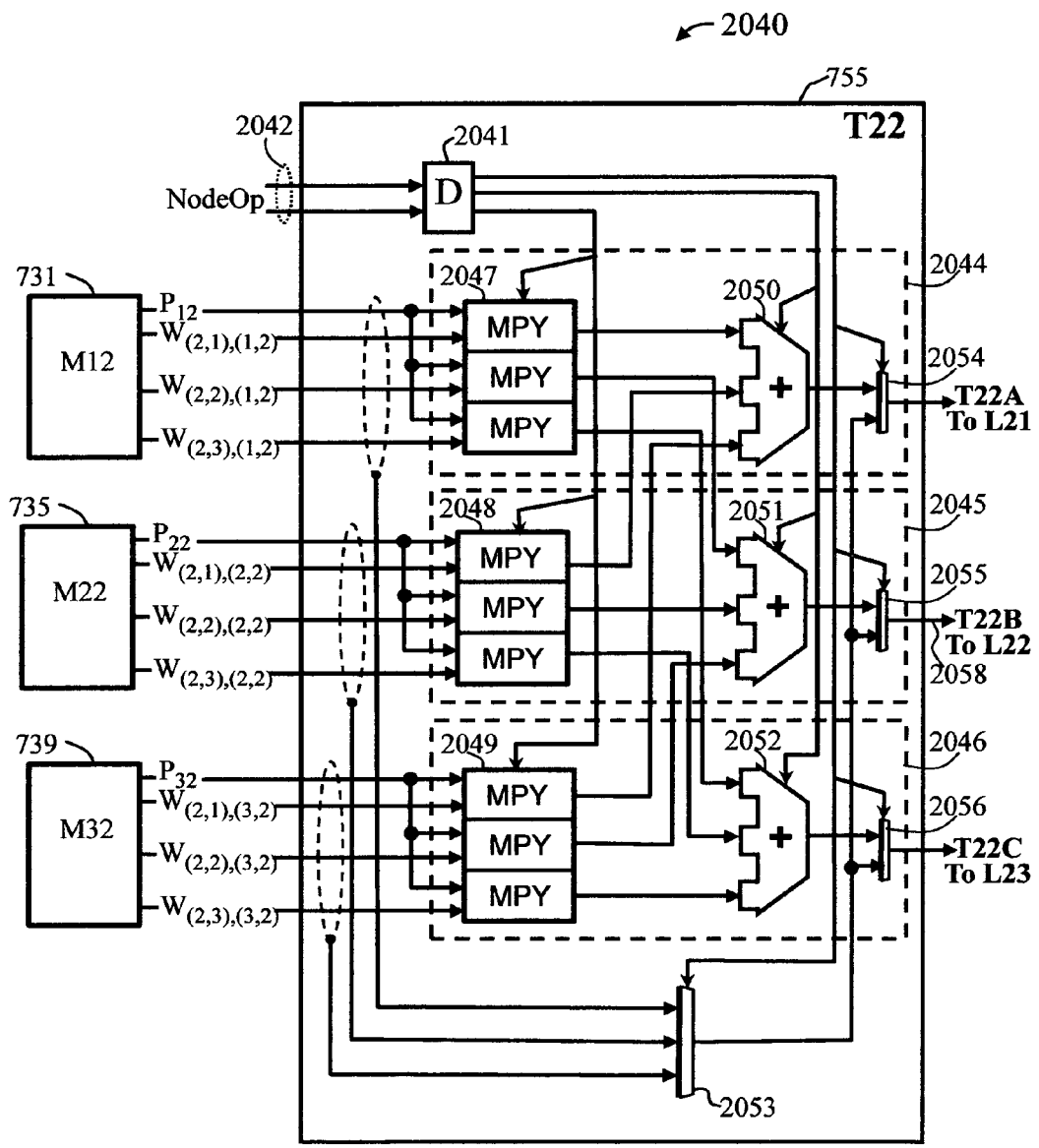
FIG. 20B illustrates an exemplary memory T node system for the $T_{g=2,h=2}$ node in accordance with the present invention.
Figure 20C:
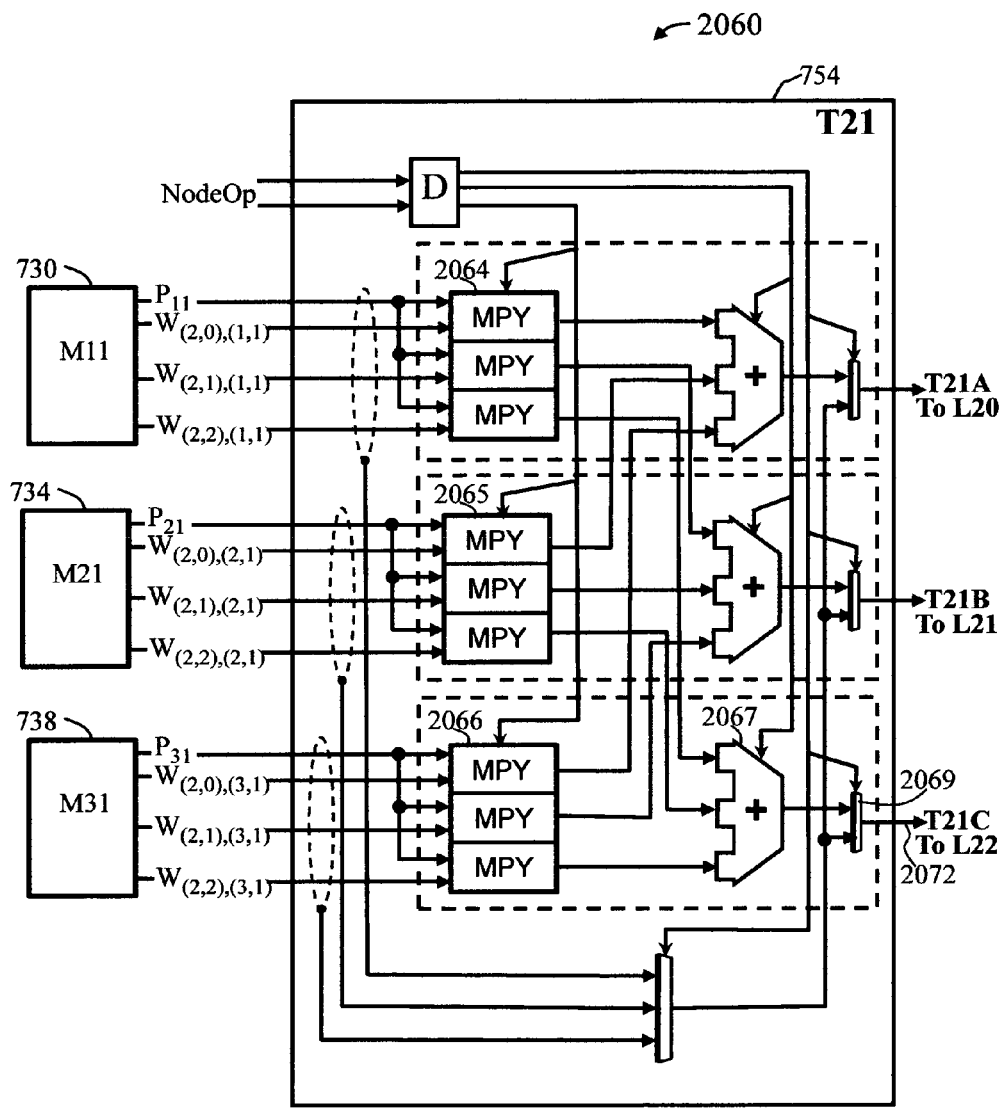
FIG. 20C illustrates an exemplary memory T node system for the $T_{2,1}$ node in accordance with the present invention.
Figure 20D:
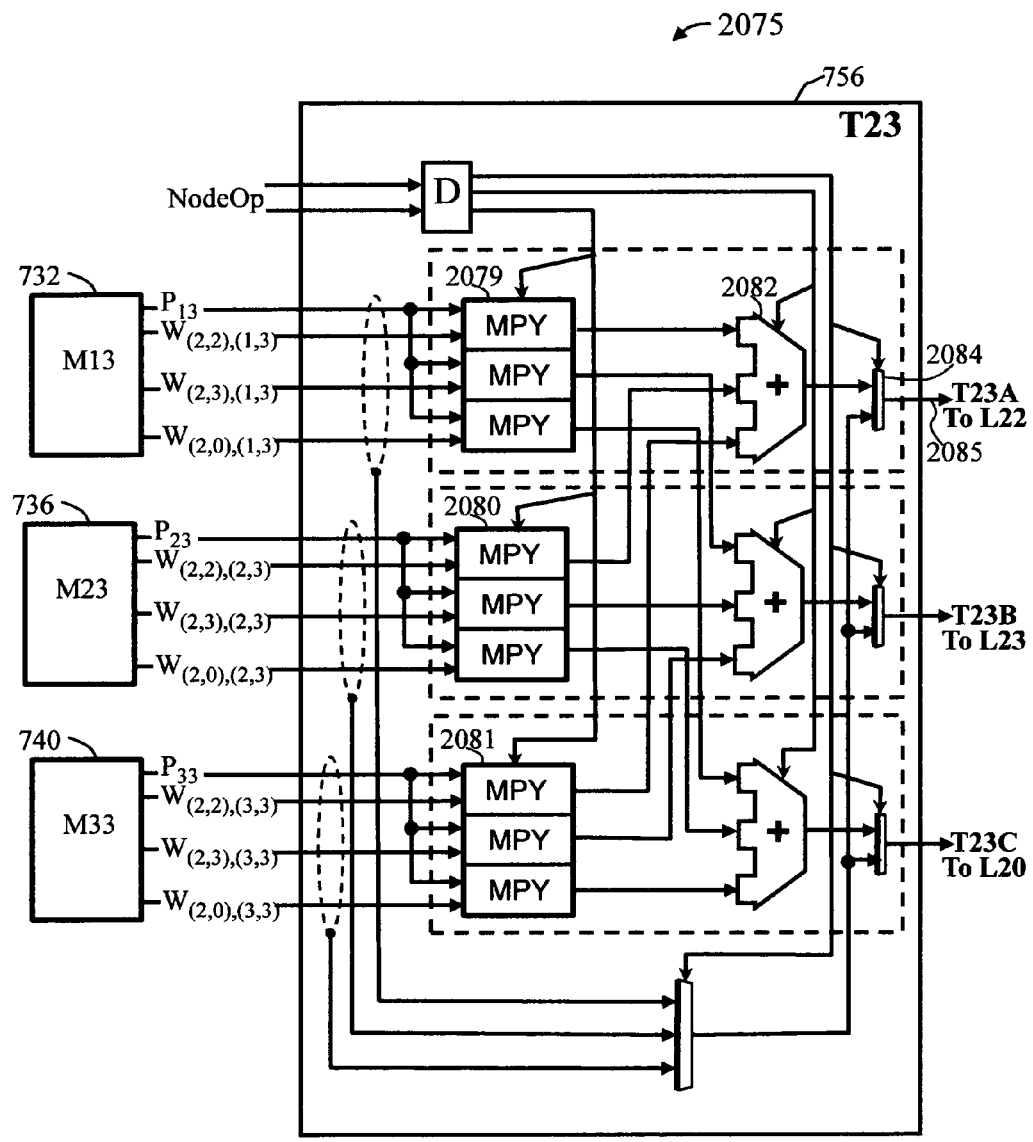
FIG. 20D illustrates an exemplary memory T node system for the $T_{2,3}$ node in accordance with the present invention.

FIGS. 20B, 20C, and 20D illustrate the $T_{g=2,h=2}$ node 2025, $T_{g=2,(h-1)=1}$ node 2024, and the $T_{g=2,(h+1)=3}$ node 2026, respectively, as used in the load path 2000 of Reference to nodes of the WAM16L network 700 is also shown as the load network of the exemplary configuration 1700 of FIG. 17 for clarity of discussion. FIG. 20B illustrates an exemplary memory T node system 2040 for the $T_{g=2,h=2}$ node 755 in accordance with the present invention. The T node system 2040 comprises expanded details of exemplary node T22 755 of FIG. 7, for example, and memory nodes M12 731, M22 735, and M32 739, also of FIG. 7. The node T22 755 comprises a decoder 2041 having node operation (NodeOp) inputs 2042, three node function units 2044-2046 and a multiplexer 2053. The three node function units 2044-2046 comprises three groups of three two-input multipliers 2047-2049, three three-input adders 2050-2052, and three multiplexers 2054-2056. The node T22 755 is coupled to the three memory nodes 731, 735, and 739 which supply the weights and a current neuron value. As controlled by the NodeOp inputs 2042 and decoder 2041, the multipliers 2047-2049 are configured to multiply their input values and provide the results as input to the corresponding three-input adders 2050-2052 that are configured to provide a sum of the weighted neuron node results. The three-input adders 2050-2052 are coupled to corresponding multiplexers 2054-2056. The multiplexer 2053 may be configured to select an output from one of the memories M12 731, M22 735, and M32 739 which is applied as an input to multiplexers 2054-2056. Under control of the decoder 2041, the multiplexers 2054-2056 are configured to select an output of the three-input adders 2050-2052, respectively, or an output from the multiplexer 2053.

Current neuron values and weight values are stored in the memory nodes and may be formatted as 8-bit or 16-bit data values or for application specific implementations may be specified as non-power of 2 data values, for example, to meet specific precision requirements in a fixed point implementation. Alternatively, the neuron and weight values may be formatted, for example, as single precision or double precision floating point values. In one embodiment, a current neuron value and three weight values may be formatted as 8-bit data values and stored in a single addressable location in the memory nodes as 32-bits. Byte addressability may also be supported for access to each individual value. In this embodiment, the nine multipliers 2047-2049 may be 8×8 multipliers each producing, for example, a 16-bit result that is input to one of the three three-input adders 2050-2052. For example, the three-input adder 2051 generates, for example, a 16-bit summation of the three inputs, which may be a rounded or saturating fixed point result. In a different embodiment, floating point arithmetic units may be used in a system appropriately configured for floating point data types.

Operation of the 2D neural network based on the exemplary configuration 1700 of FIG. 17 is described next for operation of neuron P22 which operates according to:

$$P_{2,2}=F(W_{(2,2),(1,1)}*P_{1,1}+W_{(2,2),(2,1)}*P_{2,1}+\\W_{(2,2),(3,1)}*P_{3,1}+W_{(2,2),(1,2)}*P_{1,2}+W_{(2,2),(2,2)}*\\P_{2,2}+W_{(2,2),(3,2)}*P_{3,2}+W_{(2,2),(1,3)}*P_{1,3}+\\W_{(2,2),(2,3)}*P_{2,3}+W_{(2,2),(3,3)}*P_{3,3})$$

The above equation for $P_{2,2}$ can be viewed as a function F that operates on a summation of three parts. The portion $W_{(2,2),(1,2)}*P_{1,2}+W_{(2,2),(2,2)}*P_{2,2}+W_{(2,2),(3,2)}*P_{3,2}$ is generated by node T22 755 of FIG. 20B. The portion $W_{(2,2),(1,1)}*P_{1,1}+W_{(2,2),(2,1)}*P_{2,1}+W_{(2,2),(3,1)}*P_{3,1}$ is generated by node T21 754 of FIG. 20C. The portion $W_{(2,2),(1,3)}*P_{1,3}+W_{(2,2),(2,3)}*P_{2,3}+W_{(2,2),(3,3)}*P_{3,3}$ is generated by node T23 756 of FIG. 20D.

In FIG. 20B, memory node M12 731 provides a current neuron value for P12, and weights $W_{(2,1),(1,2)}$, $W_{(2,2),(1,2)}$, and $W_{(2,3),(1,2)}$. Memory node M22 735 provides a current neuron value for P22 and weights $W_{(2,1),(2,2)}$, $W_{(2,2),(2,2)}$, and $W_{(2,3),(2,2)}$. Memory node M32 739 provides a current neuron value for P32 and weights $W_{(2,1),(3,2)}$, $W_{(2,2),(3,2)}$, and $W_{(2,3),(3,2)}$. The operation path for P22 includes a multiplication $W_{(2,2),(1,2)}*P_{1,2}$ which is generated in the multiply group 2047, a multiplication $W_{(2,2),(2,2)}*P_{2,2}$ which is generated in the multiply group 2048, and another multiplication $W_{(2,2),(3,2)}*P_{3,2}$ which is generated in the multiply group 2049. The three multiplication results are added in the three input adder 2051 to generate $W_{(2,2),(1,2)}*P_{1,2}+W_{(2,2),(2,2)}*P_{2,2}+W_{(2,2),(3,2)}*P_{3,2}$ which is selected for output through multiplexer 2055 on T22B to L22 output 2058.

FIG. 20C illustrates an exemplary memory T node system 2060 for the $T_{2,1}$ node 754 in accordance with the present invention. In FIG. 20C, memory node M11 730 provides a current neuron value for P11, and weights $W_{(2,0),(1,1)}$, $W_{(2,1),(1,1)}$, and $W_{(2,2),(1,1)}$. Memory node M21 734 provides a current neuron value for P21 and weights $W_{(2,0),(2,1)}$, $W_{(2,1),(2,1)}$ and $W_{(2,2),(2,1)}$. Memory node M31 738 provides a current neuron value for P31 and weights $W_{(2,0),(3,1)}$, $W_{(2,1),(3,1)}$, and $W_{(2,2),(3,1)}$. The operation path for P22 includes a multiplication $W_{(2,2),(1,1)}*P_{1,1}$ which is generated in the multiply group 2064, a multiplication $W_{(2,2),(2,1)}*P_{2,1}$ which is generated in the multiply group 2065, and another multiplication $W_{(2,2),(3,1)}*P_{3,1}$ which is generated in the multiply group 2066. The three multiplication results are added in the three input adder 2067 to generate $W_{(2,2),(1,1)}*P_{1,1}+W_{(2,2),(2,1)}*P_{2,1}+W_{(2,2),(3,1)}*P_{3,1}$ which is selected for output through multiplexer 2069 on T21C to L22 output 2072.

FIG. 20D illustrates an exemplary memory T node system 2075 for the $T_{2,3}$ node 756 in accordance with the present invention. In FIG. 20D, memory node M13 732 provides a current neuron value for P13, and weights $W_{(2,2),(1,3)}$, $W_{(2,3),(1,3)}$, and $W_{(2,0),(1,3)}$. Memory node M23 736 provides a current neuron value for P23 and weights $W_{(2,2),(2,3)}$, $W_{(2,3),(2,3)}$ and $W_{(2,0),(2,3)}$. Memory node M33 740 provides a current neuron value for P33 and weights $W_{(2,2),(3,3)}$, $W_{(2,3),(3,3)}$, and $W_{(2,0),(3,3)}$. The operation path for P22 includes a multiplication $W_{(2,2),(1,3)}*P_{1,3}$ which is generated in the multiply group 2079, a multiplication $W_{(2,2),(2,3)}*P_{2,3}$ which is generated in the multiply group 2080, and another multiplication $W_{(2,2),(3,3)}*P_{3,3}$ which is generated in the multiply group 2081. The three multiplication results are added in the three input adder 2082 to generate $W_{(2,2),(1,3)}*P_{1,3}+W_{(2,2),(2,3)}*P_{2,3}+W_{(2,2),(3,3)}*P_{3,3}$ which is selected for output through multiplexer 2084 on T23A to L22 output 2085.

Figure 20E:
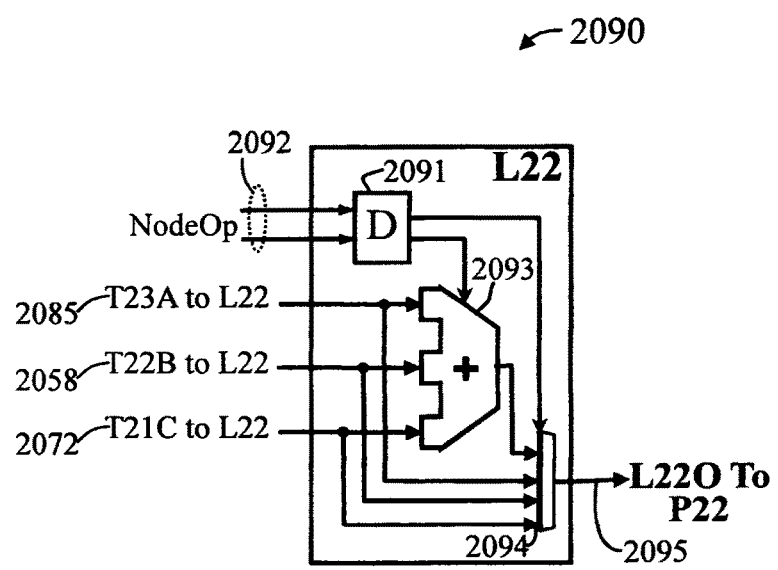
FIG. 20E illustrates a node L22 which provides a summation of the T node outputs generated in the previous stage in accordance with the present invention.

FIG. 20E illustrates a node L22 2090 which provides a summation of the T node outputs generated in the previous stage in accordance with the present invention. The L22 node 2090 corresponds to the L22 node 775 of FIG. 7. The node L22 2090 comprises a decoder 2091, node operation (NodeOp) inputs 2092, a three input adder 2093, and a multiplexer 2094. The T22B to L22 output 2058 from FIG. 20B, the T21C to L22 output 2072, and the T23A to L22 output 2085 are added in the three input adder 2093 and selected for output through multiplexer 2094 on L22O to P22 output 2095. Thus, the L22O to P22 output $2095=W_{(2,2),(1,1)}*P_{1,1}+W_{(2,2),(2,1)}*P_{2,1}+W_{(2,2),(3,1)}*P_{3,1}+W_{(2,2),(1,2)}*P_{1,2}+W_{(2,2),(2,2)}*P_{2,2}+W_{(2,2),(3,2)}*P_{3,2}+W_{(2,2),(1,3)}*P_{1,3}+W_{(2,2),(2,3)}*P_{2,3}+W_{(2,2),(3,3)}*P_{3,3}$. The output of the $L_{ghk}$ node 2008 of FIG. 20A provides a summation of the nine 3×3 adjacent weighted neuron values to the $P_{ghk}$ node 2010. The neuron P22 receives the L22 node output and applies a sigmoid function F, for example, to generate a P22 neuron output.

Figure 21A:
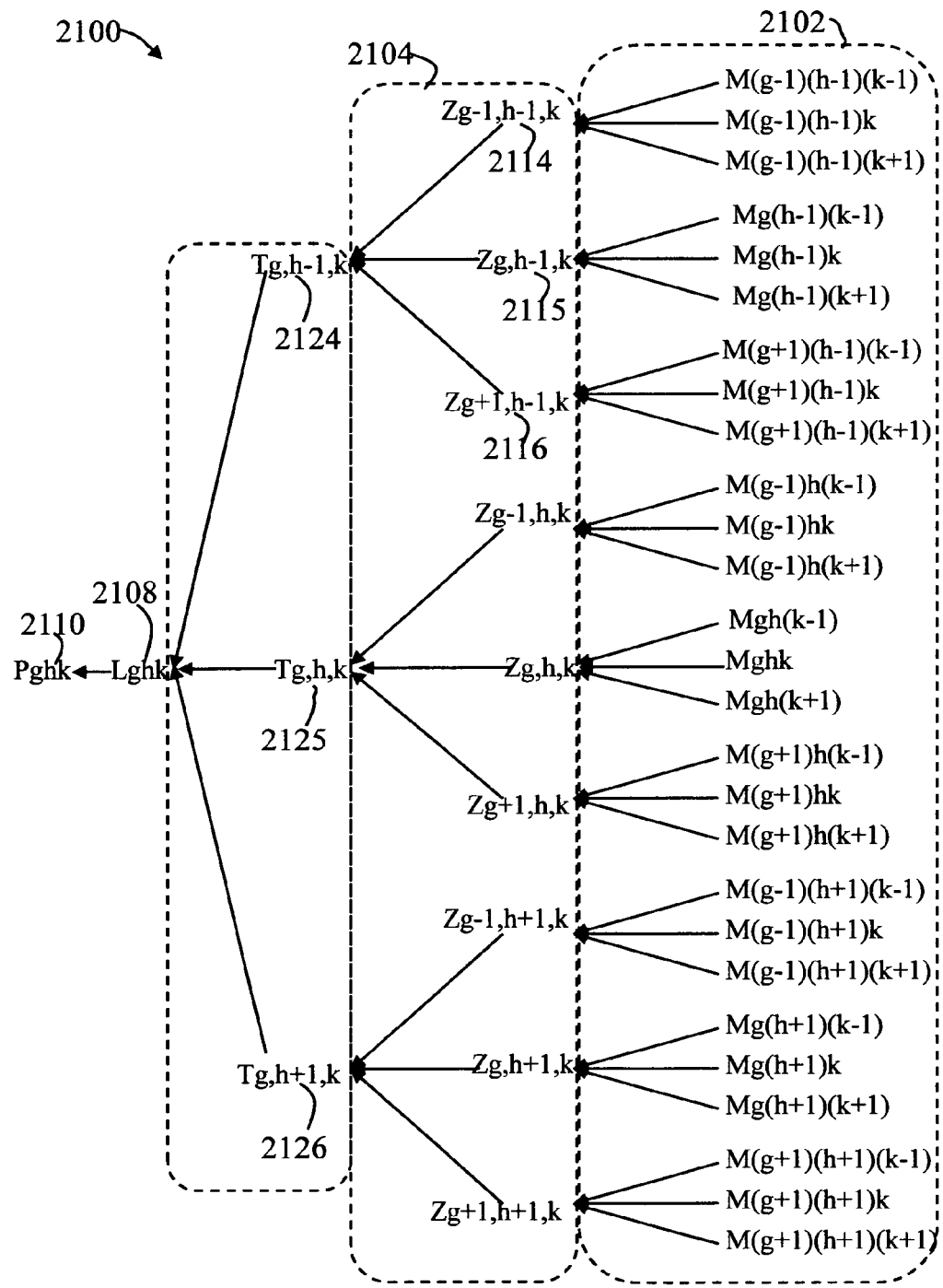
FIG. 21A illustrates a load path to a neuron processor Pghk in accordance with the present invention.

In another example, the WAM64S network 900 of FIG. 9A is combined with a WAM64L network of similar construction to load networks as described above. The networks are configured with internal nodes having similar capabilities as described for the combined network node 1650 with expanded functions of FIG. 16B. FIG. 21A illustrates a load path 2100 to a neuron processor Pghk 2110 in accordance with the present invention. The load path 2100 is based on a 1 to N=3 adjacency of connections. The L, T, and Z nodes comprise arithmetic functions similar to the functions shown in FIGS. 20B-20E, described above. Each memory node supplies a current Pghk node value and weight values associated with the memory node to Z nodes in the load network, first stage 2102. The load network Z nodes multiply received weight values with received Pghk node values and provide a 3-to-one summation of the multiplied values which are sent to T nodes in a second stage 2104. In FIG. 21A, for example, $Z_{g-1,h-1,k}$ node 2114 is configured to generate:

$$Z_{g-1,h-1,k}=W_{(g,h,k),(g-1,h-1,k-1)}*P_{(g-1,h-1,k-1)}+\\W_{(g,h,k),(g-1,h-1,k)}*P_{(g-1,h-1,k)}+\\W_{(g,h,k),(g-1,h-1,k+1)}*P_{(g-1,h-1,k+1)},$$

where $P_{subscript}$ is the node value and the $g$, $h$, $k$ values are assigned as above for wrap around connections.

Each T node is configured to receive Z node values from the coupled Z nodes and to generate an N-to-one summation of the received Z node values that is output from each T node and sent to L nodes, such as L node $L_{g,h,k}$ 2108. For example, $T_{g,h-1,k}$ node 2124 is configured to generate, $T_{g,h-1,k}=Z_{g-1,h-1,k}+Z_{g+1,h-1,k}$, which is a summation of the $Z_{g-1,h-1,k}$ node 2114 output, $Z_{g,h-1,k}$ node 2115 output, and $Z_{g+1,h-1,k}$ node 2116 output values. Each L node is configured to receive T node values from the coupled T nodes and to generate an N-to-one summation of the received T node values that is output from each L node, such as $L_{g,h,k}$ node 2108. The $L_{g,h,k}$ 2108 is configured to generate, $L_{g,h,k}=T_{g,h-1,k}+T_{g,h,k}+T_{g,h+1,k}$, which is a summation of the $T_{g,h-1,k}$ node 2124 output, $T_{g,h,k}$ node 2125 output, and $T_{g,h+1,k}$ node 2126 output values. The output of the $L_{g,h,k}$ node 108 provides a summation of the twenty-seven 3×3×3 adjacent weighted neuron values to the $P_{g,h,k}$ node 2110.

Figure 21B:
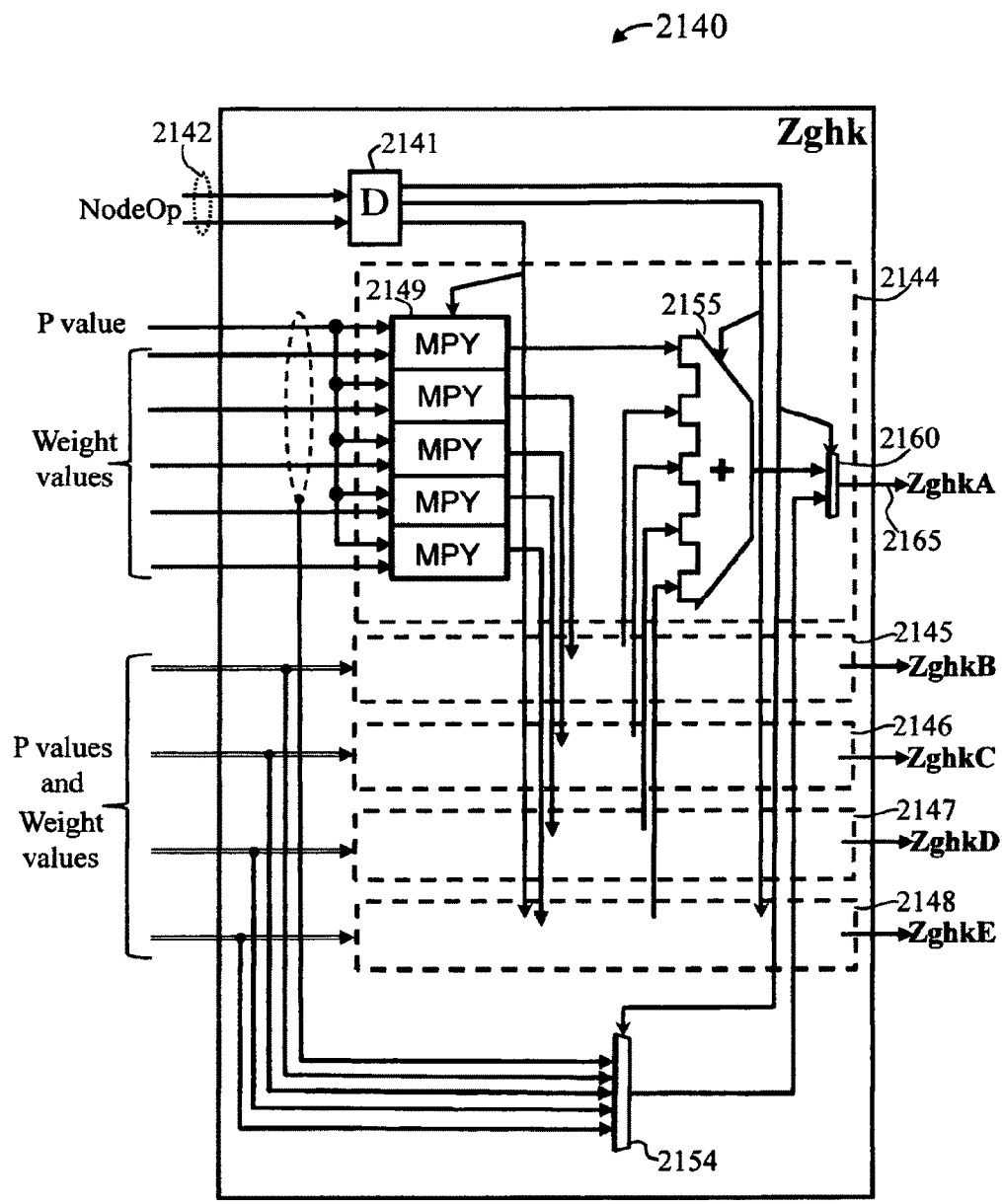
FIG. 21B illustrates an exemplary $Z_{ghk}$ node for use in a 3 dimensional (3D) Wings neural network processor with each neuron having a 5×5×5 array of synaptic weight values in accordance with the present invention.

Network nodes using a double adjacency 1 to 5 adjacency of connections may be used for neural network computations. FIG. 21B illustrates an exemplary $Z_{ghk}$ node 2140 for use in a 3 dimensional (3D) Wings neural network processor with each neuron having a 5×5×5 array of synaptic weight values in accordance with the present invention. The $Z_{ghk}$ node 2140 comprises five node function units 2144-2148, a decoder 2141 having node operation (NodeOp) inputs 2142, and a multiplexer 2154. Each node function unit, such as node function unit 2144, comprises a multiplier group, such as multiplier group 2149 having five two-input multipliers, a five-input adder, such as five-input adder 2155, and an output multiplexer, such as multiplexer 2160. The $Z_{ghk}$ node 2140 is coupled to five memory nodes $M_{g,h,k-2}$, $M_{g,h,k-1}$, $M_{g,h,k}$, $M_{g,h,k+1}$, $M_{g,h,k+2}$. As controlled by NodeOp inputs 2142 and decoder 2141 the five groups of multipliers are configured to multiply their input values and provide the results as input to the five-input adders to generate a sum of the weighted neuron node outputs for the Z node which may be selected by the output multiplexer 2160 and output as ZghkA 2165.

For neural processing, instructions or NodeOp input signals are received at each of the M, Z, T, L, and P nodes to operate and control the respective nodes. In particular, the NodeOp signals, such as the NodeOp inputs 2142 may be instructions each having, for example the AL instruction format 1020 of FIG. 10B, to specify an operation or operations of a particular node, wherein such instruction or instructions are decoded in decoder 2141. The Z nodes are coupled to T nodes which provide a summation of the Z node outputs and the T nodes are coupled to L nodes which provide a summation of the T node outputs. The L nodes are coupled to neuron processor P nodes which generate a neuron output based on the summation of 5×5×5 (125) weighted neuron inputs for a neural processor constructed using the double adjacency 1 to 5 adjacency of connections between nodes in each dimension. Other levels of adjacency and expanding into other dimensions of communication are applicable for use in a Wings array system, including a Wings neural network (WNN) processor.

Figure 22:
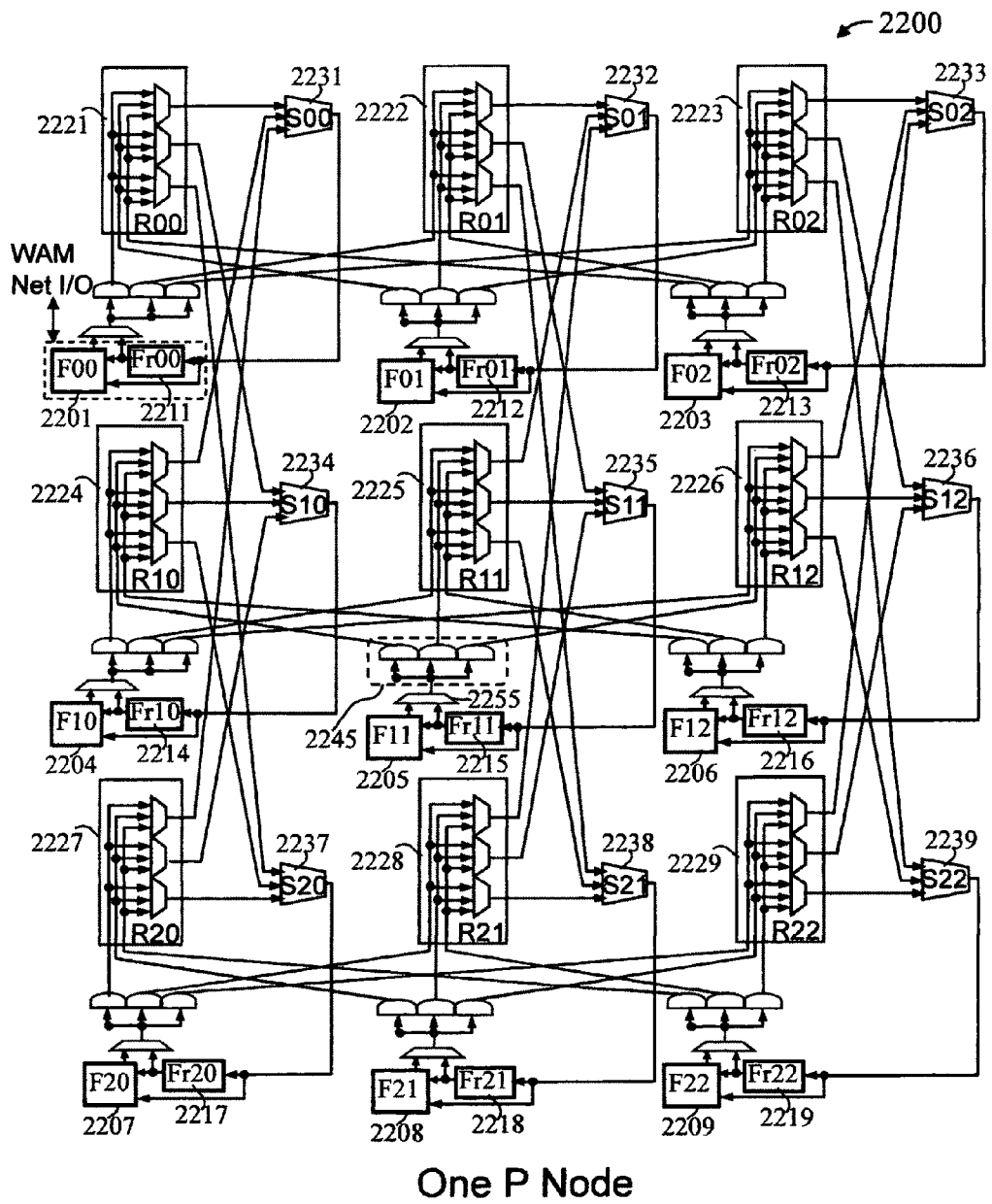
FIG. 22 illustrates a $P_{g,h,k}$ node in accordance with the present invention.

FIG. 22 illustrates a $P_{g,h,k}$ node 2200 in accordance with the present invention. The $P_{g,h,k}$ node 2200 comprises an array of function nodes F00node 2201-F22node 2209. Each of the function nodes, F00node 2201-F22node 2209 is coupled to a corresponding storage node Fr00node 2211-Fr22node 2219, which may be a buffer, a register, a register file, a queue, such as a first in first out (FIFO) memory, or a local memory, for example. The $P_{g,h,k}$ node 2200 couples to a WAM store network, for example, through the F00node 2201 and couples to a WAM load network also through the function node F00node 2201, utilizing a buffer, a FIFO memory, or the like.

Regarding function node F11node 2205, as an exemplary function node representing the other function nodes in the array, a multiplexer 2255 may be configured to select either an output of the function node F11node 2205 or select an output of the storage node Fr11node 2215. The output of the multiplexer 2255 is gated by a three gate circuit 2245 that provides three outputs coupled to first stage R nodes, R10 node 2224, R11 node 2225, and R12 node 2226, which represents a coupling according to an adjacency in a first dimension. The function nodes F00node 2201-F22node 2209 and storage elements Fr00node 2211-Fr22node 2219 are coupled to R nodes R00 node 2221-R22 node 2229, respectively, in a similar manner as described with the function node F11 node 2205. The R nodes R00node 2221-R22node 2229 are coupled to S nodes S00node 2231-S22node 2239, according to an adjacency in a second dimension. The S nodes S00 node 2231-S22 node 2239 are then coupled to the function nodes F00node 2201-F22node 2209 and storage elements Fr00node 2211-Fr22node 2219.

$P_{g,h,k}$ node 2200 couples up to nine function nodes and up to nine storage nodes in a 3×3 array using a 1 to 3 adjacency of connections network. Each function node may include multiple execution units which may operate in parallel on fixed point or floating point data types. The 3×3 array configuration allows chains of dependent instructions to be executed in pipeline fashion through the coupled nodes. For example, the sigmoid function may be applied to the input of function node F00node 2201 received from the $L_{ghk}$ node 2108 of a WAM load network to generate a $P_{ghk}$ neuron output. The sigmoid function may require a chain of dependent instructions executing on each function node in pipeline fashion on a 3×3 array of function nodes. For example, a first part of the sigmoid function may be computed on F00node 2201 which forwards results to one of the other function nodes and storage nodes in the 3×3 array, such as function node F11node 2205 and storage node Fr11node 2215 which computes a second part of the sigmoid function. While the second part is computed, a next sigmoid calculation may be started on the first node F00node 2201. The function node F11node 2205 may then forward the second part results to another function node and storage node, such as F10node 2204 and storage node Fr10 2214 which computes a third part of the sigmoid function. While the third part is computed, the second part of the next sigmoid calculation may begin on the function node F11node 2205. The sigmoid pipeline operations continue with the final result forwarded in pipeline order to the WAM store network.

Figure 23A:
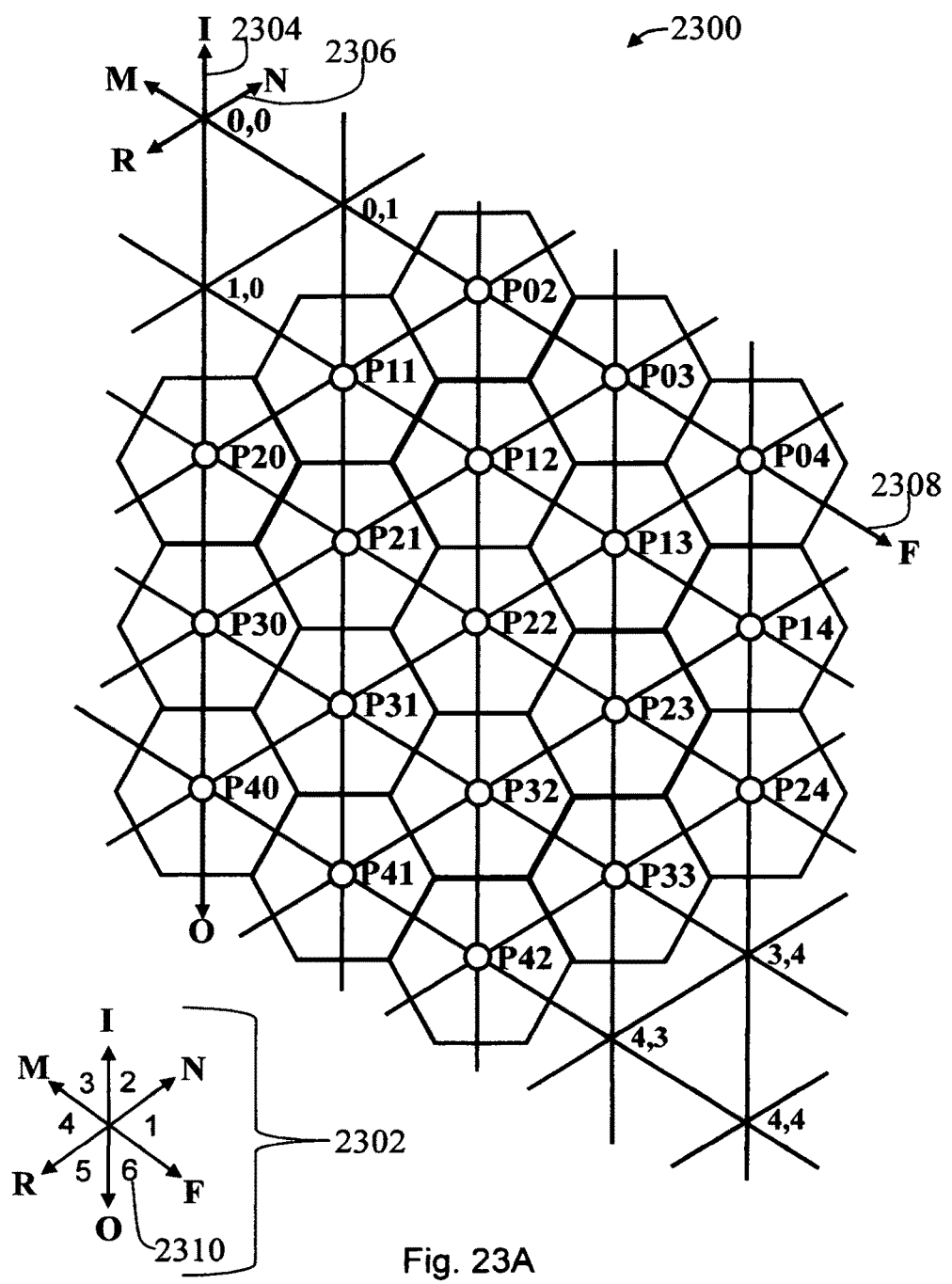
FIG. 23A illustrates a hexagonal processor array organized according to an INFORM coordinate system in accordance with the present invention.

FIG. 23A illustrates a hexagonal processor array 2300 organized according to an INFORM coordinate system 2302 in accordance with the present invention. The INFORM coordinate system 2302 is based on axes at 60 degree spacing resulting in six sectors 1-6. The IO axis 2304 of the INFORM coordinate system 2302 identifies an IO dimension of communication, the NR axis 2306 identifies an NR dimension of communication, and the FM axis 2308 identifies an FM dimension of communication. The hexagonal processor array 2300 is laid out with row paths parallel to the FM dimension of communication, column paths parallel to the IO dimension of communication, and diagonal paths parallel to the NR dimension of communication. In FIG. 23A, nodes of the hexagonal processor array are placed at a (row, column) position in a positive $6^{th}$ sector 2310. It is noted that by placing a P node at each of the following coordinates {(0,0), (0,1), (1,0), (3,4), (4,3), (4,4)} a 5×5 rhombus array would be obtained with each P node using the INFORM dimensions of communication. It is further noted that P nodes and their transpose P nodes are located in the NR dimension of communication.

Figure 23B:
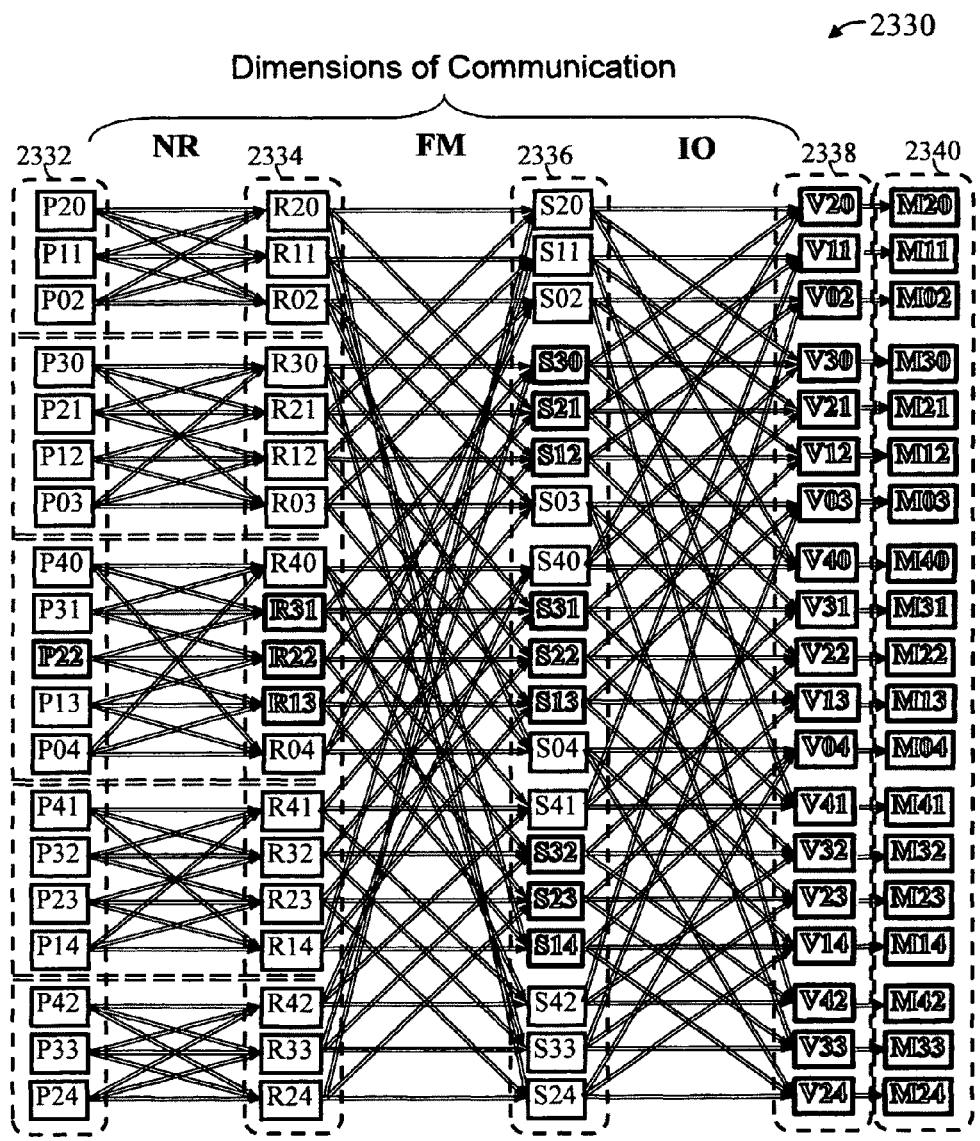
FIG. 23B illustrates a Wings hexagonal array memory (WHAM) store configuration of the hexagonal array of FIG. 23A based on a 1 to 3 adjacency of connections in each dimension of communication with wrap around at the edge nodes of the hexagonal array in accordance with the present invention.

FIG. 23B illustrates a Wings hexagonal array memory (WHAM) store configuration 2330 of the hexagonal processor array 2300 of FIG. 23A based on a 1 to 3 adjacency of connections in each dimension of communication with wrap around at the edge nodes of the hexagonal array in accordance with the present invention. The P nodes 2332 are coupled to R nodes 2334 according to the 1 to 3 adjacency of connections in the NR dimension of communication. The R nodes 2334 are coupled to the S nodes 2336 according to the 1 to 3 adjacency of connections in the FM dimension of communication. The S nodes 2336 are coupled to the V nodes 2338 according to the 1 to 3adjacency of connections in the IO dimension of communication. A communication path beginning from node P22, the center node in the hexagonal array 2300 of FIG. 23A to the memory nodes 2340 is highlighted using outlined fonts. P22 is coupled to R nodes R31, R22, and R13 in the NR dimension of communication. R31 is coupled to S nodes S30, S31, and S32 in the FM dimension of communication. R22 is coupled to S nodes S21, S22, and S23 in the FM dimension of communication. R13 is coupled to S nodes S12, S13, and S14 in the FM dimension of communication. The S nodes S30, S31, S32, S21, S22, S23, S12, S13, and S14 are coupled to the V nodes 2338 in the IO dimension of communication. Each V node is coupled to its corresponding memory M node. Other levels of adjacency and expanding into other dimensions of communication are applicable for use in a Wings array system, including the Wings hexagonal array memory (WHAM) network.

Figure 24:
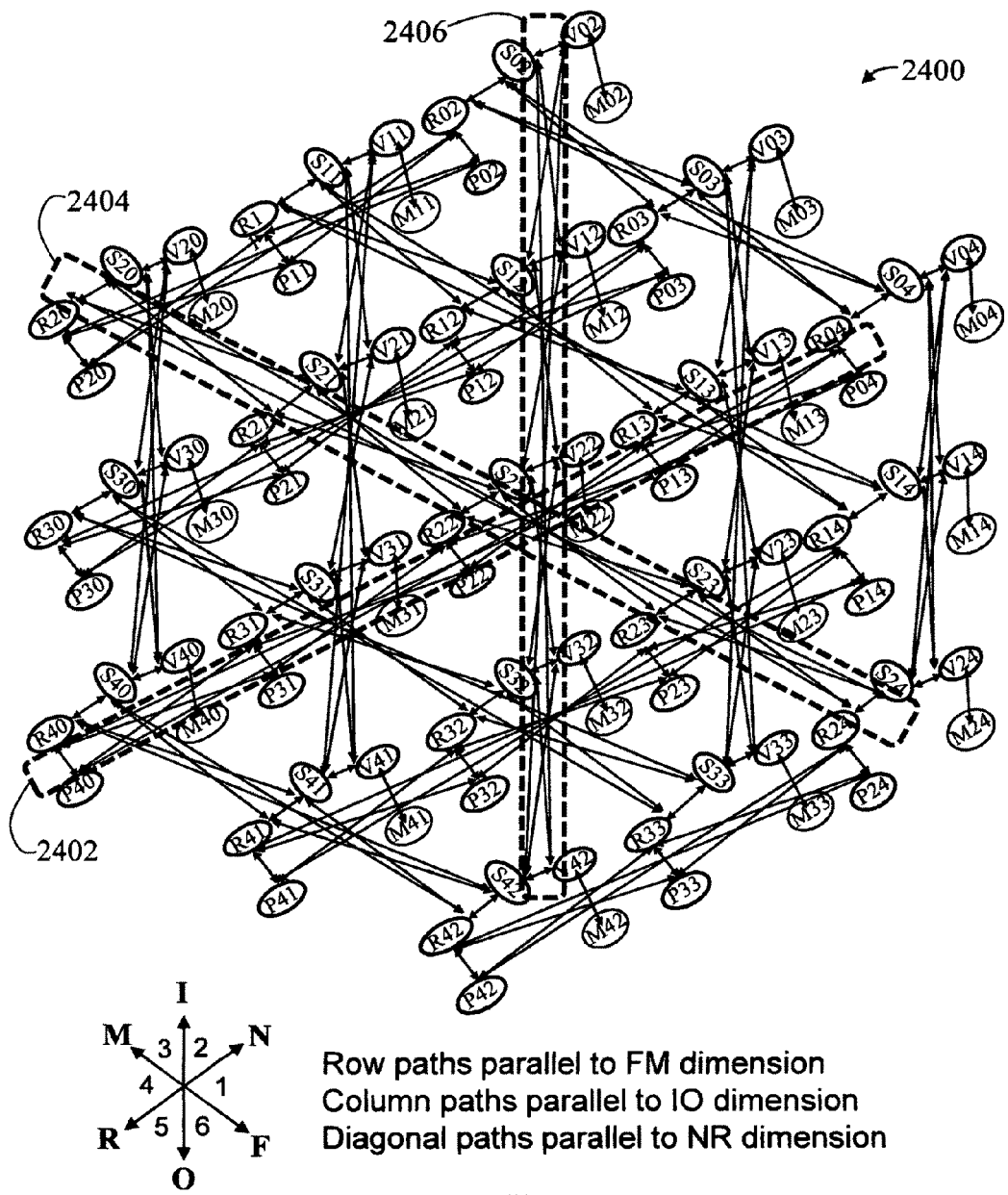
FIG. 24 illustrates an exemplary WHAM19S network layout of the hexagonal array of FIG. 23A based on a 1 to 3 adjacency of connections in each dimension of communication with wrap around at the edge nodes of the hexagonal array in accordance with the present invention.

FIG. 24 illustrates an exemplary WHAM19S network layout 2400 of the hexagonal processor array 2300 of FIG. 23A based on a 1 to 3 adjacency of connections in each dimension of communication with wrap around at the edge nodes of the hexagonal array in accordance with the present invention. The P nodes, M nodes, and network R, S, and V nodes are coupled according to the dimensions of the INFORM coordinate system 2302 of FIG. 23A. The P nodes are coupled to first stage R nodes across diagonal paths parallel to the NR dimension of communication. For example, P nodes P40, P31, P22, P13, and P04 are coupled to R nodes R40, R31, R22, R13, and R04 as shown in the highlighted dashed box 2402. The first stage R nodes are coupled to the second stage S nodes across row paths parallel to the FM dimension of communication. For example, R nodes R20, R21, R22, R23, and R24 are coupled to S nodes S20, S21, S22, S23, and S24 as shown in the highlighted dashed box 2404. The second stage S nodes are coupled to the third stage V nodes across column paths parallel to the IO dimension of communication. For example, S nodes S02, S12, S22, S32, and S42 are coupled to V nodes V02, V12, V22, V32, and V42 as shown in the highlighted dashed box 2406. In an exemplary implementation, the P nodes and first stage R nodes may be organized on one layer of a multi-layer silicon chip. A different layer of the chip may be utilized for the coupling between the first stage R nodes and the second stage S nodes. A different layer of the chip may be utilized for the coupling between the second stage S nodes and the third stage V nodes. The M nodes may be configured on the same layer with the third stage V nodes or on a different layer, such as the top layer of the chip. In such an organization the M nodes may be overlaid upon the P nodes.

Figure 25A:
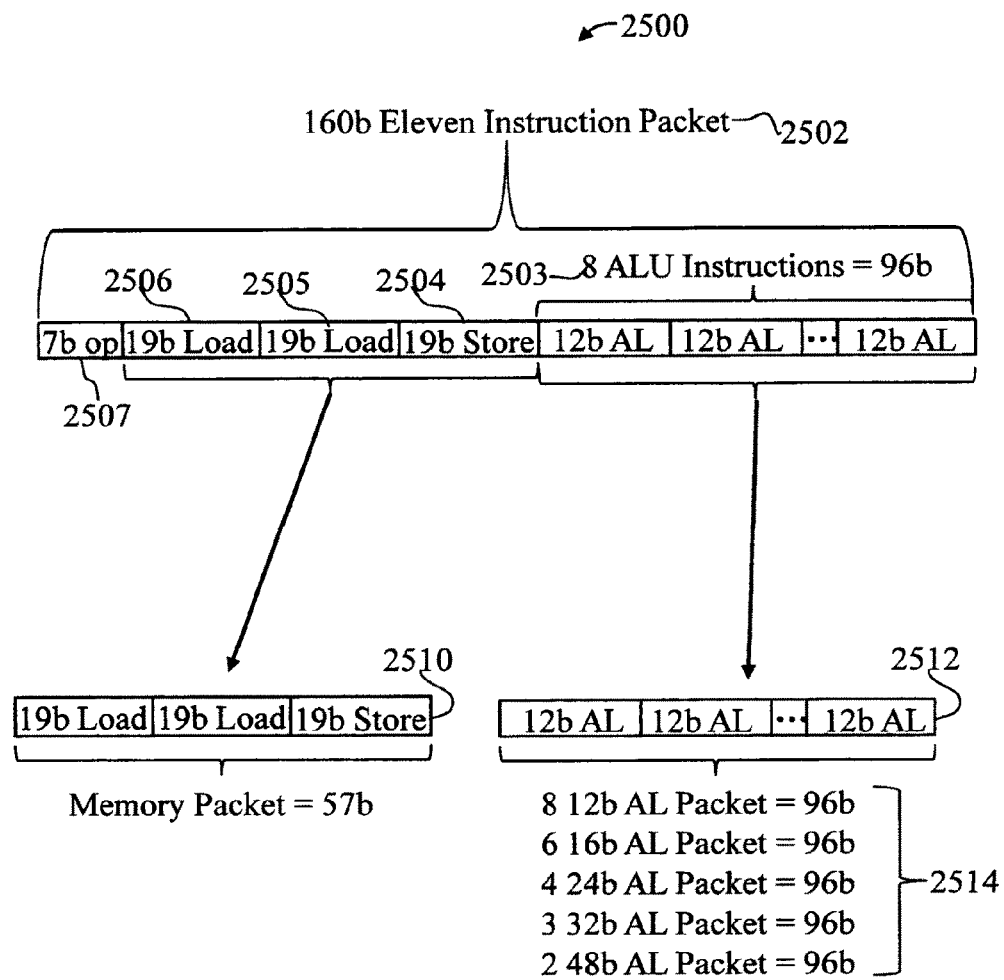
FIG. 25A illustrates a first exemplary Wings packet formats in accordance with the present invention.

FIG. 25A illustrates a first exemplary Wings packet format 2500 in accordance with the present invention. The first exemplary Wings packet format 2500 comprises a 160bit (160b) eleven instruction packet 2502 which comprises eight 12b arithmetic/logic (AL) instructions 2503, each having, for example the AL instruction format 1020 of FIG. 10B, a 19b store instruction 2504, having the store instruction format 1040 of FIG. 10C, two 19b load instructions 2505 and 2506, each having the load instruction format 1060 of FIG. 10D, and with a 7b packet operation code 2507. The 160b eleven instruction packet 2502 may be partitioned into a memory packet 2510 and a function packet 2512. The memory packet 2510 comprises two load instructions each of which may be expanded to a dual load instruction format and a store instruction. The function packet 2512 comprises 96 bits of AL type instructions which may comprise a plurality of different format function instructions as indicated in the function list 2514. For example, different formats of the function instructions in the function list 2514 may include the eight 12b AL instructions, six 16b AL instructions, four 24b AL instructions, three 32b AL instructions, or two 48b AL instructions. Other variations in packet formats, memory packet formats and function packet formats may be used depending on application requirements. In the function packet 2512, an AL instruction may be paired with one or more load instructions, one or more store instructions, and/or one or more of the other AL instructions. For an AL instruction paired with a load instruction, a source operand, for example, may be provided by the coupled WAM load network to a function or storage node in a P node. For an AL instruction paired with a store instruction, a data value, for example, may be provided from a function or a storage node in a P node to the coupled WAM store network. For an AL instruction paired with one or more of the other AL instructions, a source operand, for example, may be provided by a function node associated with the paired AL instruction and a result, for example, may be provided to a function or storage node for use by another paired AL instruction. AL instructions may be treated as building block instructions that couple with load, store, and other AL instructions. The instruction specific bits 1026 of FIG. 10B may be used to designate a path for receiving a source operand and a path for communicating a result.

Figure 25B:
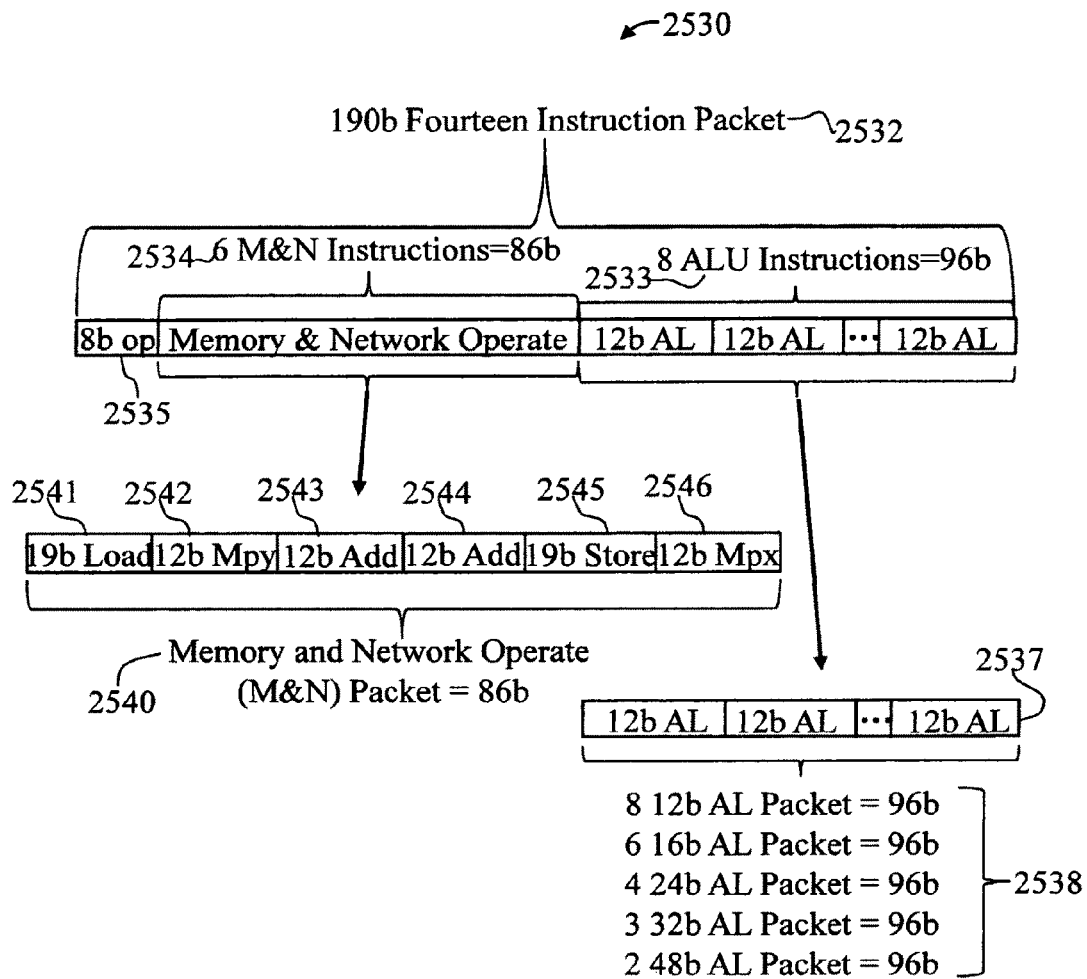
FIG. 25B illustrates a second exemplary Wings packet formats in accordance with the present invention.

FIG. 25B illustrates a second exemplary Wings packet format 2530 in accordance with the present invention. The second exemplary Wings packet format 2530 comprises a 190bit (190b) fourteen instruction packet 2532 which comprises eight 12b arithmetic/logic (AL) instructions 2533, each having, for example the AL instruction format 1020 of FIG. 10B, six memory and network operate (M&N) instructions 2534, and an 8b packet operation code 2535. The fourteen instruction packet 2532 may be partitioned into a function packet 2537 and a M&N packet 2540. The function packet 2537 comprises 96 bits of AL type instructions which may comprise a plurality of different format function instructions as indicated in the function list 2538. The M&N packet 2540 comprises a 19b load instruction 2541, a network multiply (Mpy) AL type instruction 2542, a first network add AL type instruction 2543, a second network add AL type instruction 2544, a 19b store instructions 2545, and a network multiplex (Mpx) AL type instruction 2546. The 19b load instruction 2541 may have the load instruction format 1060 of FIG. 10D, the 19b store instruction 2545 may have the store instruction format 1040 of FIG. 10C, and each network AL type instruction 2542-2544 and 2546 may have the AL instruction format 1020 of FIG. 10B. The 19b load instruction 2541 may also be a dual load type of instruction.

The 190 b fourteen instruction packet 2532 illustrates an exemplary set of instructions useful to operate and control nodes, such as, the exemplary $Z_{ghk}$ node 2140 of FIG. 21B for use in a 3 dimensional (3D) Wings neural network processor with each neuron having a 5×5×5 array of synaptic weight values. The function packet 2537 may be dispatched to operate and control neuron P nodes and the M&N packet 2540 may be dispatched to operate and control the memory and network nodes. For example, the 19 b load instruction 2541 may be dispatched to memory nodes configured to execute the received load instruction and provide the P and weight values to coupled $Z_{ghk}$ nodes, such as the $Z_{ghk}$ node 2140. The network multiply (Mpy) AL type instruction 2542 may be dispatched to each coupled $Z_{ghk}$ node, such as the $Z_{ghk}$ node 2140, configured to execute the received network Mpy instruction and provide a summation of weighted input values on each $Z_{ghk}$ node output. The first network add AL type instruction 2543 may be dispatched to each coupled T node and the second network add AL type instruction 2544 may be dispatched to each coupled L node. Each of the coupled T nodes and L nodes are configured to execute the instruction received and provide a summation of the 5×5×5 weighted neuron inputs. The neuron P nodes are configured to execute the instructions in the function packet 2537 to generate a sigmoid type output, for example. The sigmoid type output then is coupled to a Wings store network using the double adjacency 1 to 5 adjacency of connections to communicate the neuron values for storage in coupled memory nodes. Each of the Wings store network nodes is configured to execute the 12 b Mpx instruction 2546 to pass the sigmoid type output to the memory nodes that are configured to execute the 19 b store instruction 2545 and store the sigmoid type output in the appropriate specified location in preparation for another neural network operation. It is noted that these operations may be pipelined across the 3D Wings neural network processor in stages according to, for example the instruction order specified in the 190 b fourteen instruction packet 2532. It is noted that in comparison with instruction processors having a 32-bit instruction set, such operations would require at least fourteen 32-bit instructions, if not more, requiring storage for 14×32 b=448-bits as compared to the 190-bits used in the exemplary neural processor of the present invention.

Figure 26:
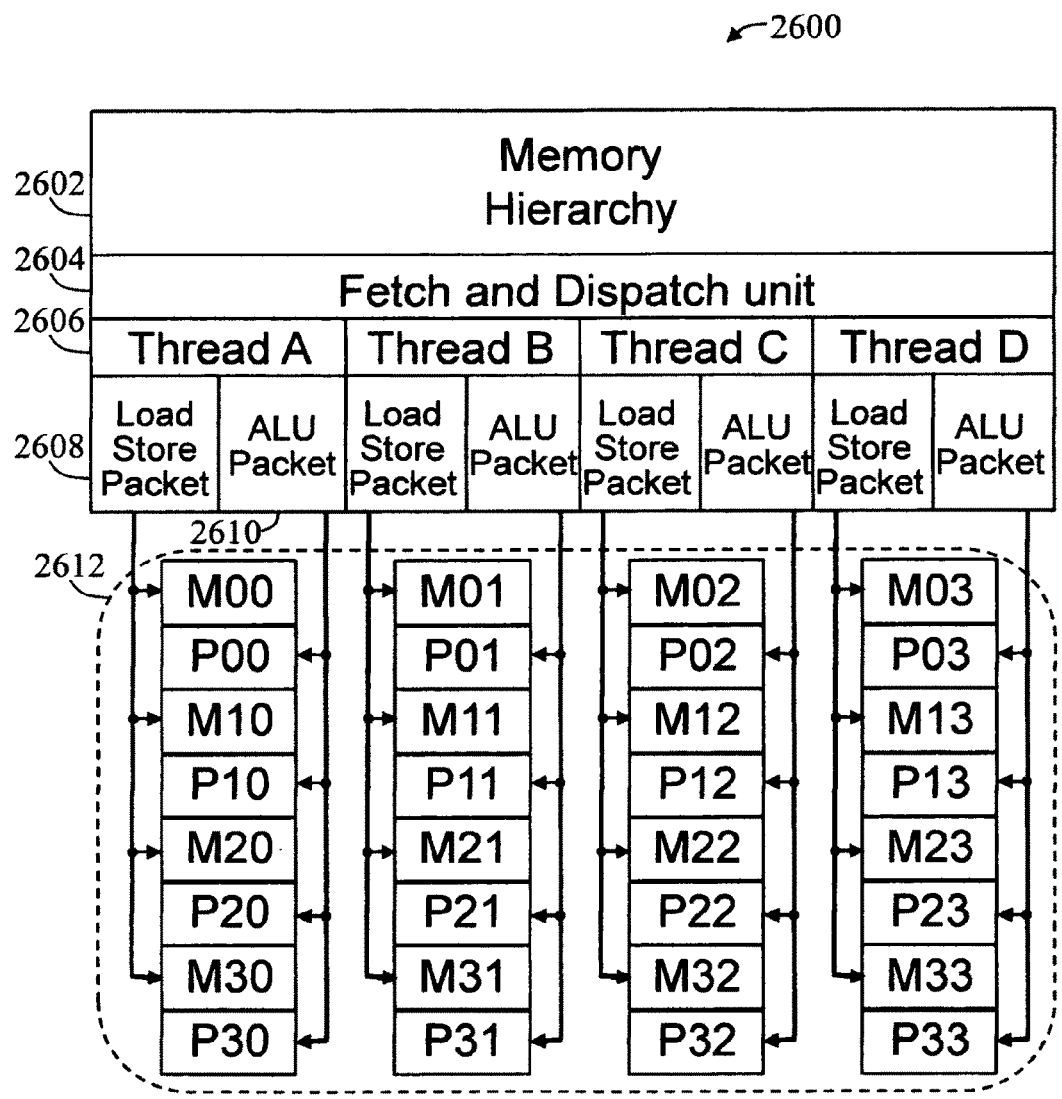
FIG. 26 illustrates an exemplary WAM processor in accordance with the present invention.

FIG. 26 illustrates an exemplary WAM processor 2600 in accordance with the present invention. The WAM processor 2600 comprises a memory hierarchy 2602, a fetch and dispatch unit 2604, a plurality of thread control units 2606, a plurality of load store packet units 2608, a plurality of ALU packet units 2610, and a processor memory array 2612, such as the processor memory layout 1700 of FIG. 17. The processor memory array 2612 is illustrated as an exemplary 4×4 organization though not limited to such an organization and larger array multi-dimensional organizations may be utilized. For example, in a G×H×K organization, each of the P nodes may be configured, for example, as the 3×3 $P_{g,h,k}$ node 2200 of FIG. 22. The thread control units 2606 may be configured to operate as a single thread control for SIMD operation of the processor memory array 2612. The thread control units 2606 may alternatively be programmed to operate with multiple threads, such as four threads A-D illustrated in FIG. 26. The memories in the processor memory array 2612 are the shared Wings array memories accessible by the processors as discussed above.

While the present invention is disclosed in a presently preferred context, it will be recognized that the teachings of the present invention may be variously embodied consistent with the disclosure and claims. By way of example, the present invention is applicable to register based RISC type processors acting as the processor nodes that communicate through a shared global memory. In another example, the network 1206 of FIG. 12A may be implemented with various types of networks while maintaining the split organization of the processor node 1200 embodiment of the present invention. It will be recognized that the present teachings may be used for multi-dimensional data analysis and may be adapted to other present and future architectures to which they may be beneficial.

I claim:

1. A network of nodes organized in stages according to dimensions of a GxH matrix of nearest neighbor connected elements having connectivity within the stages according to a 1 to N adjacency of connections between elements in corresponding dimensions of the GxH matrix which includes wrap around adjacent elements, the connectivity within the stages includes connections between nodes in the same position, N a positive odd integer, and $G \geq N$ and $H \geq N$, the network comprising:

groups of $A_{g,h}$ nodes, each group having a different g that is the same for each $A_{g,h}$ node in that group, $g \in \{0,1, \ldots, G-1\}$ and for each group, $h \in \{0,1, \ldots, H-1\}$, and each $A_{g,h}$ node operable to output a data value;

groups of $R_{g,h}$ nodes, each group having a different g that is the same for each $R_{g,h}$ node in that group, $g \in \{0,1, \ldots, G-1\}$ and for each group, $h \in \{0,1, \ldots, H-1\}$, each group of $R_{g,h}$ nodes directly coupled to a corresponding group of $A_{g,h}$ nodes according to a 1 to N adjacency of nodes in a first dimension, wherein each $R_{g,h}$ node in a group of $R_{g,h}$ nodes is operable to select a data value solely from directly coupled nodes $A_{g,h-\lfloor N/2 \rfloor}, \ldots, A_{g,h-2}, A_{g,h-1}, A_{g,h}, A_{g,h+1}, A_{g,h+2}, \ldots, A_{g,h+\lfloor N/2 \rfloor}$ and to output the $R_{g,h}$ node selected data value, wherein for a selected value of N, the $A_{g,h-\lfloor N/2 \rfloor}, \ldots, A_{g,h-2}, A_{g,h-1}$ sequence of nodes has $\lfloor N/2 \rfloor$ nodes and for N>1 the last node is $A_{g,h-\lfloor N/2 \rfloor}$ and the $A_{g,h+1}, A_{g,h+2}, \ldots, A_{g,h+\lfloor N/2 \rfloor}$ sequence of nodes has $\lfloor N/2 \rfloor$ nodes and for N>1 the last node is $A_{g,h+\lfloor N/2 \rfloor}$; and groups of $S_{g,h}$ nodes, each group having a different g that is the same for each $S_{g,h}$ node in that group, $g \in \{0,1, \ldots, G-1\}$ and for each group, $h \in \{0,1, \ldots, H-1\}$, each group of $S_{g,h}$ nodes directly coupled to groups of $R_{g,h}$ nodes according to a 1 to N adjacency of nodes in a second dimension, wherein each $S_{g,h}$ node is operable to select a data value solely from directly coupled nodes $R_{g-\lfloor N/2 \rfloor,h}, \ldots, R_{g-2,h}, R_{g-1,h}, R_{g,h}, R_{g+1,h}, R_{g+2,h}, \ldots, R_{g+\lfloor N/2 \rfloor,h}$ and to output the $S_{g,h}$ node selected data value, wherein for the selected value of N, the $R_{g-\lfloor N/2 \rfloor,h}, \ldots, R_{g-2,h}, R_{g-1,h}$ sequence of nodes has $\lfloor N/2 \rfloor$ nodes and for N>1 the last node is $R_{g-\lfloor N/2 \rfloor,h}$, the $R_{g+1,h}, R_{g+2,h}, \ldots, R_{g+\lfloor N/2 \rfloor,h}$ sequence of nodes has $\lfloor N/2 \rfloor$ nodes and for N>1 the last node is $R_{g+\lfloor N/2 \rfloor,h}$, and $\lfloor N/2 \rfloor$ is the floor of N/2 which is the largest integer less than N/2.

2. The network of claim 1, further comprising:

a plurality of $B_{g,h}$ nodes, $g \in \{0,1, \ldots, G-1\}$ and $h \in \{0,1, \ldots, H-1\}$, each $B_{g,h}$ node directly coupled to a corresponding $S_{g,h}$ node.

3. The network of claim 2, wherein each $B_{g,h}$ node is overlaid upon a corresponding $A_{g,h}$ node.

4. The network of claim 2, wherein each $B_{g,h}$ node is a processor that is operable to select a path through a directly coupled $R_{g,h}$ node to communicate the $R_{g,h}$ node selected data value and to select a path through a directly coupled $S_{g,h}$ node to communicate the $S_{g,h}$ node selected data value in response to the $B_{g,h}$ processor executing a memory access instruction.

5. The network of claim 2, wherein each $B_{g,h}$ node is a storage node that is operable to select a path through a directly coupled $R_{g,h}$ node to communicate the $R_{g,h}$ node selected data value and to select a path through a directly coupled $S_{g,h}$ node to communicate the $S_{g,h}$ node selected data value in response to the $B_{g,h}$ storage node executing a memory access instruction.

6. The network of claim 1, wherein each $A_{g,h}$ node is a processor that is operable to select a path through a directly coupled $R_{g,h}$ node to communicate the $R_{g,h}$ node selected data value and to select a path through a directly coupled $S_{g,h}$ node to communicate the $S_{g,h}$ node selected data value in response to the $A_{g,h}$ processor executing a memory access instruction.

7. The network of claim 1, wherein each $A_{g,h}$ node is a storage node that is operable to select a path through a directly coupled $R_{g,h}$ node to communicate the $R_{g,h}$ node selected data value and to select a path through a directly coupled $S_{g,h}$ node to communicate the $S_{g,h}$ node selected data value in response to the $A_{g,h}$ storage node executing a memory access instruction.

8. The network of claim 1, wherein the $R_{g,h}$ nodes and the $S_{g,h}$ nodes comprise:
a function unit selectively operable to execute a function on one or more data values received from the directly coupled nodes to produce an output data value.

9. The network of claim 1, further comprising:
a plurality of processor ($P_{g,h}$) nodes, $g \in \{0,1,\ldots,G-1\}$ and $h \in \{0,1,\ldots,H-1\}$, each $P_{g,h}$ node directly coupled to a corresponding $S_{g,h}$ node, wherein the $A_{g,h}$ nodes are configured as memory nodes and the $R_{g,h}$ nodes and $S_{g,h}$ nodes are configured with function units to support artificial intelligence and neural processing.

10. The network of claim 9, wherein the $P_{g,h}$ nodes are configured to operate as neuron processors in a neural network model, each neuron processor having an N×N array of synaptic weight values stored in the coupled $A_{g,h}$ memory nodes, wherein N is determined from the 1 to N adjacency of connections used in the G×H matrix of nodes.

11. A network of nodes organized in stages according to dimensions of communication in an array having D dimensions of communication and nearest neighbor connected elements, the network of nodes having connectivity within the stages according to adjacency of connections between elements in corresponding dimensions of communication of the array, the network comprising:
a plurality of A nodes, each A node identified according to its corresponding position in the array and operable to output an A data value; and
a plurality of D stages, one stage for each dimension of communication of the D-dimensional network, nodes in each stage identified according to positions of corresponding elements in the array, each A node directly coupled solely to $N_1$ first stage nodes that are adjacent nodes in a first dimension of communication, the $N_1$ first stage nodes include a first stage node in the same position as the directly coupled A node, each of the $N_1$ first stage nodes directly coupled solely to $N_2$ second stage nodes that are adjacent nodes in a second dimension of communication, the $N_2$ second stage nodes include a second stage node in the same position as the directly coupled first stage node, and continuing until each of $N_{D-1}$ D-1 stage nodes are directly coupled solely to $N_D$ D stage nodes that are adjacent nodes in a $D^{th}$ dimension of communication, the $N_D$ D stage nodes include a D stage node in the same position as the directly coupled D-1 stage node, wherein each stage node is configured to operate on a data value received from a directly coupled node in a previous stage that was initiated by the A data value output from each of the A nodes and to output a result value from each D stage node, wherein $N_1$, $N_2$, ..., $N_D$ are each a positive odd integer and are each less than or equal to the number of elements in each associated dimension of communication of the array.

12. The network of claim 11, wherein each A node is coupled to $N_1 * N_2 * \ldots N_D$ D stage nodes.

13. The network of claim 11, wherein each node comprises:
a function unit operable to execute a function on one or more data values received from the directly coupled nodes, wherein the function is specified by an instruction.

14. The network of claiml 11, wherein the instruction identifies a path to a source operand and a path for a result.

15. The network of claim 11, wherein the array includes wrap around adjacent elements.

16. The network of claim 11, wherein each A node comprises:
an array of storage nodes, each storage node coupled to other storage nodes by a plurality of A node stages according to a 1 to $N_A$ adjacency in each A node stage, wherein the array of storage nodes is operable to output the A data value, $N_A$ Us selected according to requirements of the A node, and $N_A$ is a positive odd integer.

17. The network of claim 11, wherein each D stage node is overlaid upon a corresponding A node.

18. The network of claim 11, wherein the array is a hexagonal array having D equal to three dimensions of communication.

19. A network of nodes organized in stages according to dimensions of communication in a multidimensional array having D dimensions of communication and nearest neighbor connected elements, nodes in the network identified according to positions of corresponding elements in the multidimensional array, the network comprising:
a plurality of memory (M) nodes, each M node identified according to its position in the multidimensional array and operable to output an M data value;
a plurality first stage nodes, each M node directly coupled solely to $N_1$ first stage nodes that are adjacent nodes in a first dimension of communication and include a first stage node in the same position as the directly coupled M node;
a plurality of second stage nodes, each first stage node directly coupled solely to $N_2$ second stage nodes that are adjacent nodes in a second dimension of communication and include a second stage node in the same position as the directly coupled first stage node; and
continuing up to a plurality of $D^{th}$ stage nodes, each D-1 stage node directly coupled solely to $N_D$ $D^{th}$ stage nodes that are adjacent nodes in a $D^{th}$ dimension of communication and include a D stage node in the same position as the directly coupled D-1 stage node, wherein each first stage node is configured to selectively operate on the M data value output from each directly coupled M node and to output a first stage node result value, each second stage node is configured to selectively operate on the first stage node result value from each directly coupled first stage node and to output a second stage node result value, and continuing up to each D stage node is configured to selectively operate on a D-1 stage node result value from each directly coupled D-1 stage node and to output a D stage node result value, wherein $N_1$, $N_2$, ..., $N_D$ are each a positive odd integer and are each less than or equal to the number of elements in each associated dimension of communication of the array.

20. The network of claim 19, wherein the multidimensional array is a multidimensional hexagonal array.

21. The network of claim 19, wherein $N_1, N_2, \ldots, N_D$ are determined from a 1 to N-level of adjacency of nodes used in constructing each associated stage in the network.

22. The network of claim 19, wherein each directly coupled first stage node comprises:
- a first multiplier configured to multiply a stored first processor (P) node output value with a first weight value to produce a weighted first P node output value, wherein the stored first P node output value combined with the first weight value comprises a first M data value accessed from a directly coupled first M node;
- a second multiplier configured to multiply a stored second P node output value with a second weight value to produce a weighted second P node output value, wherein the stored second P node output value combined with the second weight value comprises a second M data value accessed from a directly coupled second M node;
- a third multiplier configured to multiply a stored third P node output value with a third weight value to produce a weighted third P node output value, wherein the stored third P node output value combined with the third weight value comprises a third M data value accessed from a directly coupled third M node; and
- an adder configured to add the weighted first P node output value with the weighted second P node output value with the weighted third P node output value to produce a first sum of weighted P node values.

23. The network of claim 22, wherein each directly coupled second stage node continuing up to each directly coupled D stage node comprises:
- an adder configured to add a result value from each directly coupled node, wherein the result value from each directly coupled D stage node is a summation of weighted P node values.

24. The network of claim 19, further comprising:
- a multiply add function in each directly coupled first stage node configured to operate on M data values accessed from $N_1$ M nodes;
- an add function in each directly coupled second stage node configured to operate on $N_2$ result values from the $N_2$ directly coupled first stage nodes;
- continuing up to each directly coupled D stage node, an add function in each directly coupled D stage node configured to operate on $N_D$ result values from the directly coupled $N_D$ D−1 stage nodes; and
- a function unit in a plurality of processor (p) nodes, each P node directly coupled to each D stage node and configured to operate on an output of the directly coupled D stage node to produce a P node result, wherein each of the P node results is stored in a corresponding M node as part of the M data values.

* * * * *